United States Patent [19]

Mezei

[11] Patent Number: 6,070,175
[45] Date of Patent: May 30, 2000

[54] METHOD OF FILE EDITING USING FRAMEMAKER ENHANCED BY APPLICATION PROGRAMMING INTERFACE CLIENTS

[75] Inventor: Bruce William Mezei, Columbia, Md.

[73] Assignee: The United States as represented by the Director the National Security Agency, Ft. Meade, Md.

[21] Appl. No.: 08/917,693

[22] Filed: Aug. 26, 1997

[51] Int. Cl.[7] .................................................. G06F 17/30
[52] U.S. Cl. ................................ 707/500; 707/100
[58] Field of Search .................................... 707/500, 100

[56] References Cited

U.S. PATENT DOCUMENTS

| | | | |
|---|---|---|---|
| 5,214,755 | 5/1993 | Mason | 707/500 |
| 5,339,392 | 8/1994 | Risberg et al. | 395/161 |
| 5,345,550 | 9/1994 | Bloomfield | 395/156 |
| 5,455,948 | 10/1995 | Poole et al. | 395/650 |
| 5,481,710 | 1/1996 | Keane et al. | 395/700 |
| 5,551,030 | 8/1996 | Linden et al. | 707/102 |
| 5,603,034 | 2/1997 | Swanson | 395/701 |
| 5,623,663 | 4/1997 | Morgan et al. | 395/650 |
| 5,634,019 | 5/1997 | Koppolu et al. | 395/335 |
| 5,649,192 | 7/1997 | Stucky | 707/103 |
| 5,757,370 | 5/1998 | Amro et al. | 345/341 |

*Primary Examiner*—Wayne Amsbury
*Attorney, Agent, or Firm*—Robert D. Morelli

[57] ABSTRACT

The present invention is a method of enhancing a commercial document processing method, especially FrameMaker®, by adding additional functions in the areas of two-way database publishing, charting, collaborative editing, increasing productivity, utilizing computer-to-computer communication, processing graphics, processing tables, reporting, and filtering.

20 Claims, 57 Drawing Sheets

*name.suffix.Z*
*name.suffix.gz*
*name.suffix.enc*
where *suffix* is txt or mif (optional)

METHOD OF FILE EDITING USING FRAMEMAKER ENHANCED BY APPLICATION PROGRAMMING INTERFACE CLIENTS

FIELD OF THE INVENTION

The present invention relates to information processing system organization and, more particularly, to document processing.

BACKGROUND OF THE INVENTION

A software package named FrameMaker® from Adobe Systems, Inc. is a powerful documentation package for creating and editing a wide range of publication-quality documents in electronic file format. The types of documents that may be created and edited using FrameMaker® include technical manuals, letters, memos, reports, newsletters, presentations, and so on. FrameMaker® does not include ever function that every user wishes to use. So, Adobe Systems, Inc. is constantly making improvements to FrameMaker® by improving present functionality and adding more functionality, but its resources are not unlimited and certain users have highly specialized requirements that may not warrant spending resources on them that may be better spent working on functions of broader appeal. Recognizing this, Adobe Systems, Inc. provides a Frame Developer's Kit (FDK) so that a user may enhance the functionality of FrameMaker® by the creation of C language programs (called FDK clients or API clients) that define additional functionality not present in FrameMaker®. FDK which consists of a FrameMaker® Application Programming Interface (API) in the form of header files and libraries to be linked to the user's C language programs allows the user's C language program to share control of a FrameMaker® session in order to add the desired functionality as defined by the C language program. An API is a protocol embodied in software that may define functionality that the user wishes to add to FrameMaker®, may include a method for sharing control between FrameMaker® and the API, and may be used to integrate FrameMaker® into another software application program. An API accomplishes these goals by intercepting user events, taking action based on the nature of an intercepted event, communicating interactively with the user, directly accessing text and graphics in the document being processed, and invoking certain FrameMaker® commands.

There are several types of API clients (e.g., document report, inset editor, filter, and standard client). A document report is a utility program that analyzes an aspect of an existing document or book. An inset editor is an application that may be used to edit imported graphics within a FrameMaker® document. A filter allows for exchange of files with other applications (e.g., desktop publishers, spreadsheet packages) and FrameMaker®. A standard client initializes when FrameMaker® starts and then waits to respond to specific user actions, such as menu choices. A standard client allows for enhancing functionality of FrameMaker®.

An API client may take control at FrameMaker® start-up time, in response to user commands, when FrameMaker® events (e.g., when a document is opened, saved, reverted, or exited) occur, in response to special hypertext messages embedded in palettes, or when called by another client. An API may be written to create a new menu, display a certain alert, prompt for a value, display a list of values, display a list of filenames, display custom dialog boxes (e.g., buttons, checkboxes, pop-up menus, scroll bars, scroll lists, text boxes, etc.), create a palette (or toolbar) for responding to a hypertext command or user-initiated event.

The present version of FrameMaker® does not have the specialized functionality required by the assignee of the present invention in the areas of database forms, database publishing, graphics, collaborative preparation (i.e., more than one user working on the same document), productivity (i.e., making existing and new functions faster to use), computer to computer transfers, tables, reporting, and filters. The present invention is a method embodied in a series of C language programs that enhances FrameMaker® in all of these areas so that a user has access to more functionality while using FrameMaker® and may be more productive as well.

U.S. Pat. No. 5,339,392, entitled "APPARATUS AND METHOD FOR CREATION OF A USER DEFINABLE VIDEO DISPLAYED DOCUMENT SHOWING CHANGES IN REAL TIME," discloses a device for and method of allowing a user to define how certain real-time data appears in a document to be displayed on a computer terminal, but does not disclose a computer-related method of editing an electronic file using an enhanced version of FrameMaker® documentation software from Adobe Systems, Inc. as does the present invention. U.S. Pat. No. 5,339,392 is hereby incorporated by reference into the specification of the present invention.

U.S. Pat. No. 5,345,550, entitled "USER-MODIFIABLE POPUP MENUS FOR OBJECT ORIENTED BEHAVIOR," discloses a device for and a method of allowing a user to define a pop-up menu, but does not disclose a computer-related method of editing an electronic file using an enhanced version of FrameMaker® documentation software from Adobe Systems, Inc. as does the present invention. U.S. Pat. No. 5,345,550 is hereby incorporated by reference into the specification of the present invention.

U.S. Pat. No. 5,455,948, entitled "METHOD AND SYSTEM FOR PROVIDING DATA TO AN APPLICATION PROGRAM," discloses a device for and a method of isolating data and information collection components from other components of an application program in a distributed environment, but does not disclose a computer-related method of editing an electronic file using an enhanced version of FrameMaker® documentation software from Adobe Systems, Inc. as does the present invention. U.S. Pat. No. 5,455,948 is hereby incorporated by reference into the specification of the present invention.

U.S. Pat. No. 5,481,710, entitled "METHOD OD AND SYSTEM FOR PROVIDING APPLICATION PROGRAMS WITH AN UNDO/REDO FUNCTION," discloses a device for and a method of undoing or redoing a function just performed by a user, but does not disclose a computer-related method of editing an electronic file using an enhanced version of FrameMaker® documentation software from Adobe Systems, Inc. as does the present invention. U.S. Pat. No. 5,481,710 is hereby incorporated by reference into the specification of the present invention.

U.S. Pat. No. 5,603,034, entitled "GRAPHICAL RESOURCE EDITOR FOR SOFTWARE CUSTOMIZATION," discloses a device for and a method of allowing a user to modify resource values in a graphical resource editor, but does not disclose a computer-related method of editing an electronic file using an enhanced version of FrameMaker® documentation software from Adobe Systems, Inc. as does the present invention. U.S. Pat. No. 5,603,034 is hereby incorporated by reference into the specification of the present invention.

U.S. Pat. No. 5,623,663, entitled "CONVERTING A WINDOWING OPERATING SYSTEM MESSAGING INTERFACE TO APPLICATION PROGRAMMING INTERFACES," discloses a device for and a method of avoiding having to use a messaging interface by using an application programming interface programmed to accomplish the same task instead, but does not disclose a computer-related method of editing an electronic file using an enhanced version of FrameMaker® documentation software from Adobe Systems, Inc. as does the present invention. U.S. Pat. No. 5,623,663 is hereby incorporated by reference into the specification of the present invention.

U.S. Pat. No. 5,634,019, entitled "METHOD AND SYSTEM FOR IN-PLACE INTERACTION WITH CONTAINED OBJECTS," discloses a device for and a method of editing a document that contains data of differing formats by allowing the user to edit each type of data using a menu that has a function for each type of data contained therein, but does not disclose a computer-related method of editing an electronic file using an enhanced version of FrameMaker® documentation software from Adobe Systems, Inc. as does the present invention. U.S. Pat. No. 5,634,019 is hereby incorporated by reference into the specification of the present invention.

MICROFICHE APPENDIX

All computer programs necessary to make and use the present invention are included in a microfiche appendix which has been submitted with this specification to the United States Patent and Trademark Office. The microfiche appendix consists of six (6) microfiche sheets and a total of three-hundred fifty-eight (358) frames.

SUMMARY OF THE INVENTION

An object of the present invention is to enhance the functionality and ease of operation of a powerful document processing software package called FrameMaker® from Adobe Systems, Incorporated. Another object is to integrate the results of the first objective into other applications. The objectives of the present invention are achieved by a method embodied in a series of C language programs (called FDK clients or API clients) that were developed using a Frame Developer's Kit (FDK) and an Application Programming Interface (API) from Adobe Systems, Incorporated. The present invention improves upon FrameMaker® in the following areas: database publishing (i.e., DBPublish), two-way forms-based based access to databases (i.e., DBForms), compressive tools for creating data driven graphics (i.e., ChartIt), an intuitive mechanism for collaborating on preparing a document (i.e., Redline), productivity tools (i.e., NSA Toolbar, File Manager, Personal Preferences, Silent Print, and Silent Save), computer-to-computer utility (i.e., Transfer Doc to Server), graphics tools (i.e., Drop Shadow, Micro Rotate, and Single Level Move), table tools (i.e., Table Sort, Sum Columns, Table Export, and Table Transpose), book/document reports (i.e., Line Count, Paragraph Format, and Page Count), and filters (i.e., UNIX Compression, GZIP Compression, DES Encryption, and Editable CGM).

The present invention is useful for adding functionality to, and significantly simplifying the use of, FrameMaker® and providing the capability to integrate the results of the present invention into other software applications. The present invention provides easy-to-use toolbars of visual keyboard shortcuts, an intuitive mechanism for collaborating on preparing a document, comprehensive tools for creating data driven graphics, computer-to-computer utilities, graphics and table tools, document reports, filters, and a dynamic interface to database systems for publishing and two-way forms-based access.

DETAILED DESCRIPTION

TABLE OF CONTENTS

I. INTRODUCTION
II. DATABASE PUBLISHING
III. TWO-WAY FORMS-BASED ACCESS TO DATABASES
IV. DATA DRIVEN GRAPHICS
V. COLLABORATING ON THE PREPARATION OF A DOCUMENT
VI. PRODUCTIVITY TOOLS
VII. COMPUTER-TO-COMPUTER UTILITY
VIII. GRAPHICS TOOLS
IX. TABLE TOOLS
X. BOOK/DOCUMENT REPORTS
XI. FILTERS

I. Introduction

The present invention is a method of creating and editing a document in the form of an electronic file by enhancing a powerful commercial document processing software package called FrameMaker® from Adobe Systems, Incorporated. The present invention gives a user of FrameMaker® more functionality and allows a user to be more productive by making some existing functions of FrameMaker® easier and faster to use. The improvements to FrameMaker® were created using Adobe's Frame Developer's Kit (FDK) and can be found in the form of C language programs (called FDK clients or API clients) in the microfiche appendix to the present invention. The specific improvements to FrameMaker®, which are each explained in more detail below, include database publishing (i.e., DBPublish), two-way forms-based access to databases (i.e., DBForms), compressive tools for creating data driven graphics (i.e., ChartIt), an intuitive mechanism for collaborating on preparing a document (i.e., Redline), productivity tools (i.e., NSAToolbar, FileManager, PersonalPreferences, SilentPrint, and SilentSave), computer-to-computer utility (i.e., TransferDoctoServer), graphics tools (i.e., DropShadow, MicroRotate, and SingleLevelMove), table tools (i.e., TableSort, SumColumns, TableExport, and TableTranspose), book/document reports (i.e., LineCount, ParagraphFormat, and PageCount), and filters (i.e., Unix Compression, GZIP Compression, DES Encryption, and Editable CGM).

Figure 1:
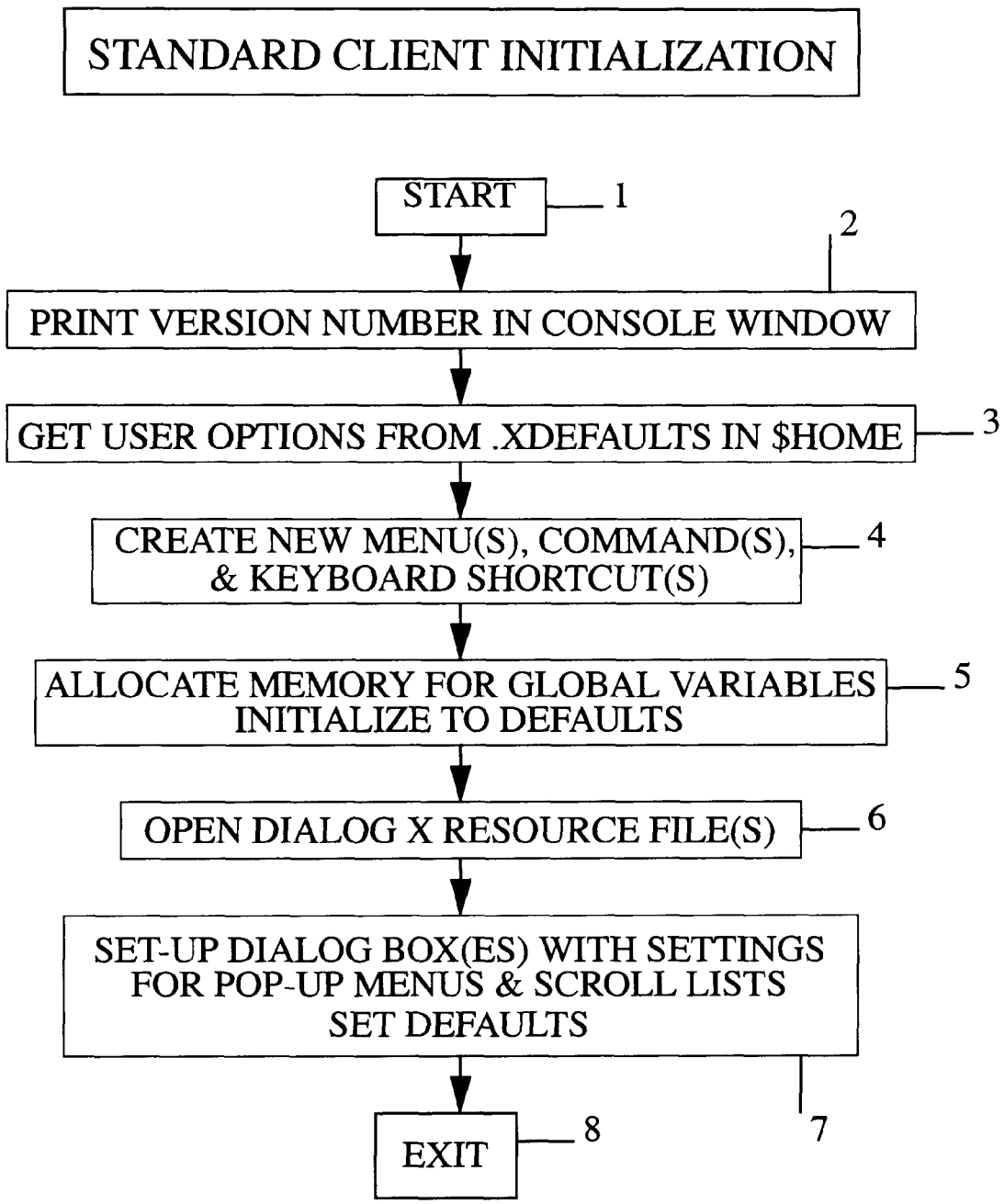
FIG. 1 is a flow-chart illustrating how a user initializes the present invention.

FIG. 1 is a flow-chart of the steps involved in initializing or starting 1 a client or application programming interface of the present invention. The first step is to print a version number in a CONSOLE window 2. The next step is to retrieved the user's customization options from a file containing these options 3 (e.g., .Xdefaults in $HOME). The next step is to create one or more new menus, commands, and keyboard shortcuts 4. The next step is to allocate memory for global variables and initialize the global variables to their default condition 5. The next step is to open one or more dialog resource files 6. The next step is to set the dialog boxes with settings with pop-up menus and scroll lists and to set the default conditions 7. The final step of the initialization process is to exit 8.

II. Database Publishing

The present invention improves upon the database publishing capability of FrameMaker® by adding the capability to dynamically integrate documents with database systems, handle complex database schemas, handle complex FrameMaker® templates in which an information field's size and position are not fixed, combine database columns, combine database rows, select database rows, and navigate database rows. This improvement to FrameMaker® is in the form of a C language program called DBPublish. This program may be found in the microfiche appendix to the present invention.

III. Two-Way Forms-Based Access to Databases

The present invention improves upon the ability of FrameMaker® to interface with database systems by providing a graphical user interface and by allowing a specially formatted FrameMaker® document to be used for both data entry and reporting. This improvement to FrameMaker® is in the form of a C language program called DBForms. This program may be found in the microfiche appendix to the present invention.

Figure 2:
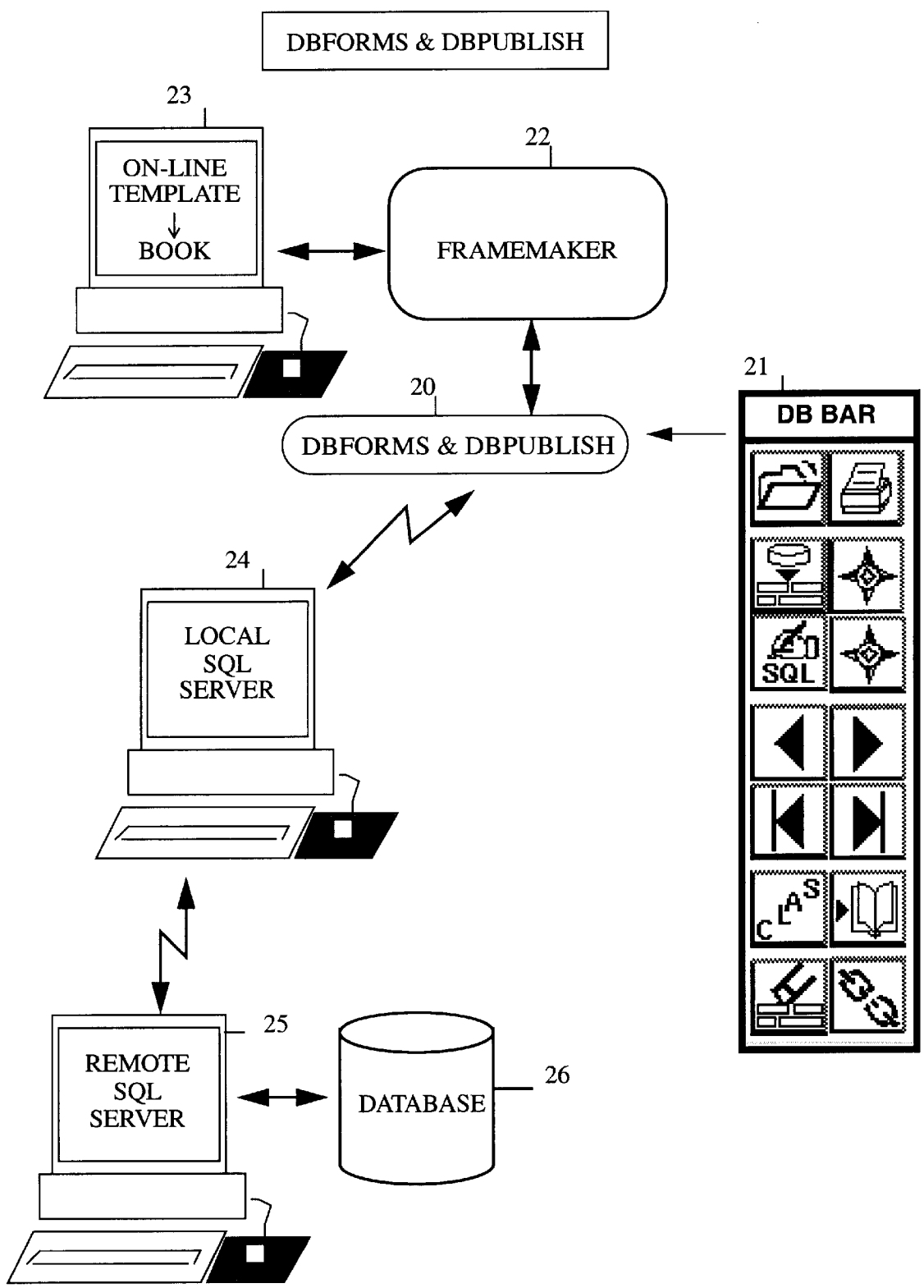
FIG. 2 is a block diagram of DBForms and DBPublish.

FIG. 2 is a block diagram that illustrates how DBForms and DBPublish are used with FrameMaker®. The programs DBForms and DBPublish 20, which are both disclosed in the microfiche appendix of the present invention, may be activated by the user using a button palette called DB Bar 21. DBForms and DBPublish interact with FrameMaker®22 in order to enhance the capabilities of FrameMaker®. A user may access the enhanced FrameMaker® via a terminal having an on-line template 23, a local database server 24 using a structured query language (SQL), or a local server communicating with a remote server using SQL 25. The remote server 25 is connected to a remote database 26.

Figure 3:
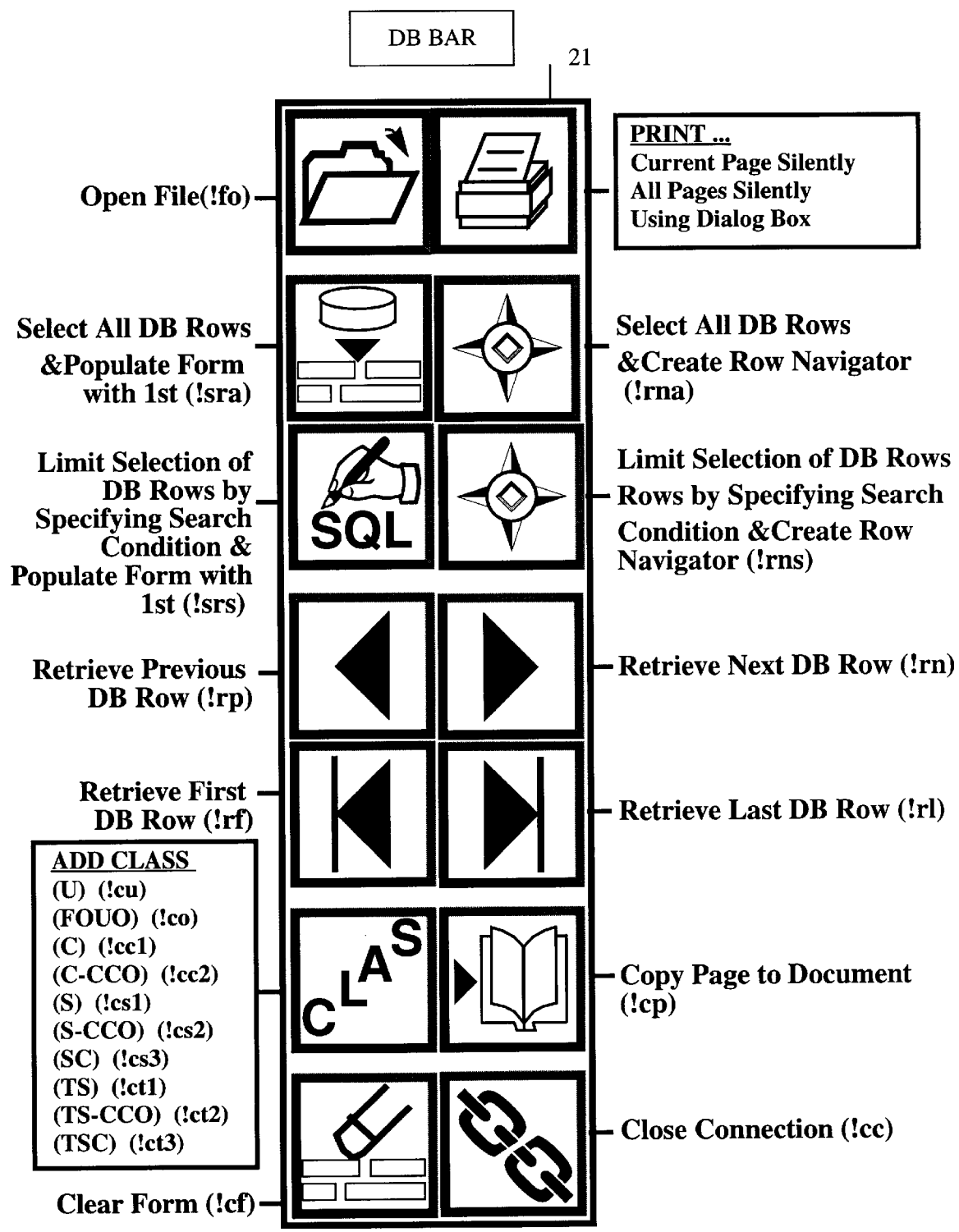
FIG. 3 is an illustration of DB Bar.

FIG. 3 is an illustration of the button palette DB Bar 21. The functions contained on DB Bar 21 include open-file, select-all-database-rows, select-certain-database-rows, retrieve-previous-database-row, retrieve-first-database-row, add-a-classification-banner, clear-the-form, print, select-all-database-rows, select-certain-database-rows, retrieve-the-next-database-row, retrieve-the-last-database-row, copy-the-page-to-a-document, and close-the-connection.

FIGS. 4 through 12 illustrate a flow-chart of DBForms and DBPublish. A DBForms and DBPublish command may be activated by either a user-chosen menu command or keyboard shortcut command 40 or by a command from DB Bar 41. The commands that a user may execute include open-file 42, silent-print 43, select-all 44, Navigator-with-all 45, select-subset 46, Navigator-with-subset 47, previous-row 48, next-row 49, first-row 50, last-row 51, classify-it 52, copy-page-to-book 53, clear-form 54, and close-connection 55. A user may also execute a hypertext message from a Navigator 56. Each of the commands listed in FIG. 4 branch to flow-charts contained in other figures. The commands previous-row 48, next-row 49, first-row 50, last-row 51, and hypertext-message-from-Navigator 56 each branch to the step of retrieving the user-selected row and populating the form 57. The retrieve-and-populate step 57 branches to FIG. 10 for additional steps before proceeding to the exit step 58. The other steps shown in FIG. 4 branch to additional steps contained in other figures. That is, the open-file step 42, the silent-print step 43, the select-all step 44 and the close-connection step 55 each branch to FIG. 5 for additional steps. The Navigator-with-all step 45, the select-subset step 46, and the Navigator-with-subset step 47 each branch to FIG. 6 for additional steps. The classify-it step 52 and the copy-page-to-book step 53 each branch to FIG. 11 for additional steps. The clear-form step 54 branches to FIG. 12 for additional steps.

Figure 4:
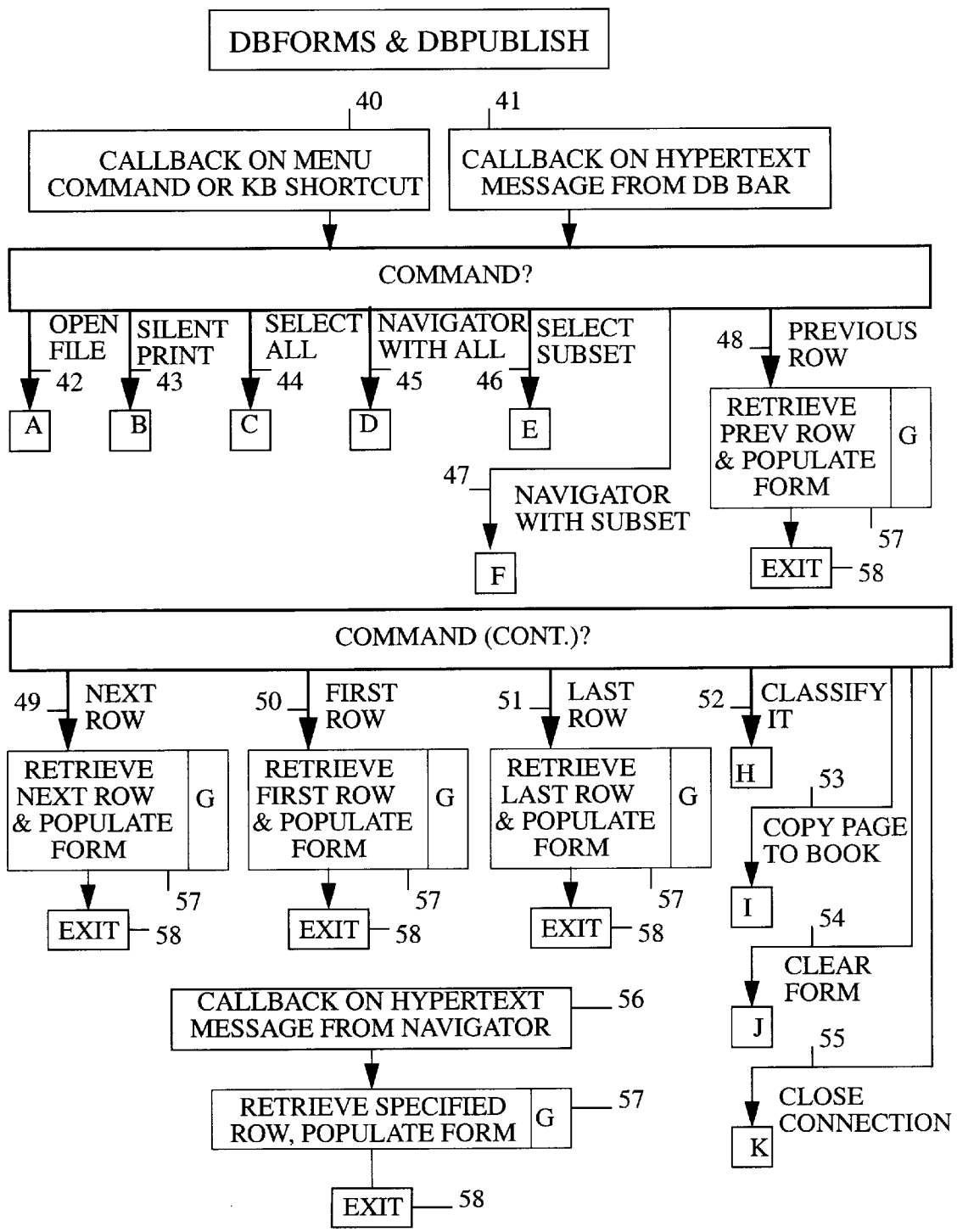
FIG. 4 is a flow-chart of DBForms and DBPublish.
Figure 5:
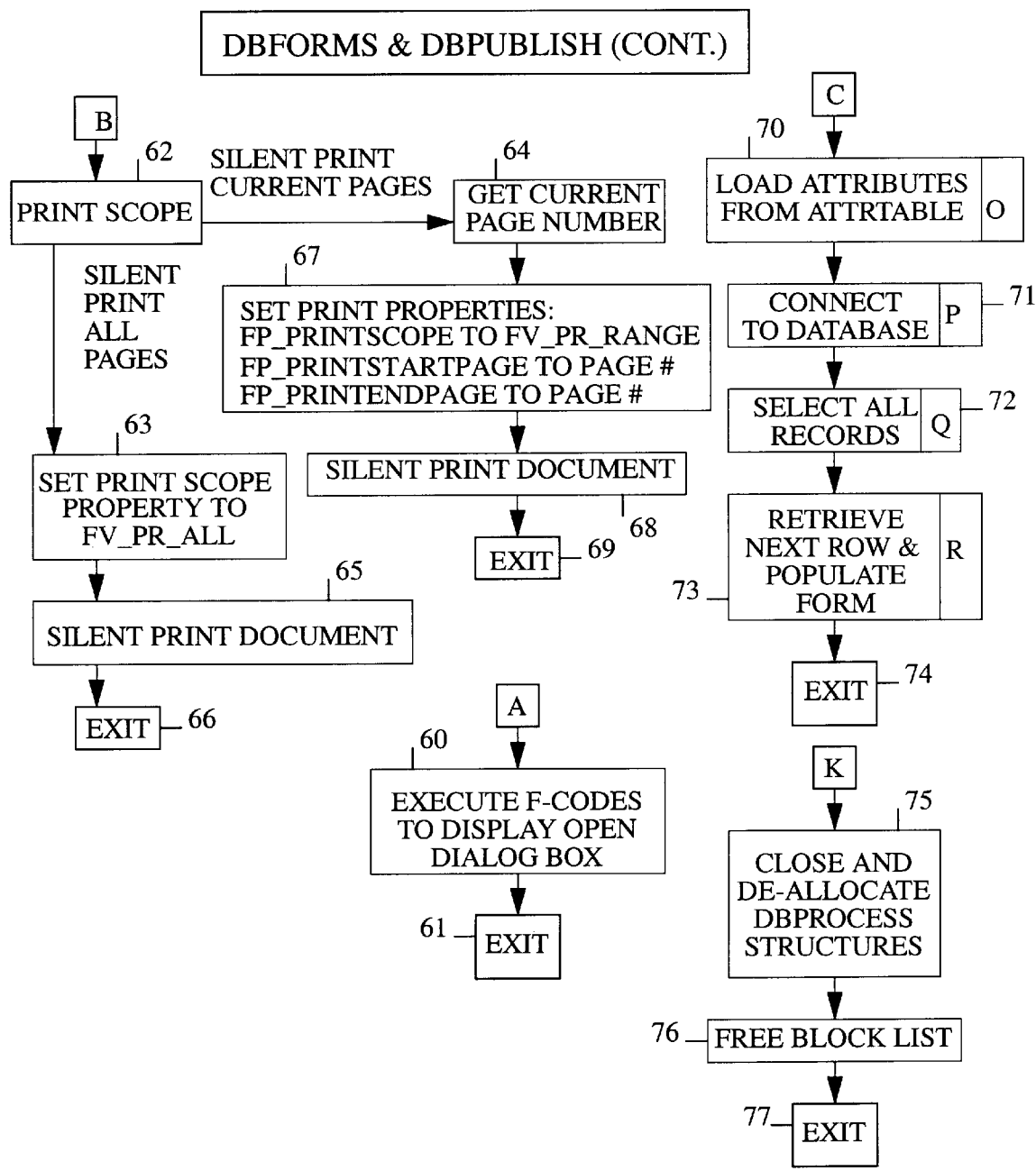
FIG. 5 is a continuation of FIG. 4.

The open-file step 42 branches from FIG. 4 to FIG. 5 for the step of executing f-codes to display an open dialog box 60. After executing the f-codes 60. After executing the f-codes 60 the command is exited 61.

The silent-print step 43 branches from FIG. 4 to FIG. 5 for the step of determining the print scope 62. If the print scope is "all," then the next step is to set the print scope property 63, then silently print the document 65 and then exit 66. If the print scope in step 62 is "current page," then the next step is to get the current page number 64, set the print properties to reflect the page number 67, then silently print the document 68 and exit 69.

The select-all step 44 branches from FIG. 4 to FIG. 5 for the step of loading attributes from the attribute table 70. The load-attributes step 70 branches to FIG. 7 for additional steps before performing the next step of connecting to the database 71. The connect-to-database step 71 branches to FIG. 8 for additional steps before performing the next step of selecting all records 72. The selecting-all-records step 72 branches to FIG. 8 for additional steps before performing the next step of retrieving the next row and populating the form 73. The retrieve-and-populate step 73 branches to FIG. 10 for additional steps before performing the next step which is to exit 74.

The close-connection step 55 branches from FIG. 4 to FIG. 5 for the additional steps of closing and de-allocating DBProcess structures 75, freeing the block list 76, and exiting 77.

Figure 6:
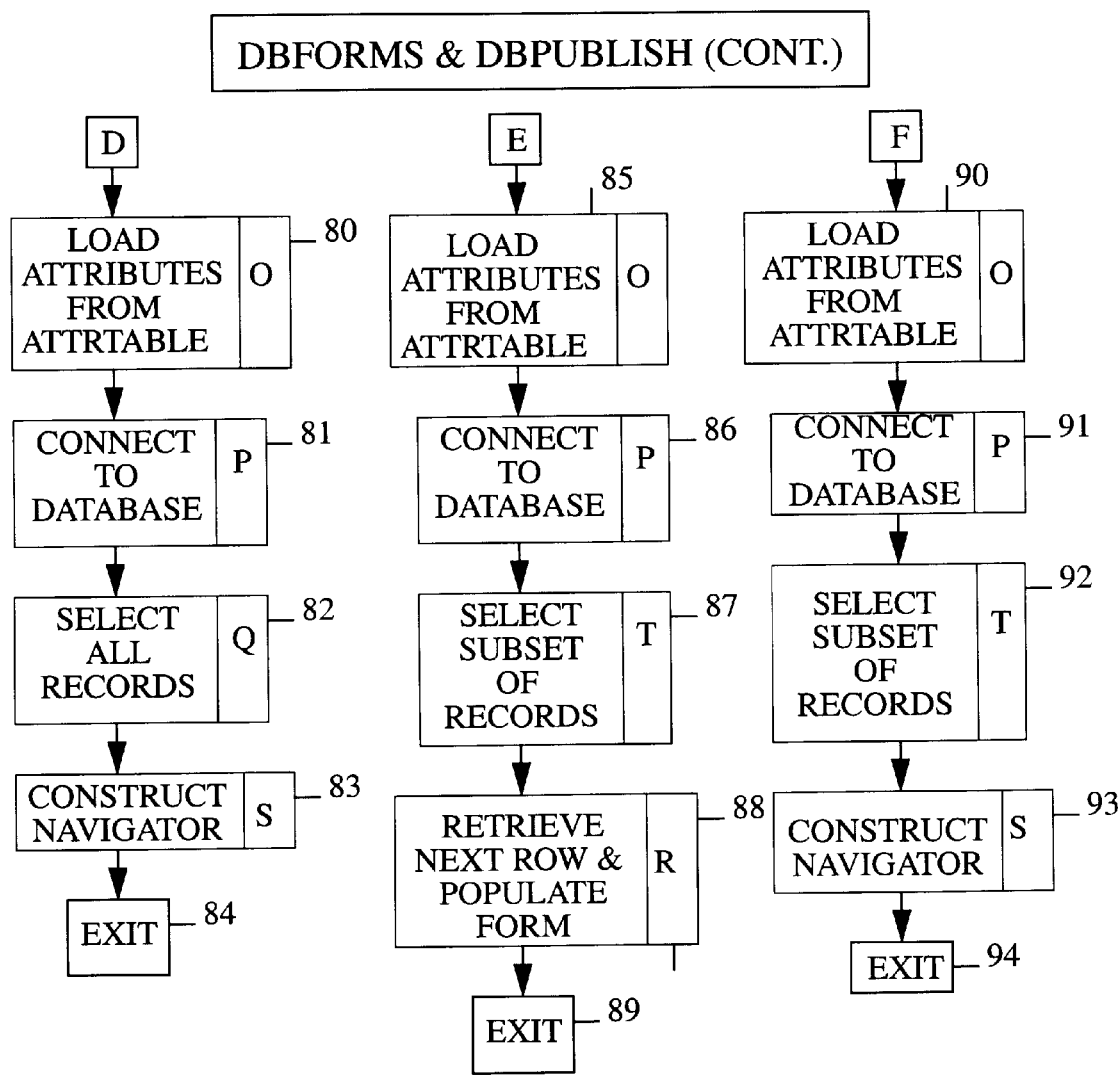
FIG. 6 is a further continuation of FIG. 4.

The Navigator-with-all step 45 branches from FIG. 4 to FIG. 6 for the step of loading attributes from the attribute table 80. The load-attributes step 80 branches to FIG. 7 for additional steps before performing the next step of connecting to the database 81. The connect-to-database step 81 branches to FIG. 8 for additional steps before performing the next step of selecting all records 82. The select-all-records step 82 branches to FIG. 8 for additional steps before performing the next step of constructing the navigator 83. The constructing-the-navigator step 83 branches to FIG. 9 for additional steps before performing the next step which is to exit 84.

The select-subset step 46 branches from FIG. 4 to FIG. 6 for the step of loading attributes from the attribute table 85. The load-attributes step 85 branches to FIG. 7 for additional steps before performing the next step of connecting to the database 86. The connect-to-database step 86 branches to FIG. 8 for additional steps before performing the next step of selecting a subset of the records 87. The select-record-subset step 87 branches to FIG. 9 for additional steps before performing the next step of retrieving the next row and populating the form 88. The retrieve-and-populate step 88 branches to FIG. 10 for additional steps before performing the next step which is to exit 89.

The Navigator-with-subset step 47 branches from FIG. 4 to FIG. 6 for the step of loading attributes from the attribute table 90. The load-attributes step 90 branches to FIG. 7 for additional steps before performing the next step of connecting to the database 91. The connect-to-database step 91 branches to FIG. 8 for additional steps before performing the next step of selecting a subset of the records 92. The select-record-subset step 92 branches to FIG. 9 for additional steps before performing the next step of constructing the Navigator 93.

Figure 9:
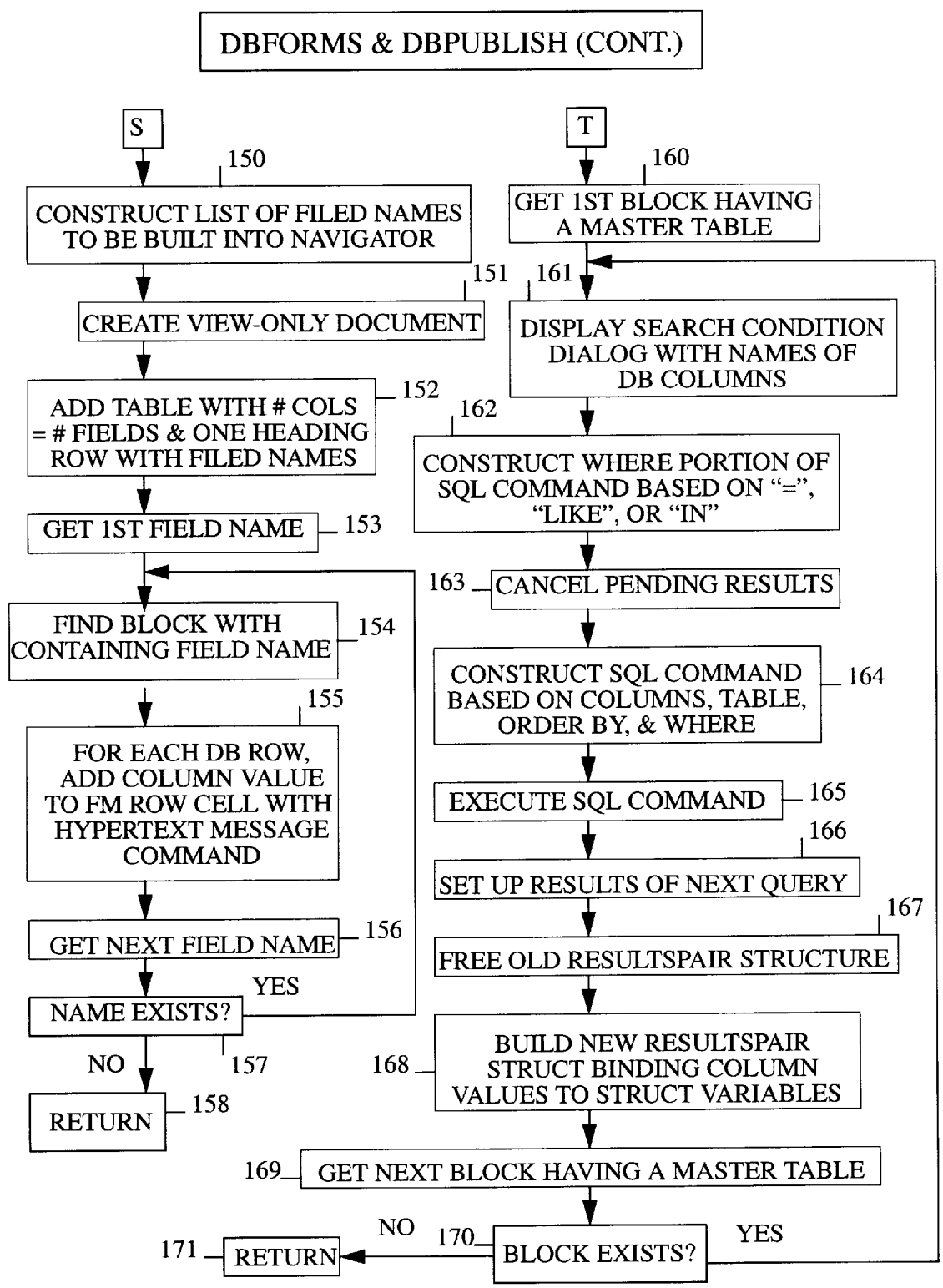
FIG. 9 is a further continuation of FIG. 4.

The Navigator-construction step 93 branches to FIG. 9 for additional steps before performing the next step which is to exit 94.

The load-attributes step 70, 80, 85, and 90 of commands select-all 44, Navigator-with-all 45, select-subset 46, and Navigator-with-subsets 47, respectively, each branch from FIG. 4 or FIG. 5 to FIG. 7 for the next step of finding a table with the format tag "attrTable" 100. The next step is to find the first block cell in the first column 101. The next step is to create and fill the block structure with database information 102. The next step is to create and fill linked lists of someColumn structures 103. The next step is to find the first row straddled by the block 104. The next step is to create a field structure, and create and fill a linked list of field name structures with values in the second column 105. The next step is to fill the field structure with attributes from the third column 106. The next step is to create and fill the linked list of display format structures with a linked list of conversion pair structures 107. The next step is to find the next row straddled by the block 108. The next step is to determine if another row exists 109. If so, return to the step in the flow-chart for creating a field structure and creating and filling linked list of field name structures with values from the second column 105. If not so, find the next block cell in the first column 110. The next step is to determine if another block cell exists 111. If so, return to the step in the flow-chart for creating and filling the block structure with database information 102. If not so, then return 112 to the step that caused the branch to these additional steps (i.e., step 70, 80, 85, or 90) and perform the next step following the branch point (i.e., step 71, 81, 86, or 91).

Figure 8:
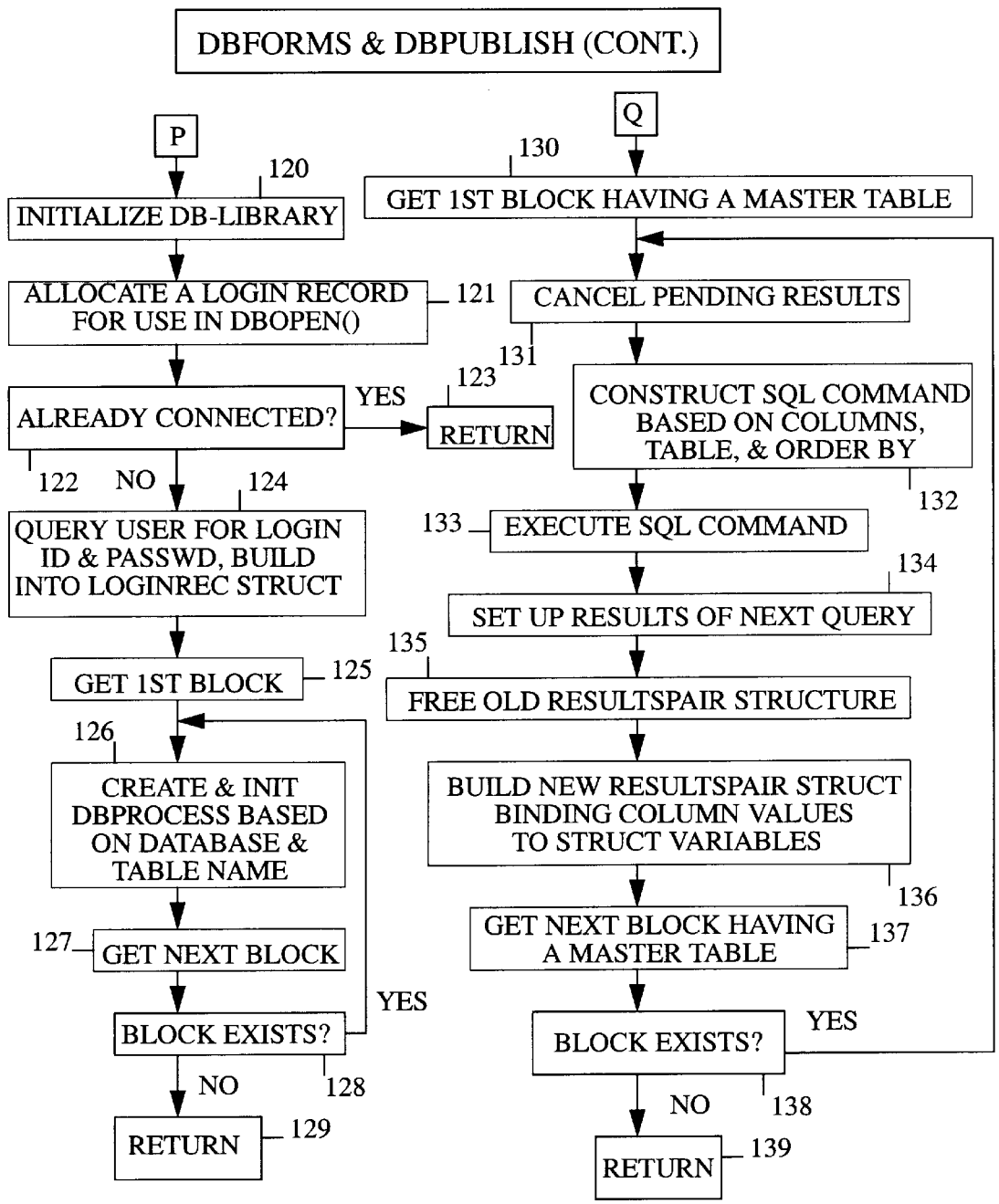
FIG. 8 is a further continuation of FIG. 4.

The connect-to-database steps (i.e., step 71, 81, 86, and 91) each branch to FIG. 8 for additional steps starting with initializing a database library 120. The next step is to allocate a login record for use in dbopeno ( ) 121. The next step is to determine if the connection was already made 122. If so, return 123 to the step that caused the branch to these additional steps (i.e., step 71, 81, 86, or 91) and perform the step following the branch step (i.e., step 72, 82, 87, or 92). If not so, query the user for a login identification and password and build it into a login record structure 124. The step following step 124 is to get a first block 125. The step following step 125 is to create and initialize DBPROCESS based on database and table name 126. The step following step 126 is to get the next block 127. The step following step 127 is to determine is another block exists 128. If so, return to the step of creating and initializing DBPROCESS based on database and table name 126. If not so, return 129 to the step that caused the branch to these additional steps (i.e., step 71, 81, 86, or 91) and perform the following step (i.e., step 72, 82, 87, or 92).

The select-all-records steps (i.e., steps 72 and 82) each branch to FIG. 8 for additional steps starting with getting a first block having a master table 130. The next step is to cancel any pending results 131. The next step is to construct a structured query language (SQL) command based on columns, table, and ORDER BY 132. The next step is to execute the SQL command 133. The next step is to set up the results of the next query 134. The next step is to free old resultsPair structures 135. The next step is to build a new resultPair structure binding column values to structure variables 136. The next step is to get the next block having a master table 137. The next step is to determine is another block exists 138. If so, return to the step of canceling pending results 131. If not so, return 139 to the step that caused the branch to these additional steps (i.e., steps 72 or 82) and perform the following step (i.e., step 73 or 83).

The construct-Navigator steps (i.e., steps 83 and 93) each branch to FIG. 9 for additional steps starting with constructing a list of field names to be built into the navigator 150. The next step is to create a view-only document 151. The next step is to add a table with a number of columns that equals the number of fields plus one heading row for containing field names 152. The next step is to get the first field name 153. The next step is to find a block containing a field name 154. The next step is to add a column value to the FrameMaker® row cell for each database row with a hypertext message command 155. The next step is to get the next field name 156. The next step is to determine if another field name exists 157. If so, return to the step of finding a block containing the field name 154. If not so, return to the step which caused the branch to these additional steps (i.e., steps 83 or 93) and performing the following step (i.e., steps 84 or 94).

The select-record-subset steps (i.e., steps 87 and 92) each cause a branch to FIG. 9 for additional steps starting with getting a first block having a master table 160. The next step is to display a search condition dialog box with names of the database columns 161. The next step is to construct the "where" portion of the SQL command based on the functions "equal,""like," or "in" 162. The next step is to cancel any pending results 163. The next step is to construct an SQL command based on columns, table, and the "order," "by," and "where" portions of the SQL command 164. The next step is to execute the SQL command 165. The next step is to set up results of the next query 166. The next step is to free old resultsPair structures 167. The next step is to build a new resultsPair structure binding column values to structure variables 168. The next step is to get the next block having a master table 169. The next step is to determine if another block exists 170. If another block exists, the next step is to return to the step in the flow-chart of displaying the search condition dialog box with names of the database columns 161. If another block does not exist, then the next step is to return to the step that caused the branch to these additional steps (i.e., steps 87 or 92) and continue with the step that follow therefrom (i.e., steps 88 or 93).

Figure 10:
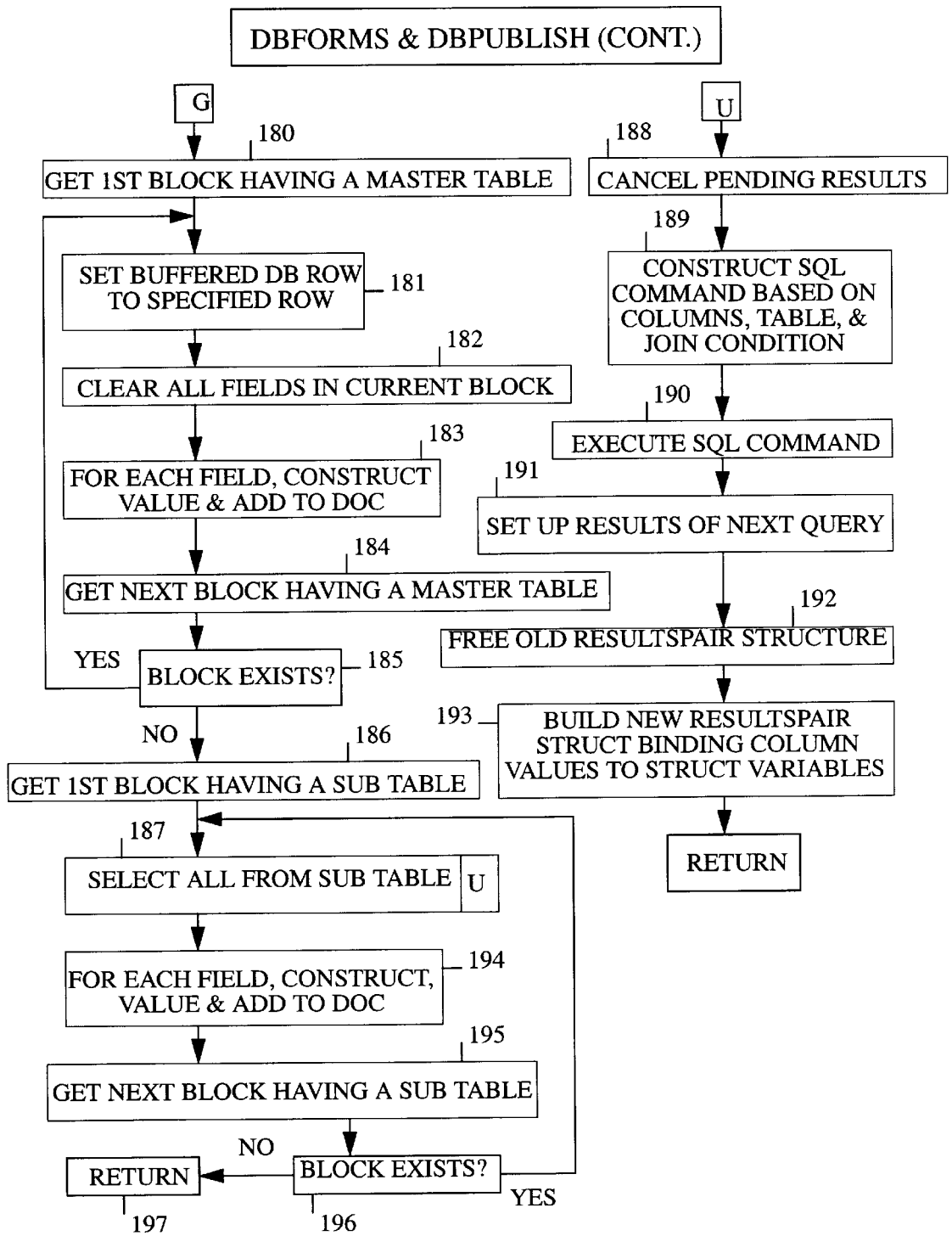
FIG. 10 is a further continuation of FIG. 4.

The retrieve-and-populate step (i.e., step 57, 73, and 88) each branch to FIG. 10 for additional steps starting with getting the first block having a master table 180. The next step is to set a buffered database row to a specified row 181. The next step is to clear all fields in the current block 182. The next step is to construct a value to add to the document for each field 183. The next step is to get the next block having a master table 184. The next step is to determine if another block exists 185. If another block exists, the next step is to return to a point in the flow-chart starting with the step of setting a buffered database row to a specified row 181. If another block does not exist then the next step is to get a first block having a sub-table 186. The next step is to select all items from the sub-table 187. The last step 187 further includes the steps of canceling any pending results 188; constructing an SQL command based on columns, tables, and join conditions 189; execute the SQL command 190; set-up results of the next query 191; free old resultsPair structures 192; and building new resultsPair structures binding column values to structure variables 193. After completing all of the steps involved with selecting all items from the sub-table 187, the next step is to construct values and add them to the document for each field 194. The next step is to get the next block having a sub-table 195. The next step is to determine if another block exists 196. If another block exists, the next step is to return to a point in the flow-chart starting with the step of selecting all items from the sub-table 187. If no other block exists, the next step is to return 197 to the step that caused a branch to these additional steps (i.e., step 57, 73, or 88) and continuing with the step that follows therefrom (i.e., step 58, 74, or 89).

Figure 11:
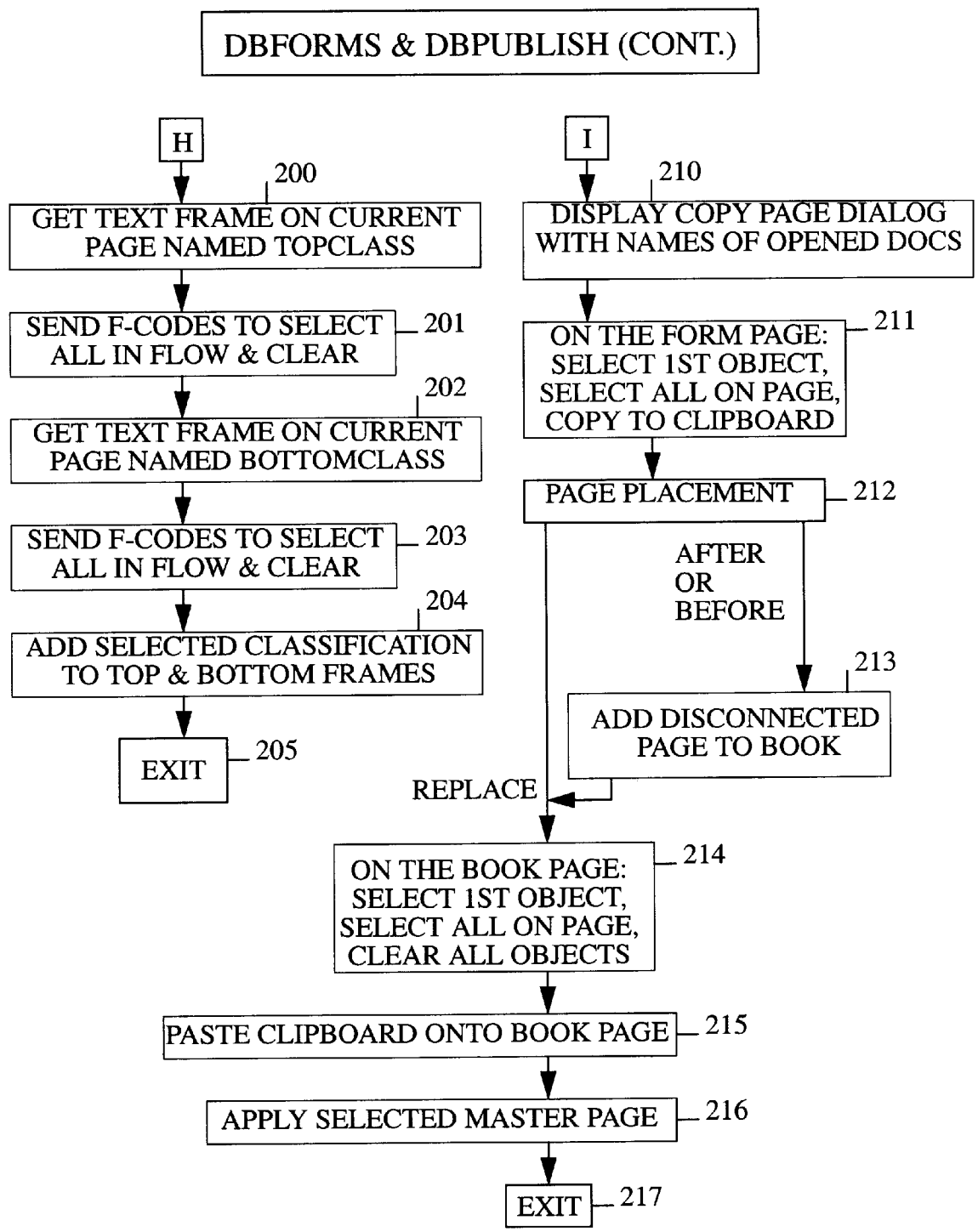
FIG. 11 is a further continuation of FIG. 4.

The classify-it step 52 from FIG. 4 continues on FIG. 11 starting with the step of getting a text frame on current page named TopClass 200. The next step is to send f-codes to select all in flow and clear 201. The next step is to get the text frame on current page named BottomClass 202. The next step is to send f-codes to select all in flow and clear 203. The next step is to add selected classification to top and bottom frames 204. The final step is to exit 205.

The copy-page-to-book step 53 from FIG. 4 continues on FIG. 11 starting with displaying a copy of the Page dialog box with names of open documents 210. The next step is to select the first object on the form page, select all on the page, and copy the selected items to the clipboard 211. The next step is to determine where to place the items from the clipboard (i.e., before a page, after a page, or in place of a page) 212. If the clipboard information is placed before or after a page, the next step is to add a disconnected page to the book in the appropriate place 213. If the clipboard information is to replace a page or the step to add the disconnected page to the book 213 is completed then the next step is to select the first object on the book page, select all of the objects of the page, and clear all of the objects 214. The next step is to paste the information on the clipboard onto the book page 215. The next step is to apply the selected master page 216. The final step is to exist 217.

Figure 7:
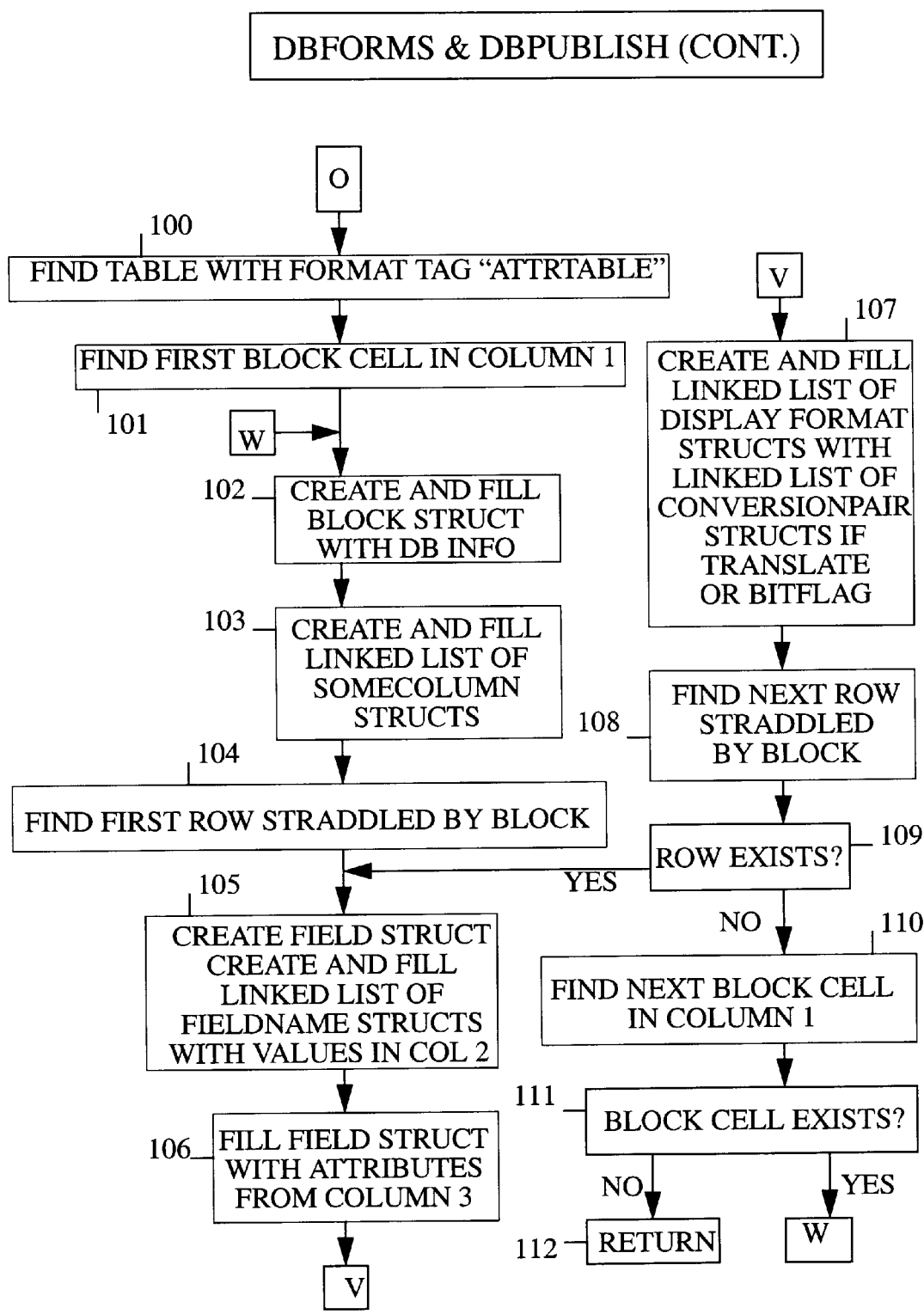
FIG. 7 is a further continuation of FIG. 4.
Figure 12:
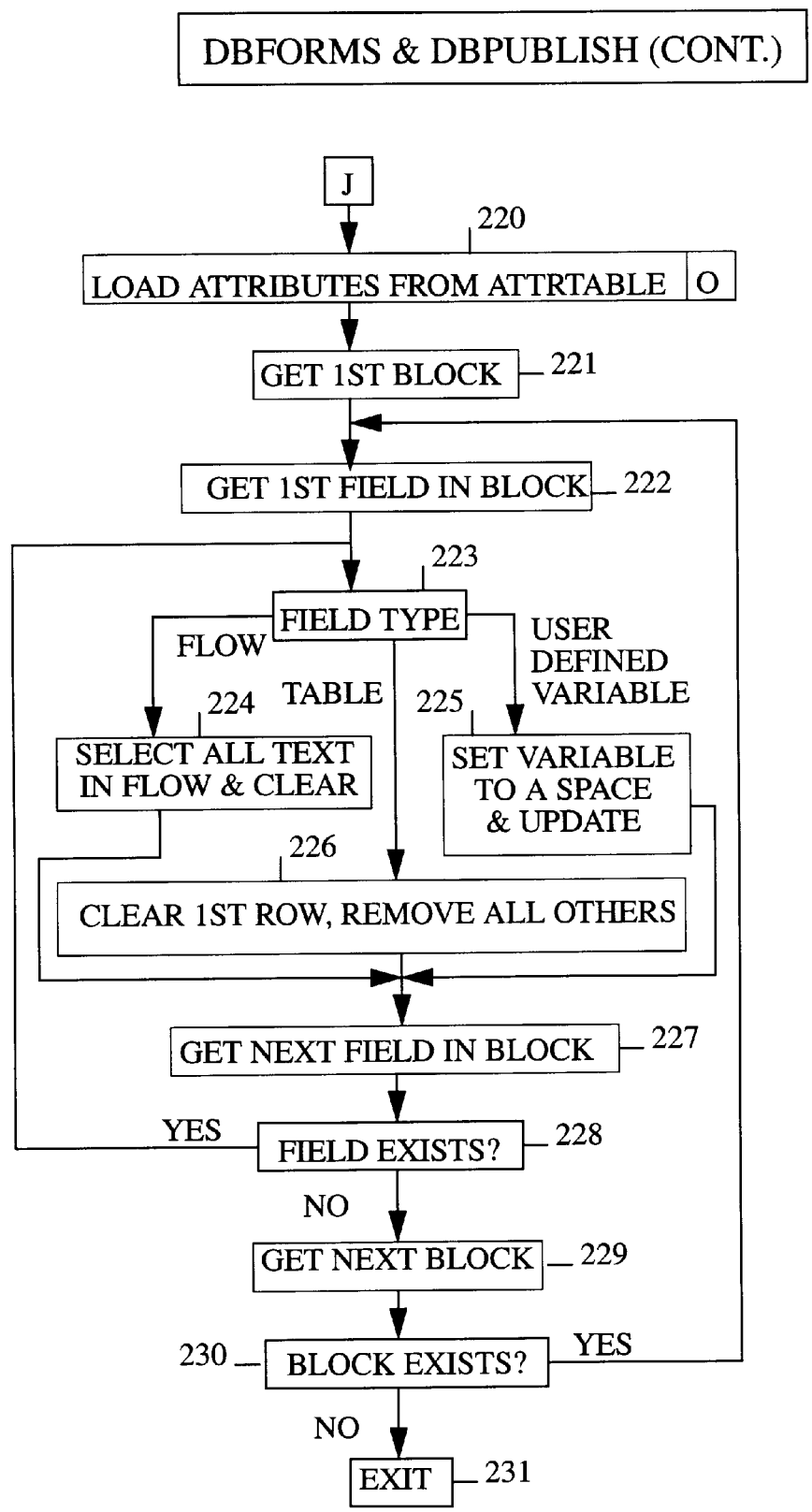
FIG. 12 is a further continuation of FIG. 4.

The clear-form step 54 from FIG. 4 continues on FIG. 12 starting with the step of loading the attributes from the attribute table 220. The load-attributes step 220 includes additional steps that were previously disclosed and discussed above starting with the step of finding a table with the format flag "attrTable" 100 as illustrated on FIG. 7. The rest of the steps of FIG. 7 are performed. The last step on FIG. 7 (i.e., return 112) would be a return to the flow-chart listed on FIG. 12 to the step of getting a first block 221. The next step is to get the first field in the block 222. The next step is to determine the type of field 223. If the type of field is a flow field then the next step is to select all text in the flow field and clear 224. If the field type is a user-definable variable then the next step after step 223 is to set the variable to a space and update 225. If the field type is a table then the next step after step 223 is to clear the first row and remove all others 226. The next step after one of the three previous steps (i.e., step 224, 225, or 226) is completed is to get the next field in the block 227. The next step is to determine if another file exists 228. If another field exists then return to the point in the flow-chart starting with the step of determining the field type 223 and follow the flow-chart from that point. If another field does not exist then get the next block 229. The next step is to determine if another block exists 230. If another block exists then return to the point in the flow-chart so that the next step is to get the first field in the block 222 and proceed through the flow-chart from that point. If another block does not exist then the next step is to exit 231.

IV. Data Driven Graphics

The present invention improves upon the graphics capability of FrameMaker® by providing comprehensive tools for creating data driven graphics. This improvement to FrameMaker® is in the form of a C language program called ChartIt. This program may be found in the microfiche appendix to the present invention.

ChartIt provides a command that may be executed in FrameMaker® that allows a table to be charted into eight different types of charts (i.e., column, bar, line, area, stacked, pie, scatter, and high-low). The resulting chart consists of line-drawn graphics in FrameMaker® vector format that may be resized, edited, enhanced, or recreated. ChartIt also offers two different data modes and a rich set of options. A chart may be created using ChartIt with data from a FrameMaker® table, a text-only script file, a text-only data file, and a dialog box. Options include X and Y gridlines, markers, dropline, character formats, size, data labels, smoothing lines, colors, X value angle, axes range, and axes increment. Chart items can be formatted with a dialog box or custom style guides.

The parts of a chart created using ChartIt may include a main title, a subtitle, a Y-axis, one or more Y-axis titles, Y-axis tick marks or gridlines, an X-axis, an X-axis title one or more X-axis, one or more X-axis tick marks or gridlines, one or more series legend labels, one or more data labels, and one or more data markers. A column chart may be used to show an individual figure at a specified time or to illustrate comparisons between items. Categories may be placed on the horizontal axis while values may be placed on the vertical axis. A stacked chart may be used to illustrate a comparison between items and how each item is made up of parts. Categories may be placed on the horizontal axis while values may be placed on the vertical axis. A bar chart may be used to show individual figures at a specific time or to illustrate a comparison between items. Categories may be placed on the vertical axis while values may be placed on the horizontal axis. A pie chart may be used to show the relationship or proportions of parts to a whole. Pie charts are useful for emphasizing a significant element and contains one data series from which percentages are automatically calculated. Different fill patterns may be used to distinguish one section of the pie from another. Colors may also be used to distinguish one section from another, except for a pie chart. A line chart is useful for showing trends or changes in data over a period of time at even intervals and emphasizing time flow and rate of change. Categories may be placed on the horizontal axis while values may be placed on the vertical axis. A scatter chart, commonly referred to as an "XY" chart, may be used to show uneven intervals or clusters of data. Values for various aspects of a category may be placed on both the horizontal axis and the vertical axis. An area chart may be used to show relative importance of values over a period of time with emphasis on the amount of change. Categories may be placed on the horizontal axis while values may be placed on the vertical axis. A high-low chart, commonly referred to as a candlestick chart, may be used to emphasize change. At least two data series must be specified. Categories may be placed on the horizontal axis while values may be placed on the vertical axis. A vertical line is drawn from the first to the second series. Optionally, a tick mark may be placed somewhere on the line to indicate some aspect of the data (e.g., the closing price of a stock as opposed to the high and low of the stock for the same period).

The data used to create a chart using ChartIt may come from a dialog box, from a FrameMaker® table, from a text-only script file, and from a text-only data file. Using a dialog box, all charting data may be entered manually, loaded from a text-only script file, referenced if contained in a text-only data file, and loaded from a FrameMaker® table. Script files containing a subset of the data can be used as style guides. The charting data in the dialog box can be charted and/or written to a script file.

A FrameMaker® table may provide titles, labels, colors, and series data. Two table orientations are possible. Series may be in rows with categories in columns or series may be in columns with categories in rows. The same FrameMaker® table may be used for both. Individual series and/or categories may be excluded from the chart.

A text-only script file may be used for defining a general style guide or all data pertaining to an individual chart. Syntax is based on over eighty keywords.

A text-only data file may be used for defining category labels and Y-axis data values for category-type charts, and X-axis and Y-axis data values for numeric-type charts.

ChartIt allows a user to create charts with category or numeric data. Both types include series data points which may be expressed in numeric strings consisting of an optional minus sign and zero or more digits with an optional decimal point. All charts may be created with categories and series data. Categories consist of labels which are alphanumeric (e.g., Winter 1997). The labels appear at equal intervals along the category axis (i.e., the Y-axis for the bar chart and the pie chart and the X-axis the other charts). A data series consists of a group of data points plotted along the value axis and an optional legend label and color. The data points are the Y values (X values for a bar chart and the size of the slices in a pie chart). In each series, there is one data point for each category label. Two orientations are possible when a FrameMaker® table is used (i.e., data series in rows with categories in columns or visa versa). A line chart, a scatter chart, and an area chart may have values on both the X-axis and the Y-axis. This allows a chart to have ordered pairs of numbers plotted therein.

ChartIt includes options for X-axis and Y-axis gridlines, data labels, markers, smoothing lines, drop lines, size, color, character format, angle of X-axis values, and the format of the axes. A user may specify X-axis and Y-axis gridlines which appear as background grid of equally spaced vertical and horizontal lines (not in the pie chart). The user may also specify a data label which appears as a numeric value at a particular data point in the chart. A user may also specify a marker which appears as a symbol drawn at a data point (mandatory for a scatter chart). A user may also specify that lines be smoothed for a line chart and an area chart. A smoothed line consists of a series of smooth curves instead of a series of angular lines. A user may also specify a drop line which appears as a line drawn from a data point to an axis for a line chart, an area chart, and a scatter chart. A user may also specify the height, width, color, and format in a chart created using ChartIt. The user may specify the font, size, angle, and weight for the titles and labels used in a chart. A user may also specify that the tick-mark labels along the X-axis may be displayed at 0, 30, 45, 60, and 90 degrees. A user may also specify the minimum and maximum values displayed for the value axis (X or Y depending on the type of chart) and increment of tick-mark labels.

Figure 13:
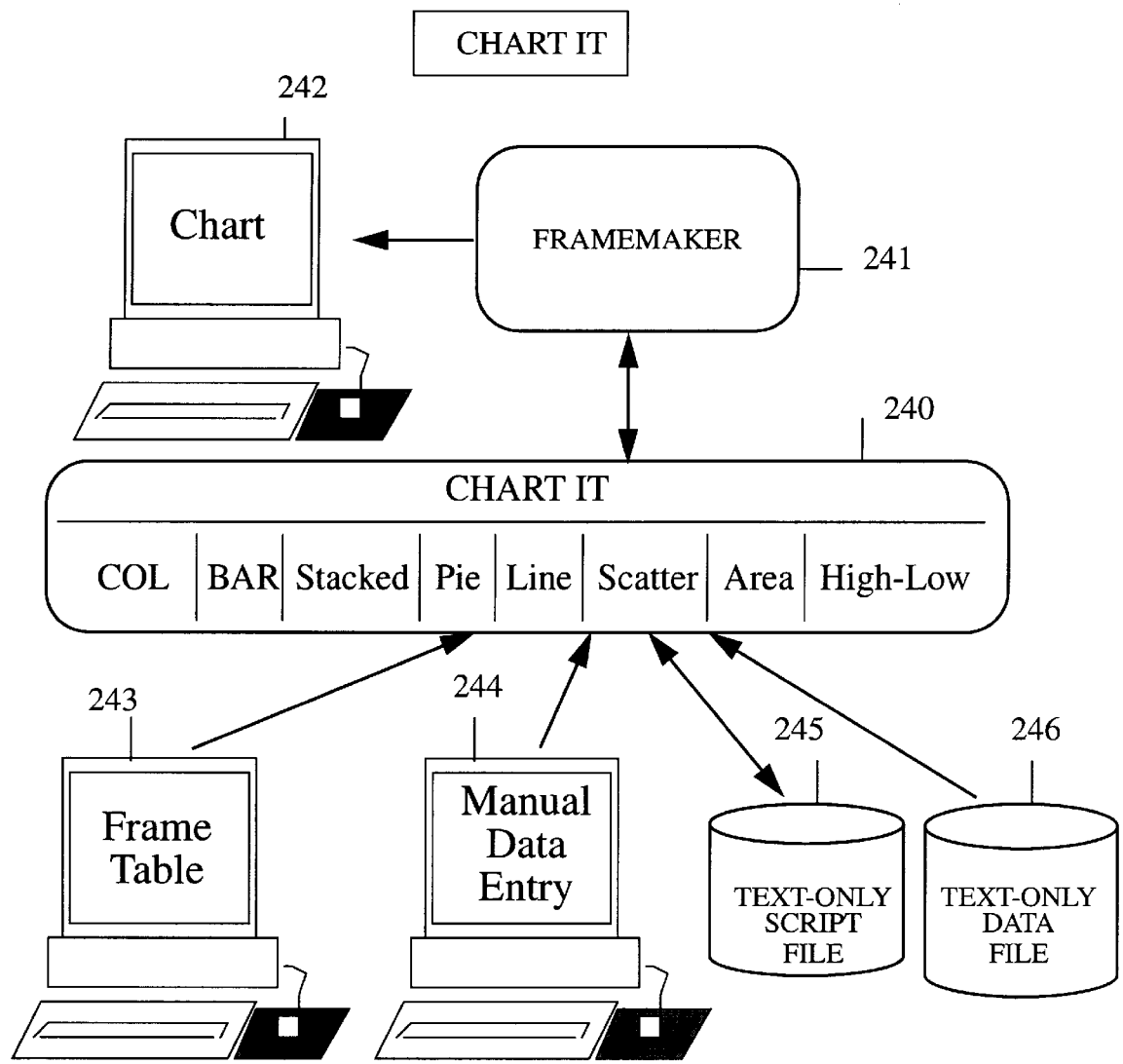
FIG. 13 block diagram of ChartIt.

FIG. 13 is a block diagram of ChartIt as it is used to enhanced FrameMaker®. ChartIt 240, which includes functions for creating a column chart, a bar chart, a stacked chart, a pie chart, a line chart, a scatter chart, an area chart, and a high-low chart, is connected to FrameMaker® 241 so that the used-desired chart may appear on the user's computer 242. The data to be charted may come from a FrameMaker® table, manually entered data 244, a text-only script file 245, or a text-only data file 246.

Figure 14:
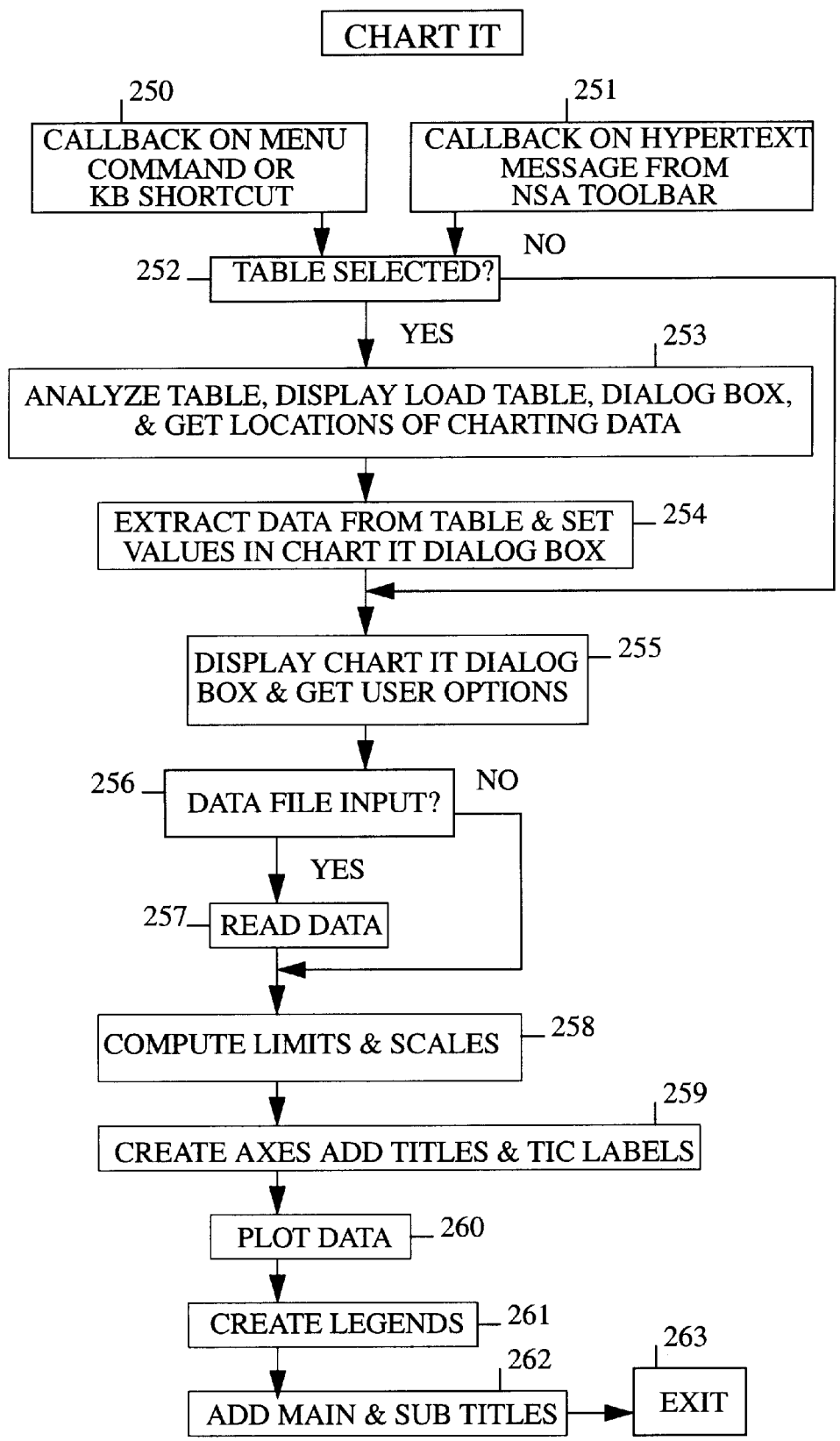
FIG. 14 is a flow-chart of ChartIt.

FIG. 14 is an illustration of the flow-chart associated with ChartIt. The first step in ChartIt may be initiated by either entering a command from a menu or by using a keyboard shortcut command 250 or entering a command using a hypertext message from NSAToolBar 251. The next step in the process is to determine if the data to be charted is from a table 252. If the data is from a table, the following two steps are conducted: analyze the table, display the Load Table dialog box, and get the location of the charting data 253; and extract the data from the table and set values in the ChartIt dialog box 254. After these step are completed or the chart data does not reside in a table then the next step is to display the ChartIt dialog box and get the user options 255. The next step is to determine if that data is from an input file 256. If the chart data is from an input file then read the data 257. After reading the data 257 or if the chart data is not from an input file then compute the limits and scales 258. The next step is to create axes and add titles and tick labels 259. The next step is to plot the data 260. The next step is to create the legends 261. The next step is to add the main titles and subtitles 262. The final step is to exit 263.

V. Collaborating on the Preperation of a Document

The present invention improves upon the creation and editing capability of FrameMaker® by adding the capability for more than one user to collaborate on the creation, editing, and review of a document. This improvement to FrameMaker® is in the form of a C language program called Redline. This program may be found in the microfiche appendix to the present invention.

Redline creates a working group environment, allowing several editors or reviewers to collaborate on preparing a document. Redline allows up to fifteen users to mark-up a document with proposed additions, deletions, and sticky-notes in different colors and styles without having to use complicated character and paragraph formats and anchored frames. Proposed changes are marked by revised text color (i.e., 16 color choices), inserted text mark (i.e., bold, italic, underline, double underline), and revised lines mark (i.e., change bar). The proposed changes may be reviewed individually or collectively for acceptance or rejection.

Figure 15:
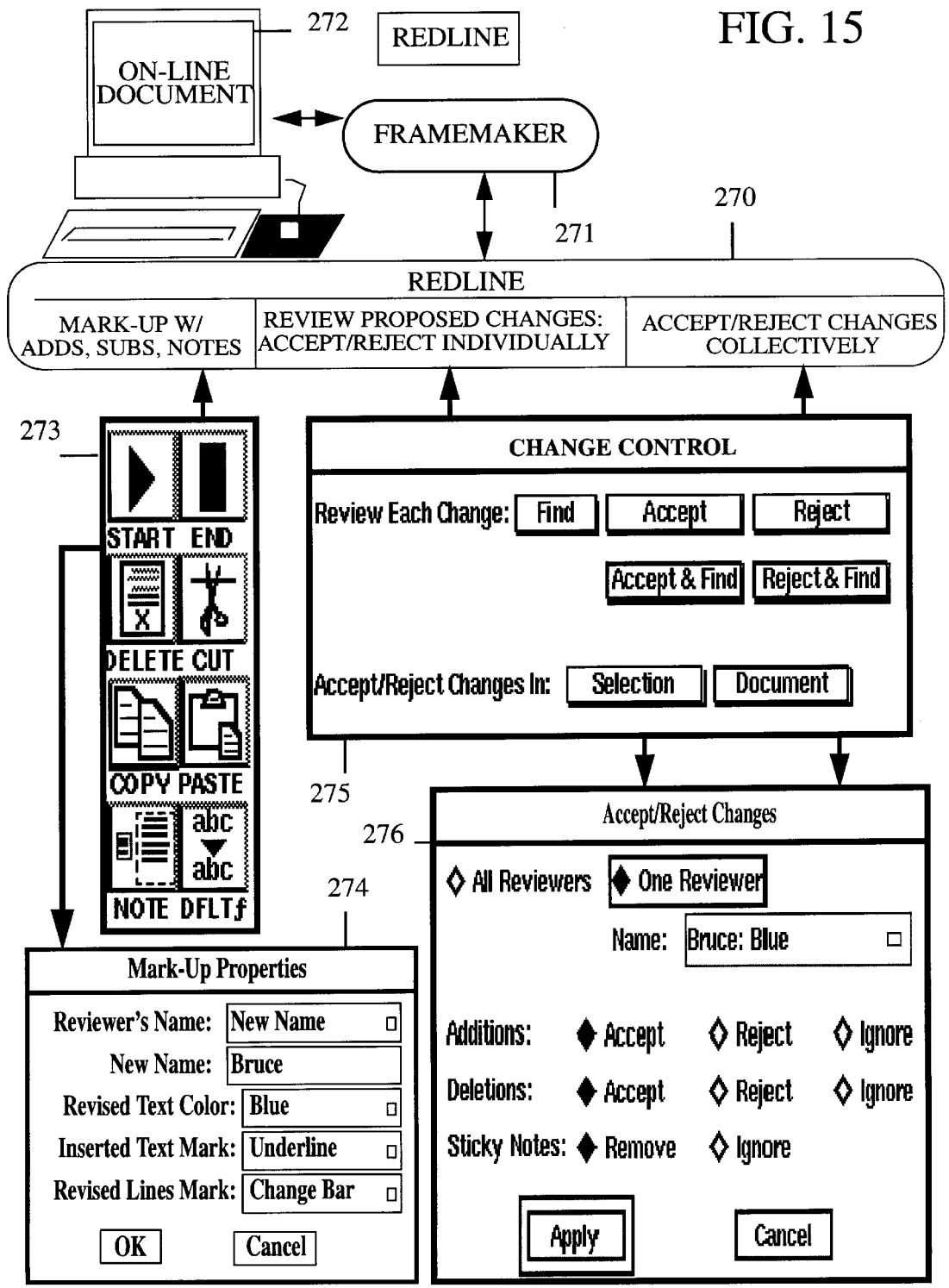
FIG. 15 is a block diagram of Redline.

FIG. 15 is a block diagram of how Redline enhances FrameMaker®. Redline 270 is connected to FrameMaker® 271 and is accessed by a user via a computer 272. Redline 270 includes three main functions (i.e., mark-up with additions, deletions, and sticky notes; review proposed changes and accept/reject individually; and accept/reject proposed changes collectively). The first function may be activated via a toolbar 273 and uses properties selected in a dialog box 274 by the user. The remaining two functions are activated via a change control window 275. The accept/reject selection button in the change control window 275 may be further defined using an accept/reject changes window 276.

Figure 16:
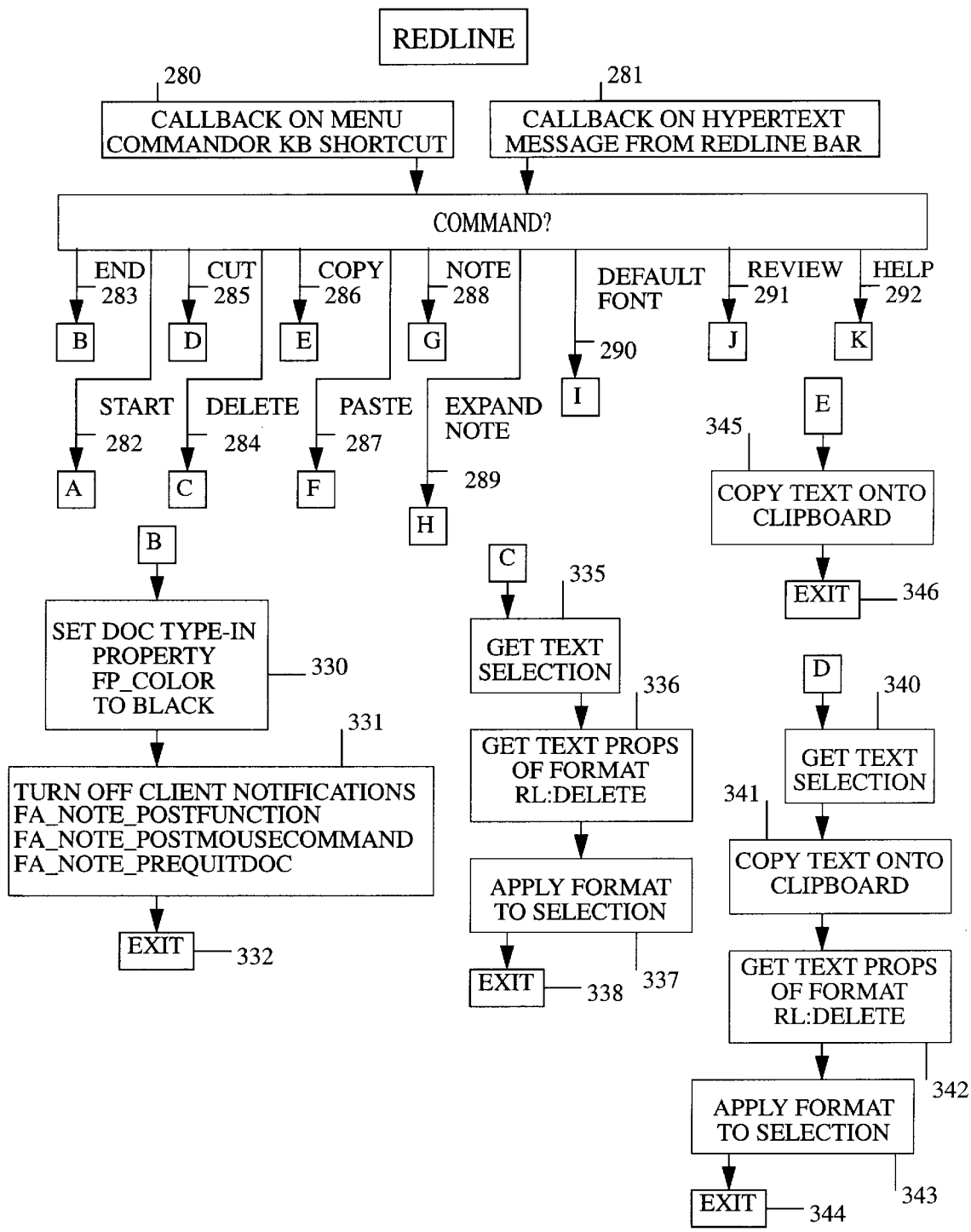
FIG. 16 is a flow-chart of Redline.

FIG. 16 is a flow-chart of Redline. A Redline command is initiated either by the step of using a menu command or a keyboard short cut command 280 or using a hypertext message from Redline Bar 281. The first list of commands available in Redline are listed in FIG. 16 and include start 282, end 283, delete 284, cut 285, copy 286, paste 287, note 288, expand note 289, default font 290, review 291, and help 292. A second list of Redline commands are listed in FIG. 20 and are initiated by the step of using a hypertext message from a change control palette 293. The second list of commands include find 294, accept 295, accept and find 296, reject 297, reject and find 298, process selection 299, and process document 300. The steps of each of these commands are listed in flow-charts contained in FIGS. 16–25.

The flow-chart of the start command 282 continues from FIG. 16 to FIG. 19 starting with the step of creating new colors 310. The next step is to create a paragraph format Redline Note 311. The next step is to display a character catalog and the redline bar 312. The next step is to construct lists of existing reviewers and unassigned colors from Redline Add formats 313. The next step is to set-up and display a Mark-up dialog box 314. The next step is to determine if a new name is present 315. If a new name is not present then the next step is to create Redline Add character format with selected color, inserted text mark, and revised line mark 316. The next step after step 316 is to create Redline Delete character format with selected color, revised line mark, and strike through 317. The next step after step 317 is to set all other properties to "as is" 318. The next step after step 318 or step 315 where it was determined that a new name was present is to set the document type-in properties to those of Redline Add 319. The next step is to turn on client notifications FA_Note_PostFunction, FA_Note_PostMouseCommand, and FA_Note_PreQuitDoc 320. The final step in the start command 282 is to exist 321.

The end command 283 continues on FIG. 16 and starts with the step of setting the document type-in property FP_Color to black 330. The next step is to turn off client notifications FA_Note_PostFunction, FA_Note_PostMouseCommand, and FA_Note_PreQuitDoc 331. The final step in the end command 283 is to exit 332.

The delete command 284 continues on FIG. 16 starting with the step of getting the text selection 335. The next step is to get the text properties of format Redline Delete 336. The next step is to apply the format to the selection 337. The final step in the delete command 284 is to exit 338.

The cut command 285 continues on FIG. 16 starting with the step of getting the text selection 340. The next step is to copy the text onto the clipboard 341. The next step is to get the text properties of the format Redline Delete 342. The next step is to apply the format to the selection 343. The final step in the cut command 285 is to exit 344.

The copy command 286 continues on FIG. 16 starting with the step of copying the text to the clipboard 345. The final step in the copy command is to exit 346.

Figure 17:
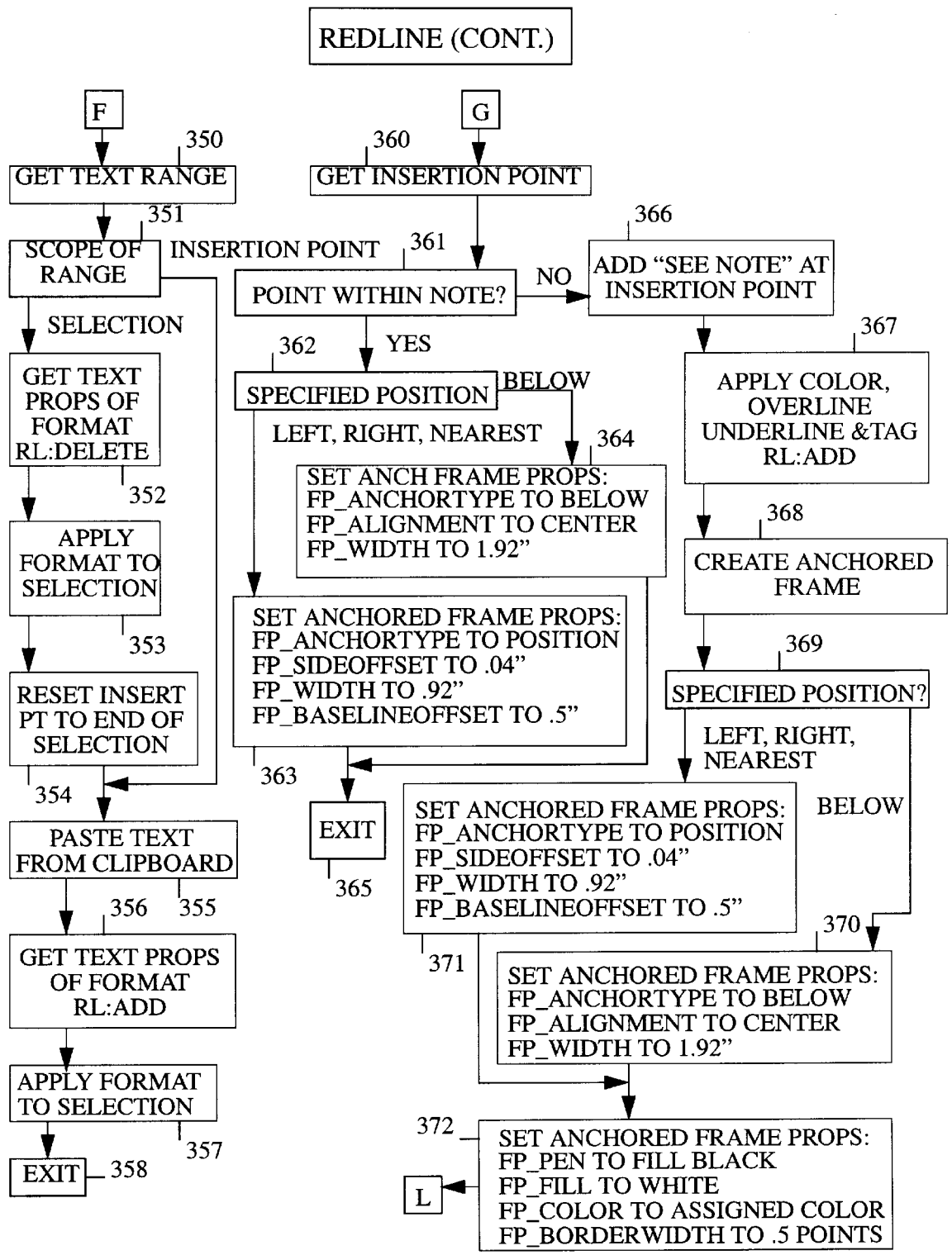
FIG. 17 is a continuation of FIG. 16.

The paste command 287 continues from FIG. 16 to FIG. 17 starting with the step of getting the text range 350. The next step is to determine the scope of the text range 351. If the scope of the text range is a selection then the next step is to get the text properties of the format for Redline Delete 352. The next step after step 352 is to apply the format to the selection 353. The next step after step 353 is to reset the insertion point to the end of the selection 354. The next step after step 354 or if the scope of the text range 351 is an insertion point then the next step is to paste the text from the clipboard 355. The next step is to get the text properties of the format Redline Add 356. The next step is to apply the redline Add format to the selection. The final step in the paste command 287 is to exit 358.

The note command 288 continues from FIG. 16 to FIG. 17 starting with the step of getting the insertion point 360. The next step is to determine if the insertion point is within a note 361. If the insertion point is within a note then the next step is to determine the specified position 362. If the specified position is left, right, or nearest then the next step after step 362 is to set the anchored frame properties as follows: FP_AnchorType to position; FP_SideOFFSET to 0.04"; FP_Width to 0.92"; and FP_BaselineOffset to 0.5"363. If the specified position 362 is below then the next step is to set the anchored frame properties as follows: FP_AnchorType to below; FP_Alignment to center; and FP_Width to 1.92"364. The next step after either step 363 or 364 is to exit 365. If the point is not within a note 361 then the next step is to add "See Note" at the insertion point 366. The next step after step 366 is to apply color, overline, underline, apply tag Redline Add 367. The next step after step 367 is to create an anchored frame 368. The next step after step 368 is to determine the specified position 369. If the specified position 369 is below then the next step is to set the anchored frame properties as follows: FP_AnchorType to below; FP_Alignment to center; and FP_Width to 1.92"370. If the specified position 369 is left, right, or nearest then the next step is to set the anchored frame properties as follows: FP_AnchorType to position; FP_SideOffset to 0.04"; FP_Width to 0.92"; and FP_BaselineOffset to 0.5"371. The next step after either step 370 or 371 is to set the anchored frame properties as follows: FP_Pen to Black; FP_Fill to white; FP_Color to assigned color; and FP_BorderWidth to 0.5 points 372. The next step after step 372 continues on FIG. 18 with the step of creating a text frame within the anchored frame 373. The next step after step 373 is to change the first paragraph properties to Redline Note 374. The next step after step 374 is to place the insertion point within the first paragraph 375. The final step in the note command 288 is to exit 376.

Figure 18:
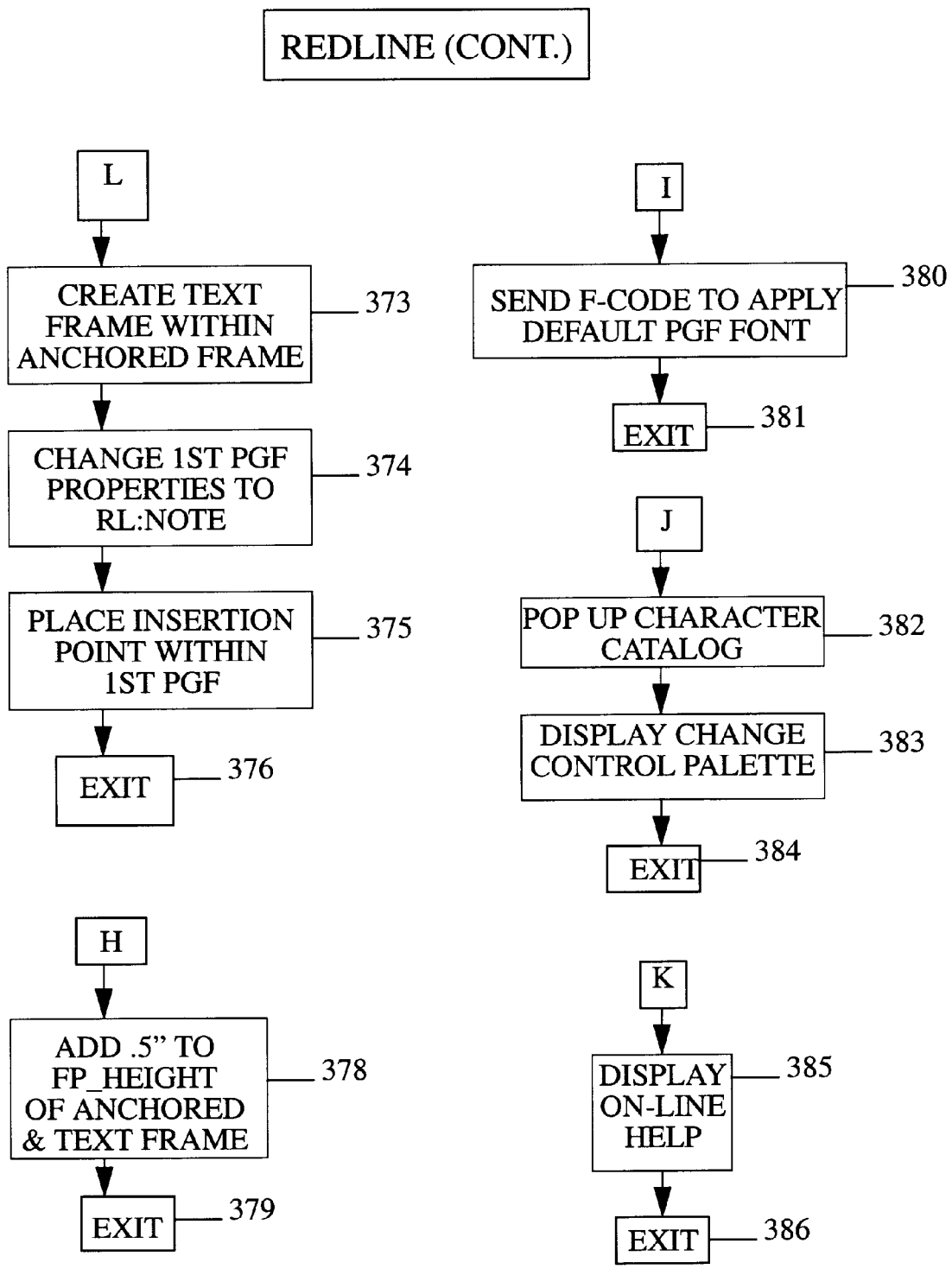
FIG. 18 is a further continuation of FIG. 16.

The expand note command 289 continues from FIG. 16 to FIG. 18 starting with the step of adding 0.5"to FP_Height of the anchored frame and the text frame 378. The final step in the expand note command 289 is to exit 379.

The default font command 290 continues from FIG. 16 to FIG. 18 starting with the step of sending f-codes to apply default paragraph font 380. The final step in the default font command 290 is to exit 381.

The review command 291 continues from FIG. 16 to FIG. 18 starting with the step of popping-up the character catalog 382. The nest step is to display the change control palette 383. the final step of the review command 291 is to exit 384.

The help command 292 continues from FIG. 16 to FIG. 18 starting with the step of displaying on-line help 385. The final step in the help command 292 is to exit 386.

Figure 19:
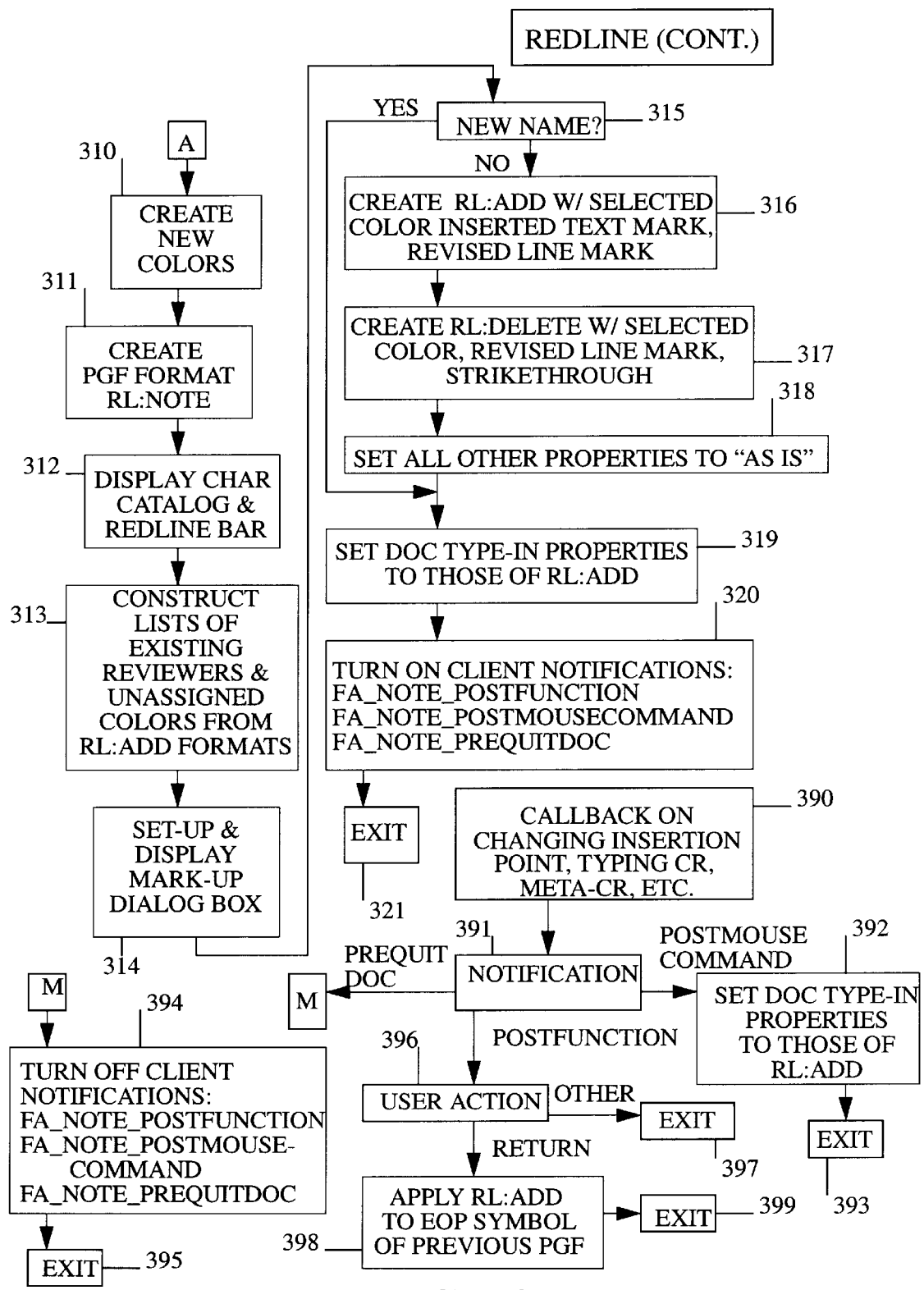
FIG. 19 is a further continuation of FIG. 16.

Another function in Redline which is listed on FIG. 19 is invoked when the user changes the insertion point, types a carriage return, or adds text to the document 390. The first step is to determine the type of notification 391. If the type of notification is from a PostMouse command then the next step is to set the document type-in properties to those of Redline Add 392. The next step after step 392 is to exit 393. If the type of notification in step 391 is a PreQuit Document notification then the next step after step 391 is to turn off the following client notifications: FA_Note_PostFunction; FA_Note_PostMouseCommand; and FA_Note_PreQuitDoc. The next step after step 394 is to exit 395. If the type of notification is PostFunction then the next step after step 391 is to determine the type of user action 396. If the type of user action is hitting a key that is not the return then the next step after step 396 is to exit 397. If the type of user action is hitting the return key then the next step after step 396 is to apply Redline Add to the EOP symbol of the previous paragraph 398. The next step after step 398 is to exit 399.

The find command 294 starts with the step of finding a marked addition, deletion, or sticky note 400. The step 400 of finding a marked addition, deletion, or stick note includes steps that continue on FIG. 21 starting with the step of getting a paragraph and text item containing the insertion point 401. The next step is to get the next text item 402. The next step is to determine if another item exists 403. If another item does not exist then the next step is to get the first text item of the next paragraph 404. The step of getting the first text item of the next paragraph 404 branches to additional steps listed on FIG. 21 which are described below. The next step after either step 403 or 404 is to get the text properties of the text item 405. The next step is to determine if the tag prefix is a Redline format 406. If the tag prefix is not a Redline format then the next step is to return to the point in the flow-chart of the find command 294 so that the next step is to get the next text item 402. If the tag prefix is a Redline format then the next step after step 406 is to extend the selection to subsequent marked lines 407. The next step after step 408 is to return to the step of finding marked addition, deletion, or sticky note 400 so that the next step is to exit 409.

Figure 21:
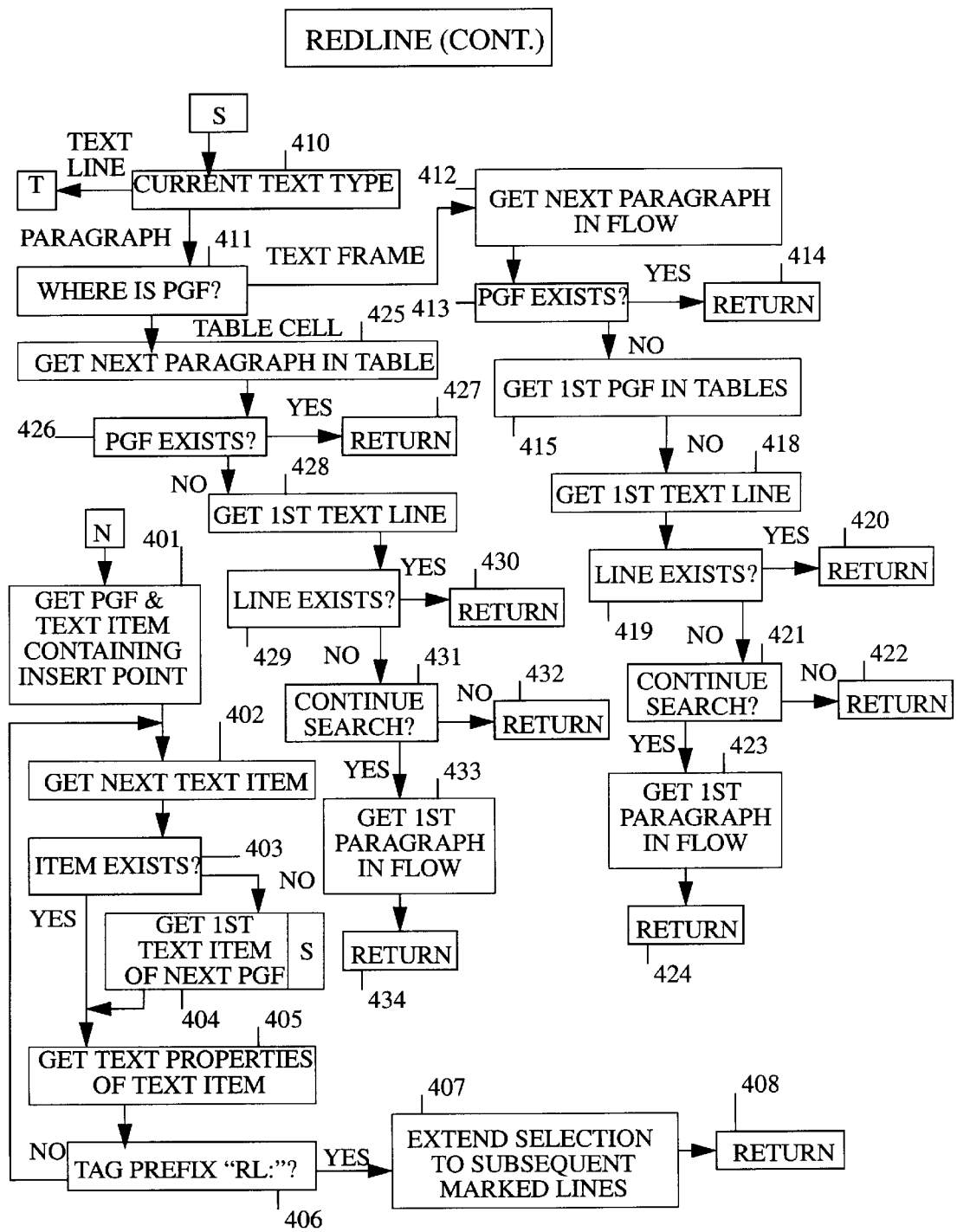
FIG. 21 is a further continuation of FIG. 16.

The step of getting the first text item of the next paragraph 404 in the find command 294 branches to additional steps contained in FIG. 21 where the first step is to determine the current type of the text 410. If the current text type is paragraph then the next step is to determine where the paragraph resides 411. If the paragraph is in a text frame then the next step is to get the next paragraph in flow 412. The next step after step 412 is to determine if that paragraph exists 413. If the paragraph exists then the next step after step 413 is to return 414 to step 404 so that the next step is step 405. If the paragraph does not exist then the next step after step 413 is to get the first paragraph in tables 415. The next step after step 415 is to determine if that paragraph exists 416. If that paragraph exists then the next step is to return 417 to step 404 so that the next step is step 405. If that paragraph does not exist the next step after step 416 is to get the first text line 418. The next step after step 418 is to determine if that line exists 419. If that line exists then the next step after step 419 is to return 420 to step 404 so that the next step is step 405. If the line does not exist then the next step after step 419 is to determine whether or not to continue the search 421. If a search should not be continued then the next step after step 421 is to return 422 to step 404 so that the next step is step 405. If the search should continue then the next step after step 421 is to get the first paragraph in flow 423. The next step after step 423 is to return 424 to step 404 so that the next step is step 405.

If it is determined in step 411 that the paragraph is located in a table cell then the next step after step 411 is to get the next paragraph in the table 425. The next step after step 425 is to determine if that paragraph exists 426. If that paragraph exists then the next step after step 426 is to return 427 to step 404 so that the next step is step 405. If that paragraph does not exist then the next step after step 426 is to get a first text line 428. The next step after step 428 is to determine if that line exists 429. If that line exists then the next step after step 429 is to return 430 to step 404 so that the next step is step 405. If that line does not exist then the next step after step 429 is to determine whether or not to continue the search 431. If it is determined to stop searching then the next step after step 431 is to return 432 to step 404 so that the next step is step 405. If the search should continue then the next step after step 431 is to get the first paragraph in the flow 433. The next step after step 433 is to return 434 to step 404 so that the next step is step 405.

Figure 22:
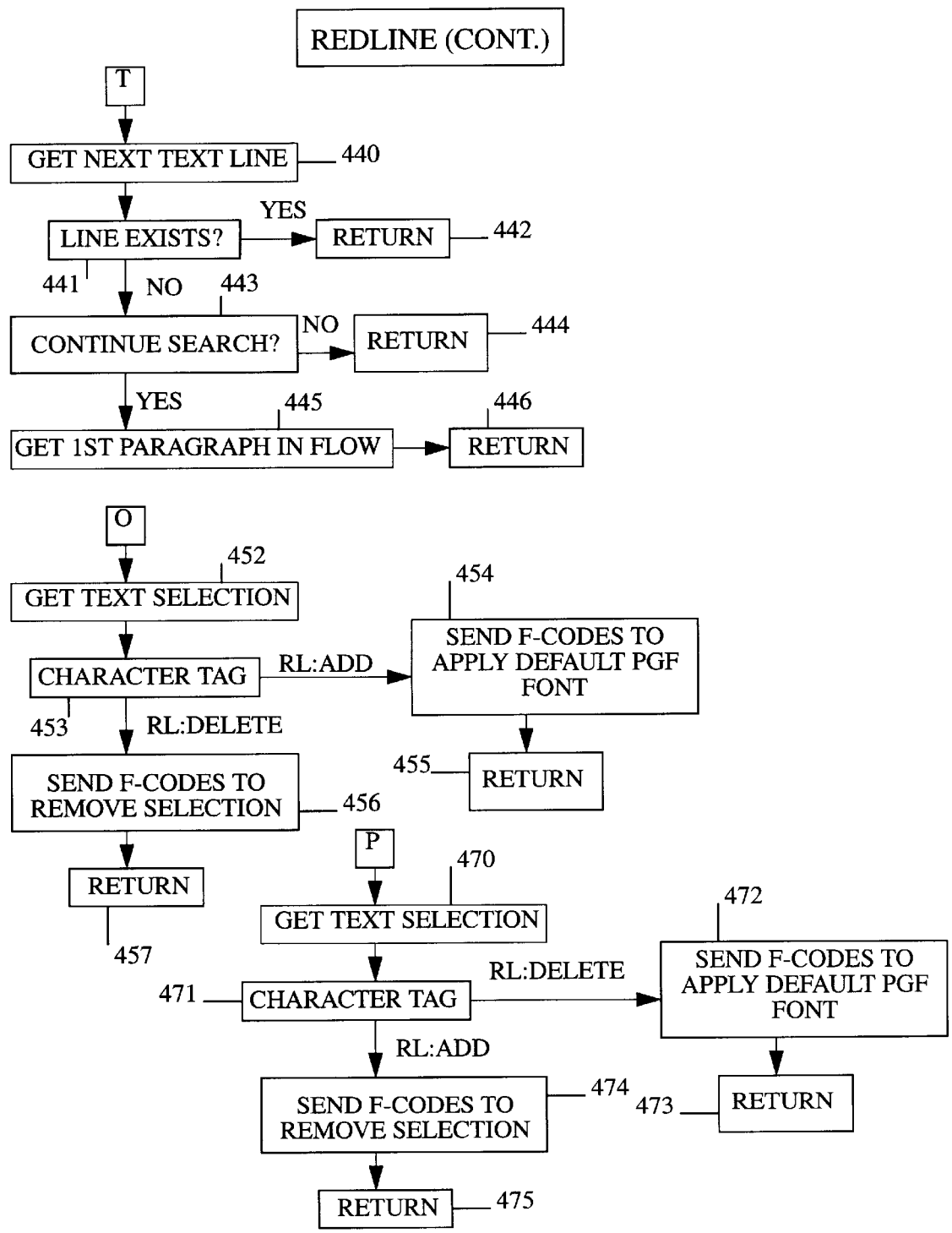
FIG. 22 is a further continuation of FIG. 16.

If the current text type in step 410 is determined to be a text line then the flow-chart branches to additional step in FIG. 22 starting with the step of getting the next text line 440. The next step after step 440 is to determine if that text line exists 441. If that text line exists then the next step after step 441 is to return 442 to step 404 in FIG. 21 so that the next step is step 405. If that line does not exist then the next step after step 441 is to determine whether or not the search should continue 443. If the search should not continue then the next step after step 443 is to return 444 to step 404 in FIG. 21 so that the next step is step 405. If the search should continue then the next step after step 443 is to get the first paragraph in the flow 445. The next step after step 445 is to return 446 to step 404 in FIG. 21 so that the next step is step 405.

Figure 20:
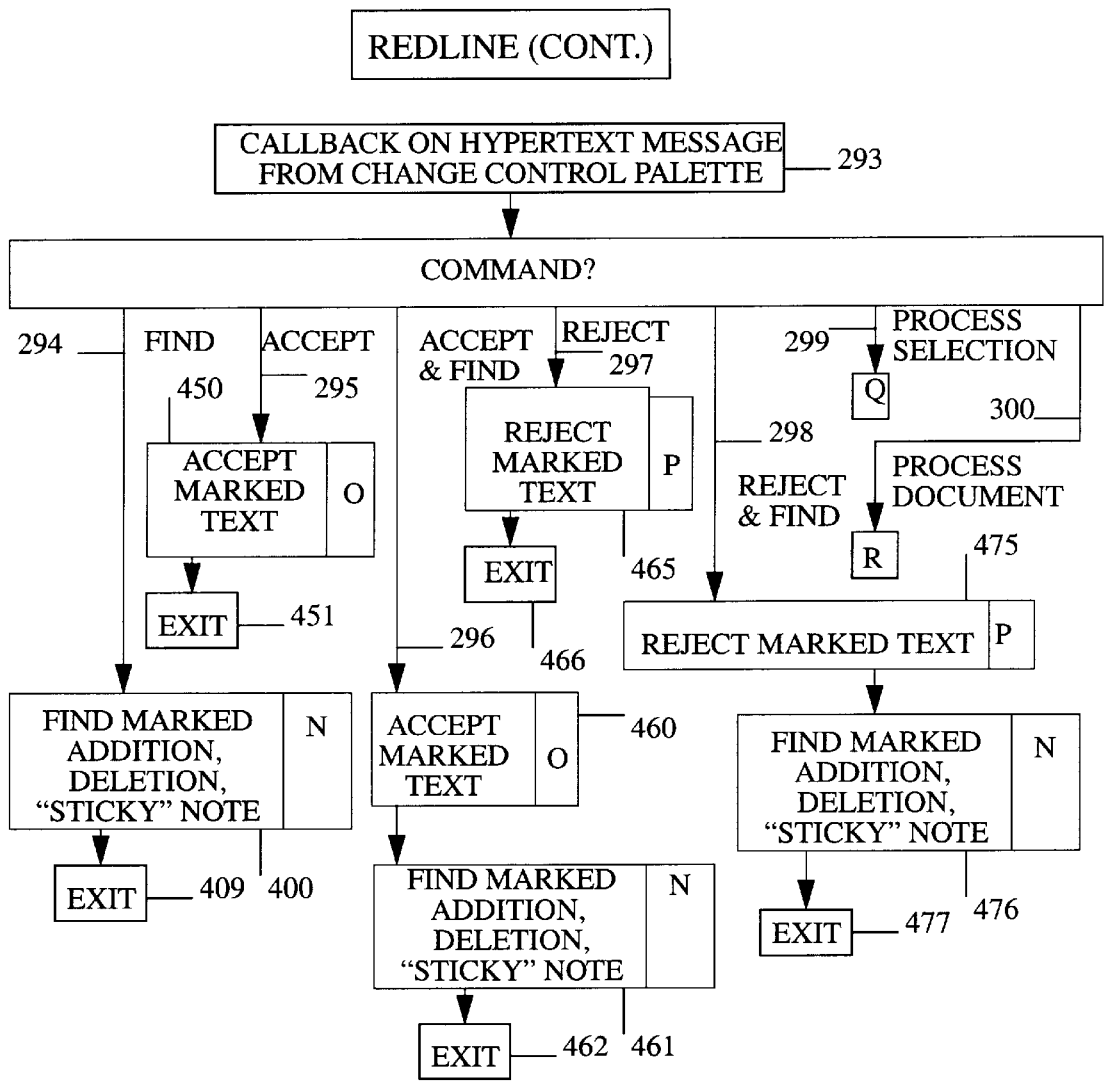
FIG. 20 is a further continuation of FIG. 16.

The accept command 295 in FIG. 20 starts with the step of accepting marked text 450. Step 450 branches to additional steps in FIG. 22 as described below. The next step after step 450 is to exist 451.

Step 450 in the accept command 295 branches to additional steps in FIG. 22 starting with the step of getting the selected text 452. The next step is to determine the character tag of the selected text 453. If the character tag is Redline Add then the next step after step 453 is to send f-codes to apply default paragraph fonts 454. The next step after step 454 is to return 455 to step 450 in FIG. 20. If the character tag in step 453 is determined to be Redline Delete then the next step after step 453 is to send f-codes to remove the selected text 456. The next step after step 456 is to return 457 to step 450 in FIG. 20.

The accept and find command 296 in FIG. 20 starts with the step of accepting the marked text 460. Step 460 branches to additional steps in FIG. 22 starting with step 452. A return from the branch would return to step 460 in FIG. 20. The next step after step 460 is completed is to find a marked addition, deletion, or sticky note 461. Step 461 branches to additional steps in FIG. 21 starting with step 401. The return from the branch would return to step 461 in FIG. 20.

The reject command 297 starts with the step of rejecting marked text 465. Step 465 branches to additional steps in FIG. 22 which will be described below. Upon return from the branch, the next step is to exit 466.

The first step in the branch from step 465 in FIG. 20 is the step in FIG. 22 of getting the selected text 470. The next step is to determine the type of character tag 471. If the character tag is Redline Delete then the next step is to send the f-codes to apply default paragraph fonts 472. The next step after step 472 is to return 473 to step 465 in FIG. 20. If the character tag is Redline Add then the next step is to send f-code to remove the selection 474. The next step after step 474 is to return 475 to step 465 of FIG. 20.

The reject and find command 298 of FIG. 20 starts with the step of rejecting marked text 475. Step 475 branches to additional steps in FIG. 22 starting with step 470. Any return from this branch would return to step 475 in FIG. 20. The next step after step 475 is completed is to find a marked addition, deletion, or sticky note 476. Step 476 branches to additional steps in FIG. 21 starting with step 401. Any return from this branch would return to step 476 in FIG. 20. The next step after step 476 is completed is to exit 477.

Figure 23:
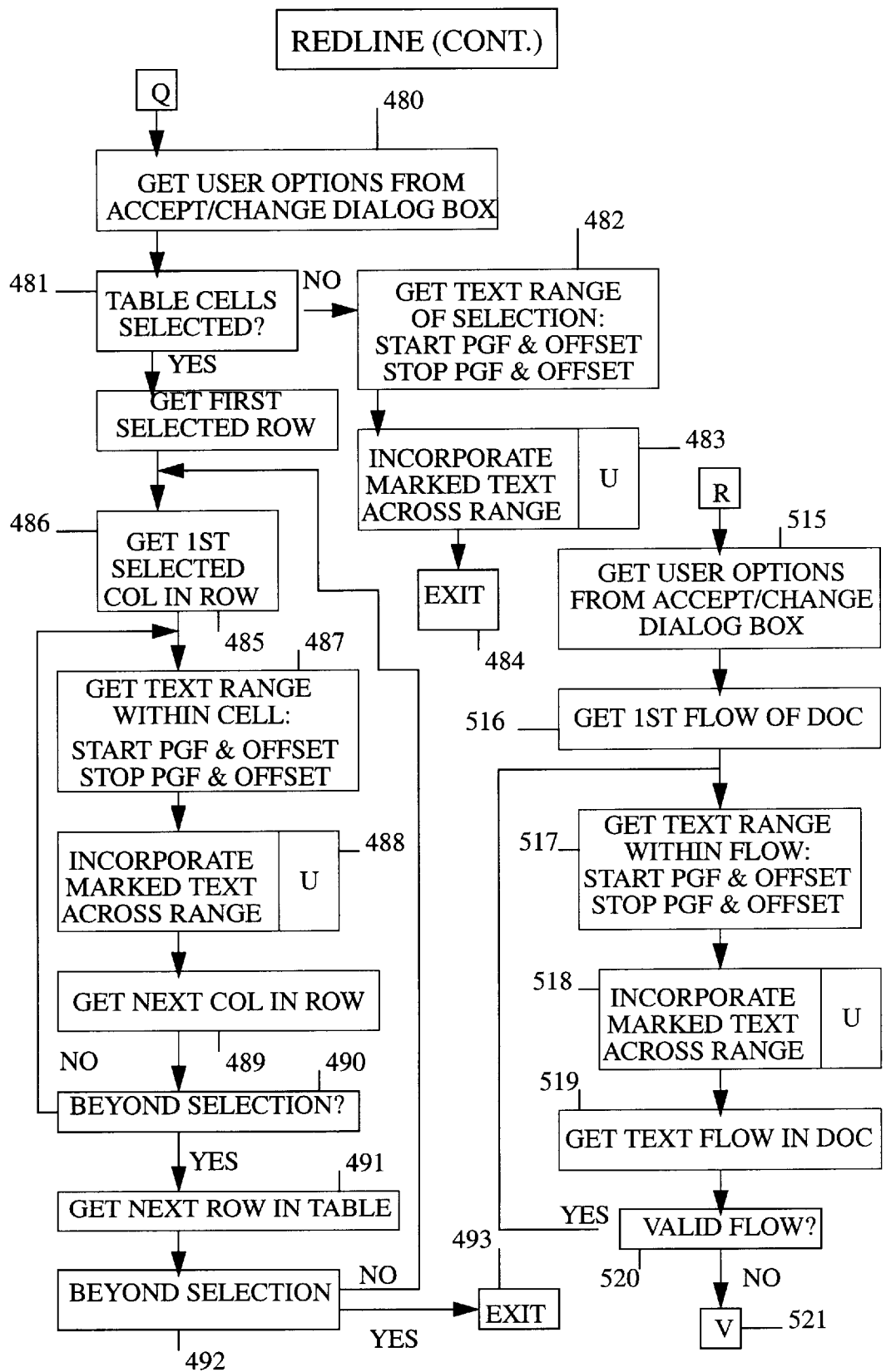
FIG. 23 is a further continuation of FIG. 16.

The process selection step 299 in FIG. 20 branches to additional steps in FIG. 23 starting with the step of getting the user's options from the accept/change dialog box 480. The next step is to determine if table cells were selected 481. If table cells were not selected then the next step is to get the text range of the selection 482. The next step after step 482 is to incorporate the marked text across the range 483. Step 483 branches to additional steps in FIG. 24 which will be described below. The next step after step 483 is completed is to exit 484. If table cells are selected then the next step after step 481 is to get the first selected row 485. The next step after step 485 is to get the first selected column in the row 486. The next step after step 486 is to get the text range within the cell 487. The next step after step 487 is to incorporate marked text across the range 488. Step 488 branches to additional steps in FIG. 24 which will be described below. The next step after step 488 is completed is to get the next column in the row 489. The next step after step 489 is to determine if the next column is beyond the selection 490. If the column is not beyond the selection then return to the point in the flow-chart where the next step is to get the text range within the cell 847 and proceed from there. If the next column is beyond the selection then the next step is to get the next row in the table 491. The next step after step 491 is to determine if the next row is beyond the selection 492. If the next row is not beyond the selection then return to the point in the flow-chart where the next step is to get the first selected column in the row 486 and proceed from there. If the next row is beyond the selection then exit 493.

Figure 24:
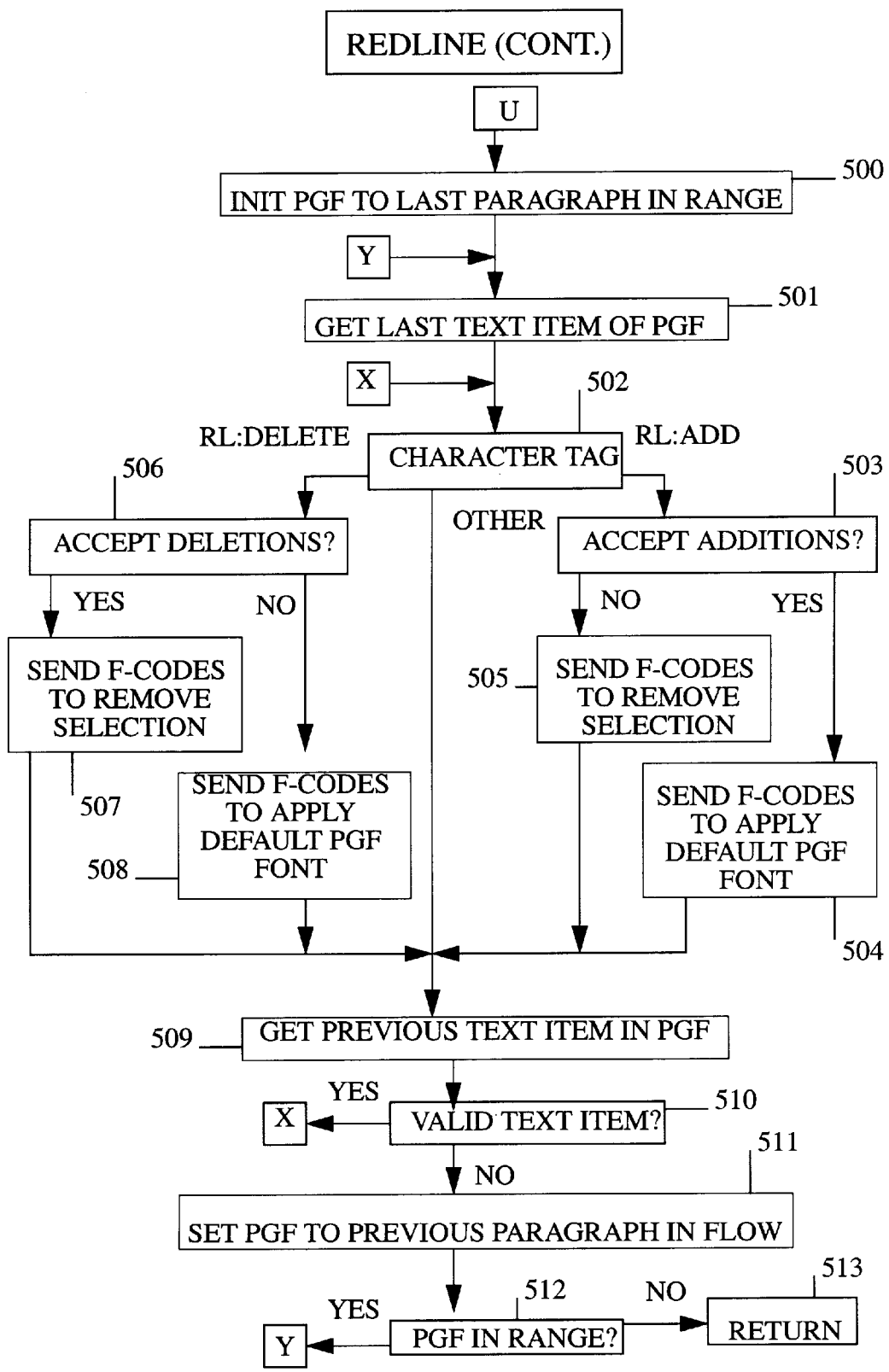
FIG. 24 is a further continuation of FIG. 16.
Figure 25:
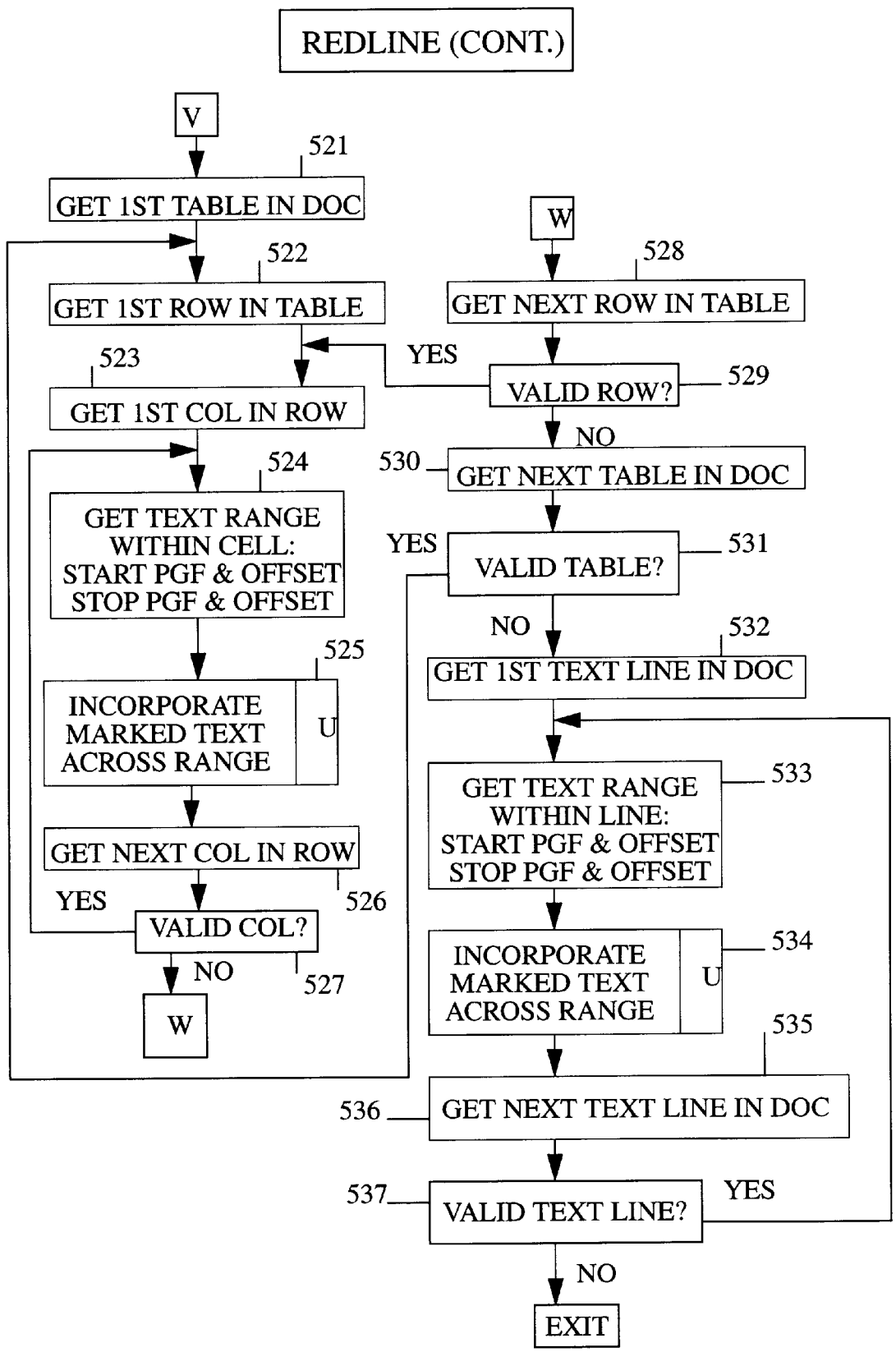
FIG. 25 is a further continuation of FIG. 16.

Step 483 and 488 in FIG. 23 each branch to the same additional steps in FIG. 24 starting with the step of initializing the paragraph to the last paragraph in the range 500. The next step is to get the last text item of the paragraph 501. The next step is to determine the character tag 502. If the character tag is Redline Add then the next step after step 502 is to determine whether or not to accept the additions 503. If the additions are accepted then the next step after step 503 is to send f-codes to apply the default paragraph font 504. If the additions are not accepted then the next step after step 503 is to send f-codes to remove the selection 505. If the character tag is Redline Delete then the next step after step 502 is to determine whether or not to accept the deletions 506. If the deletions are accepted then the next step after step 506 is to send f-codes to remove the selection 507. If the deletions are not accepted then the next step after step 506 is to send f-codes to apply the default paragraph font 508. The next step after either step 505, 505, 507, or 508 is to get the previous text item in the paragraph 509. The next step is to determine if the text item is valid 510. If the text item is valid then return to step 502 in the flow-chart and proceed from there. If the text item is not valid then set the paragraph to the previous paragraph in the flow 511. The next step is to determine whether or not the paragraph is within the range 512. If the paragraph is within the range then return to step 501 in the flow-chart and proceed from there. If the paragraph is not within the range then return 513 to the step that branched to these additional steps (e.g., steps 483 and 488 in FIG. 23).

The process document command 300 in FIG. 20 branches to additional steps in FIG. 23 starting with the step of getting the user options from the accept/change dialog box 515. The next step is to get the first flow of the document 516. The next step is to get the text range within the flow 517. The next step is to incorporate the marked text across the range 518. Step 518 branches to additional steps in FIG. 24 starting with step 500. Upon return from the branch, the next step is to get the next flow in the document 519. The next step is to determine whether or not the flow is valid 520. If the flow is valid, return to step 517 and proceed from there. If the flow is not valid, branch to additional steps in FIG. 25 starting with getting the first table in the document 521. The next step is to get the first row in the table 522. The next step is to get the first column in the row 523 the next step is to get the text range within the cell 524. The next step is to incorporate the marked text across the range 525. Step 525 branches to additional steps in FIG. 24 starting with step 500. Upon returning from those additional steps, the next step is to get the next column in the row 526. The next step is to determine whether or not the column is valid 527. If the column is valid then return to step 524 and proceed from there. If the column is not valid then get the next row in the table 528. The next step is to determine whether or not the row is valid 529. If the row is valid then return to step 523 and proceed from there. If the row is not valid then get the next table in the document 530. The next step is to determine whether or not the table is valid 531. If the table is valid then return to step 522 and proceed from there. If the table is not valid then get the first text line in the document 532. The next step is to get the text range within the line 533. The next step is to incorporate the marked text across the range 534. Step 534 branches to additional steps in FIG. 24 starting with step 500. Upon the return from these additional steps, the next step is to get the next text line in the document 535. The next step is to determine whether or not the text line is valid 536. If the text line is valid then return to step 533 and continue from there. If the text line is not valid then exit 537.

VI. Productivity Tools

The present invention improves upon the efficiency, speed, and, therefore, the productivity of a user of FrameMaker® by adding the capability to make existing FrameMaker® functions easier to do. These improvements to FrameMaker® are in the form of a number of C language programs called NSAToolbar, FileManager, and PersonalPreferences. These programs may all be found in the microfiche appendix to the present invention.

NSAToolbar provides a user with more than 120 visual keyboard shortcuts in six categories. That is, instead of a user having to type a particular keyboard shortcut or select a command from a walking menu several levels deep,, the user need only click on the corresponding graphics icon provided by NSAToolbar to do the same thing. By using NSAToolbar, the user is much more productive because the user doesn't have to remember the keyboard shortcut and clicking on an icon is faster that typing a series of keyboard keys. The six categories in the NSAToolbar are common commands, text editing commands, paragraph/pagination commands, graphics commands, graphics editing commands, and table editing commands. NSAToolbar also includes icons that allow a user to automatically execute multiple steps (i.e., SilentSave, MicroRotate, SilentPrint, SingleLevelMove, and DashedPattern). SilentSave enables a user to save a file in a variety of formats without setting multiple parameters in a dialog box. SilentPrint enables a user to print a file without filling out a dialog box. MicroRotate enables a user to rotate an image by as little as one degree. New functionality provided by NSAToolbar includes object level moving which enables a user to move the selected graphic objects being worked on one level up or down from its present location. Other aspects of the present invention may be invoked from NSAToolbar (e.g., FileManager, DropShadow, AddColumns, PersonalPreferences, TableSort, and ChartIt).

NSAToolbar consists of a palette of buttons that add new functionality as well as provide easier access to existing commands. New functionality includes silently print current or all pages of an opened document (Print dialog box is not displayed but its settings are used); silently save opened documents as Text Only, Interchange, or PostScript; move a graphics object one level up or down; rotate an object one degree in either direction; create a drop shadow with fixed offset and fill; invoke export clients (i.e., UNIX Compression, GZIP Compression, DES Encryption); invoke PersonalPreferences; invoke ChartIT; invoke SumColumns; and invoke TableSort.

PersonalPreferences allows a user of FrameMaker® to automatically set session and document properties such as change bar, flow, print, typographic, conditional, footnote, table footnote, and view.

FileManager allows a user of FrameMaker® to copy a file, rename a file, delete a file, and print a file without opening it. The document may be printed using the print settings of another document.

Figure 26:
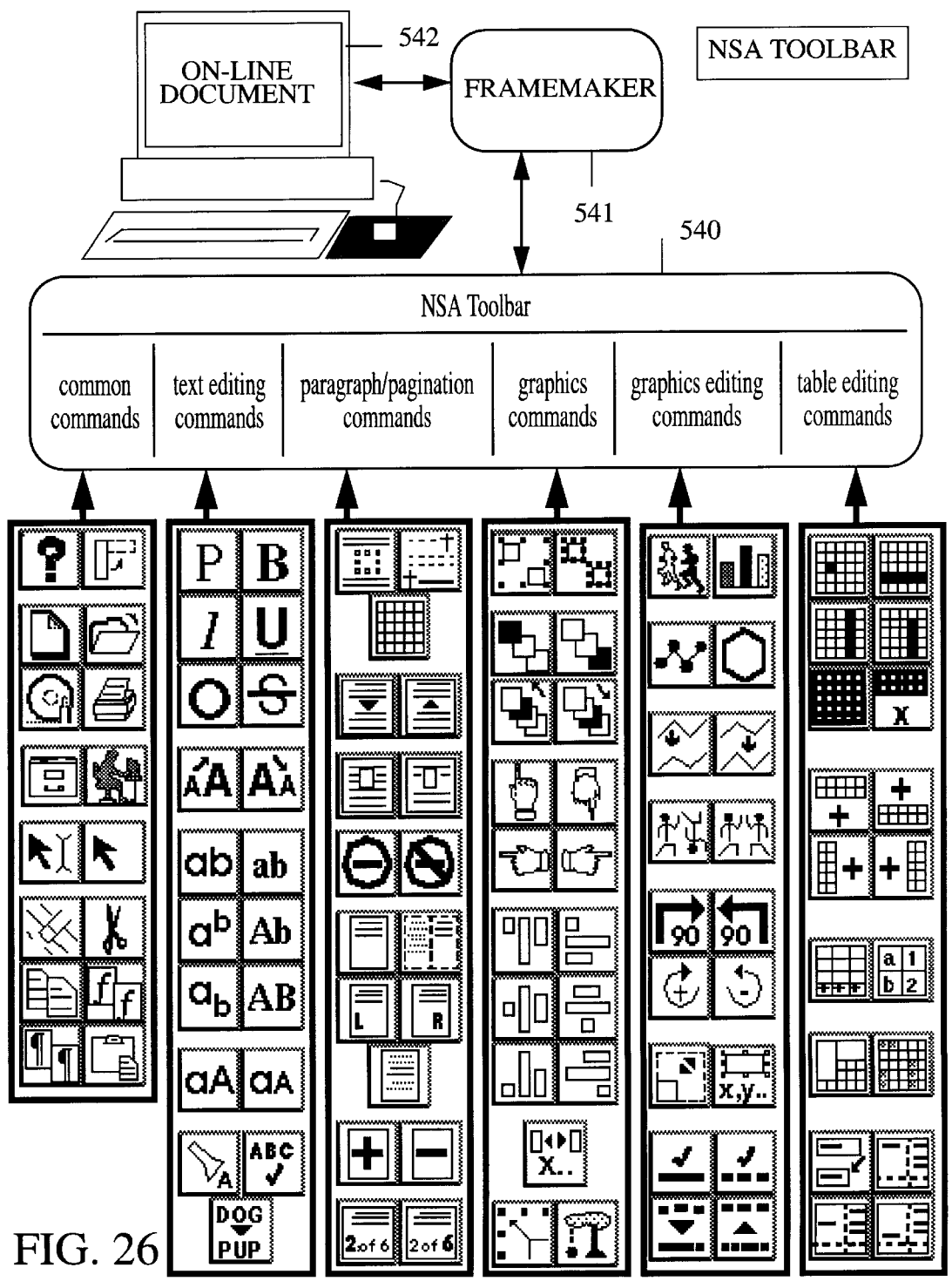
FIG. 26 is a block diagram of NSAToolbar.

FIG. 26 is a block diagram of NSAToolbar 540 and how it enhances FrameMaker® 541 by allowing a user to access via a computer 542 the NSAToolbar commands which include common commands, text editing commands, paragraph/pagination commands, graphics commands, graphics editing commands, and table editing commands. The toolbars for each of these sets of commands are illustrated in FIG. 26.

The flow-charts for the NSAToolbar commands are illustrated in FIGS. 27–30. The NSAToolbar commands include existing FrameMaker® commands 545, other API clients 546, help 547, flip toolbar 548, silent save as MIF 549, save as text-only 550, silent save as Postscript 551, silent print all pages 552, silent print current pages 553, capital case normal 554, move graphics forward one level 555, move graphics back one level 556, rotate graphics plus one degree 557, and rotate graphics minus one degree 558.

Figure 27:
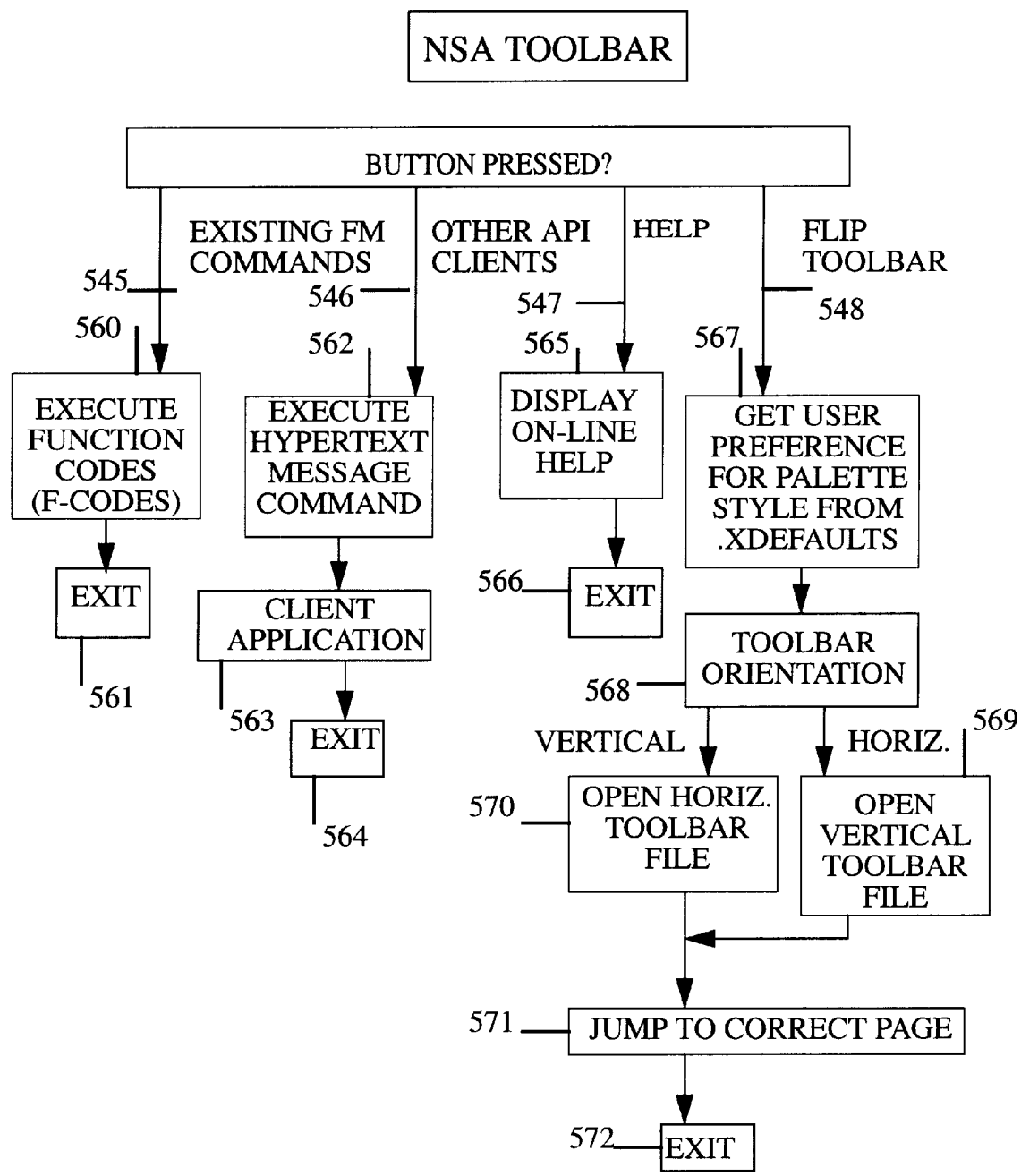
FIG. 27 is a flow-chart of NSAToolbar.

The first step in the existing FrameMaker® commands 545 in FIG. 27 is to execute the function codes (f-codes) 560. The next step is to exit 561.

The first step in the other API clients commands 546 in FIG. 27 is to execute a hypertext message command 562. The next step is to select the client application 563. The next step is to exist 564.

The first step in the help command 547 in FIG. 27 is to display the on-line help commands 565 and select the one desired. The next step is to exit 566.

The first step in the flip toolbar command 548 is to get the user preference for palette style 567. The next step is to determine the toolbar orientation 568. If the toolbar orientation is horizontal then the next step is to open the vertical toolbar file 569. If the toolbar orientation is vertical then open the horizontal toolbar file 570. After either step 569 or 570, the next step is to jump to the correct page 571. The next step is to exit 572.

Figure 28:
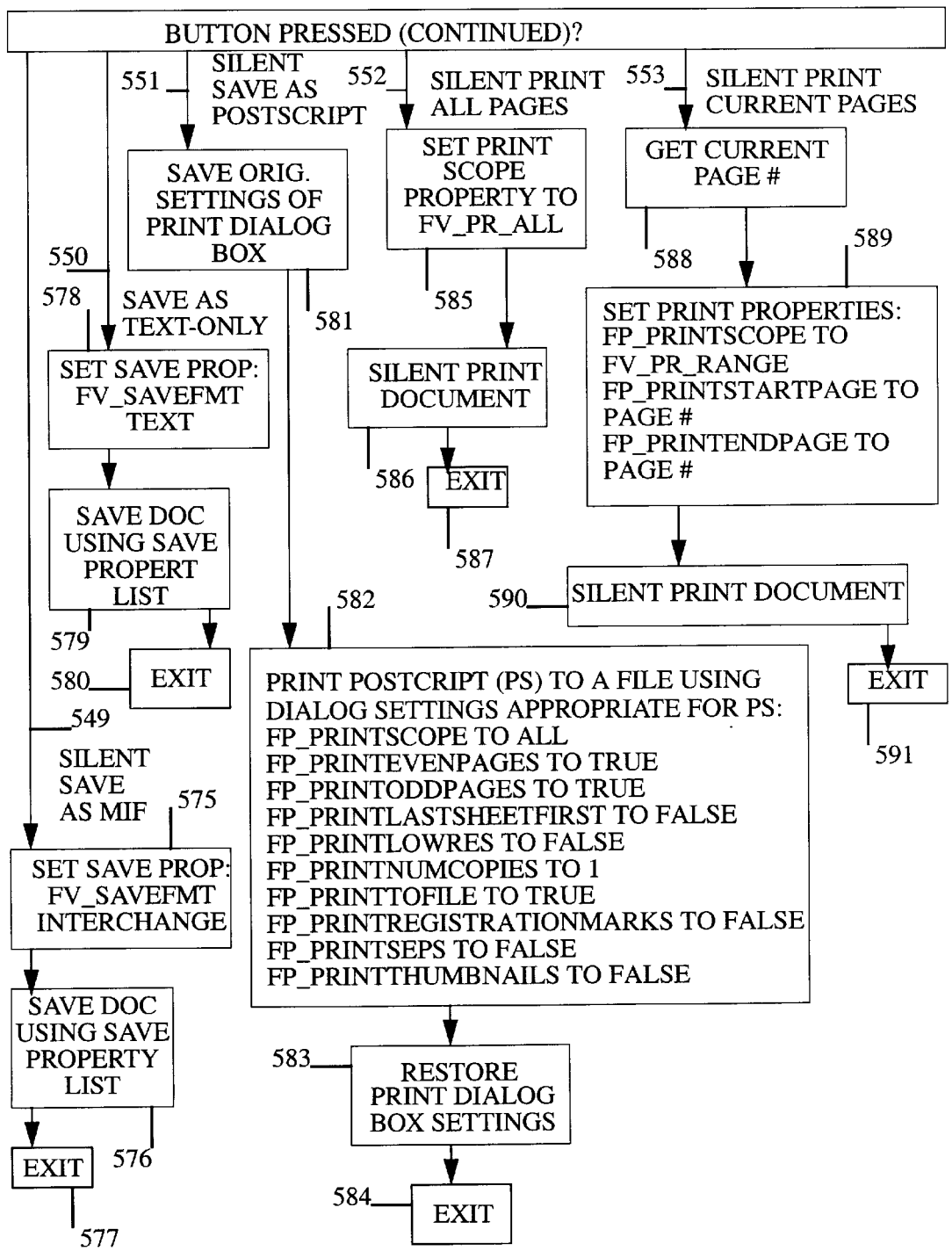
FIG. 28 is a continuation of FIG. 27.

The first step in the silent save as MIF command 549 in FIG. 28 is to set the save properties 575. The next step is to save the document using the save property list 576. The next step is to exit 577.

The first step in the save as text-only command 550 in FIG. 28 is to set the save properties 578. The next step is to save the document using the save property list 579. The next step is to exit 580.

The first step in the silent save as Postscript command 551 in FIG. 28 is to save the original settings of the print dialog box 581. The next step is to print the document to a Postscript file using the dialog box settings appropriate for Postscript 582. The next step is to restore the print dialog box settings 583. The next step is to exit 584.

The first step in the silent print all pages command 552 in FIG. 28 is to set the print scope property to FV_PR_ALL 585. The next step is to silent print the document 586. The next step is to exit 587.

The first step in the silent print current pages command 553 in FIG. 28 is to get the current page number 588. The next step is to set the print properties 589. The next step is to silent print the document 590. the next step is to exit 591.

Figure 29:
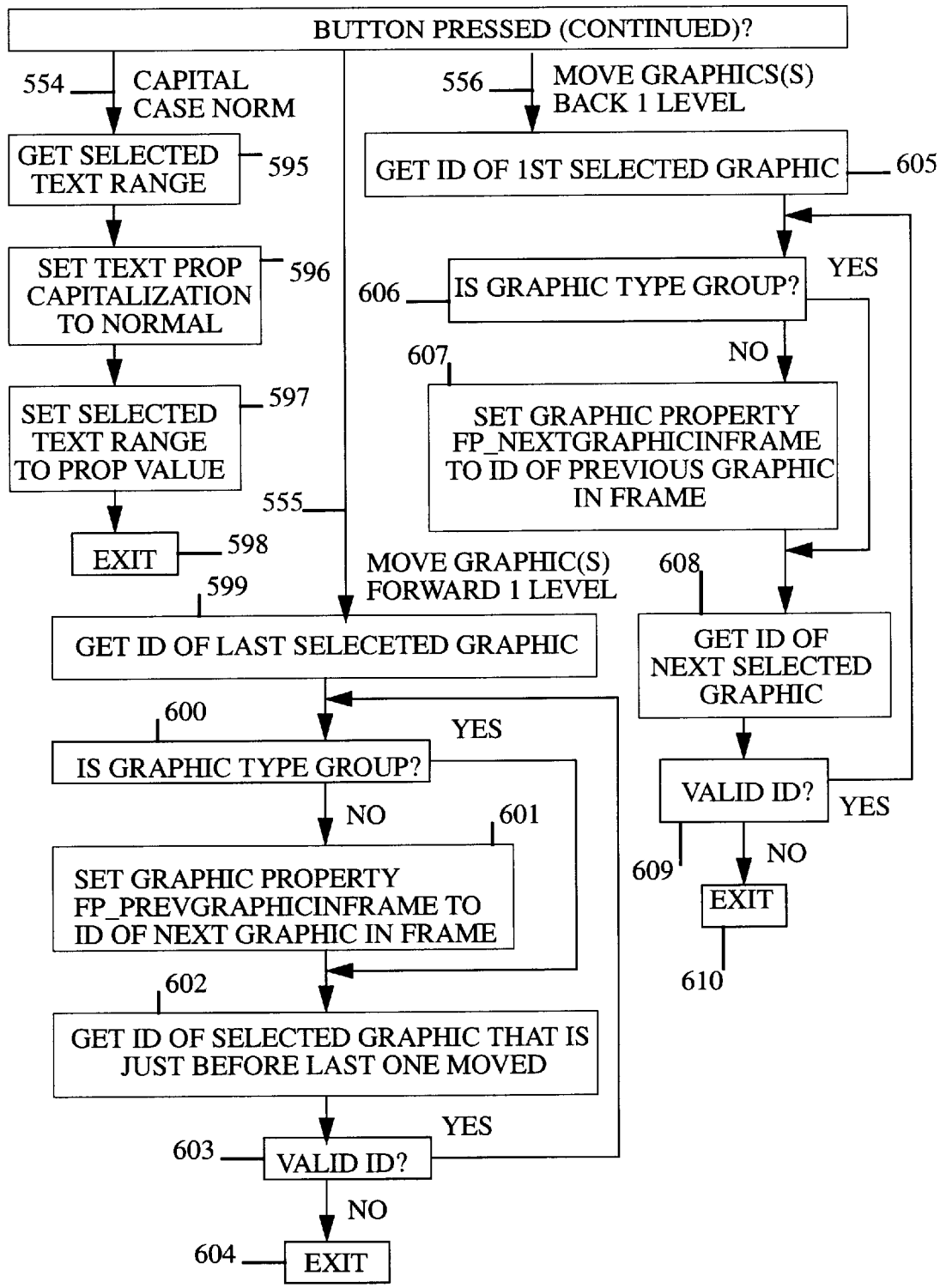
FIG. 29 is a further continuation of FIG. 27.

The first step in the capital case normal command 554 in FIG. 29 is to get the selected text range 595. The next step is to set the text properties capitalization to normal 596. The next step is to set the selected text range to property value 597. The next step is to exit 598.

The first step in the move graphics forward one level command 555 in FIG. 29 is to get the identification of the last selected graphic 599. The next step is to determine whether or not the graphic is of the type group 600. If the type is not group then set the graphic property to the identification of the next graphic in the frame 601. If the graphic is not of the type group or step 601 is completed then get the identification of the selected graphic that is just before the last one moved 602. The nest step is to determine if the identification is valid or not 603. If the identification is valid then return to step 600 and proceed from there. If the identification is not valid then exit 604.

The first step in the move graphics back one level 556 in FIG. 29 is to get the identification of the first selected graphic 605. The next step is to determine whether or not the graphic is of the type group 606. If the graphic is not of the type group then set the graphic property to identify the previous graphic in the frame 607. If the graphic is not of the type group or if step 607 is completed then get the identification of the next selected graphic 608. The next step is to determine if the identification is valid or not 609. If the identification is valid then return to step 606 and proceed from there. If the identification is not valid then exit 610.

Figure 30:
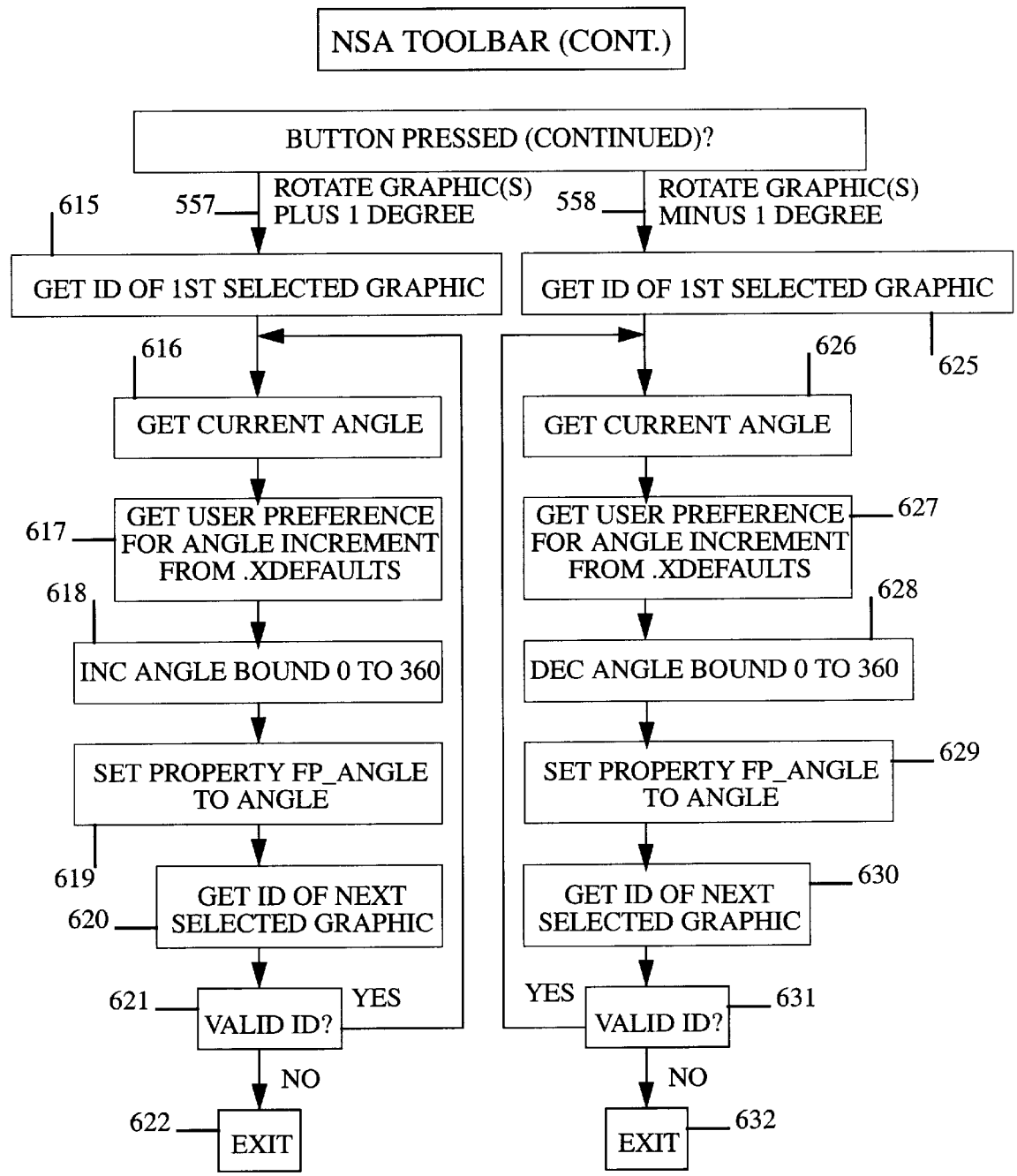
FIG. 30 is a further continuation of FIG. 27.

The first step in the rotate graphics plus one degree command 557 in FIG. 30 starts with getting the identification of the first selected graphic 615. The next step is to get the current angle 616. The next step is to get the user preferences for angle increment 617. The next step is to increment the angle 618. The next step is to set the property FP_Angle to the angle 619. The next step is to get the identification of the next selected graphic 620. The next step is to determine whether or not the identification is valid 621. If the identification is valid then return to step 616 and proceed from there. If the identification is not valid then exit 622.

The first step in the rotate graphics minus one degree command 558 in FIG. 30 starts with getting the identification of the first selected graphic 625. The next step is to get the current angle 626. The next step is to get the user preferences for angle decrement 627. The next step is to decrement the angle 628. The next step is to set the property FP_Angle to the angle 629. The next step is to get the identification of the next selected graphic 630. The next step is to determine whether or not the identification is valid 631. If the identification is valid then return to step 626 and proceed from there. If the identification is not valid then exit 632.

Figure 31:
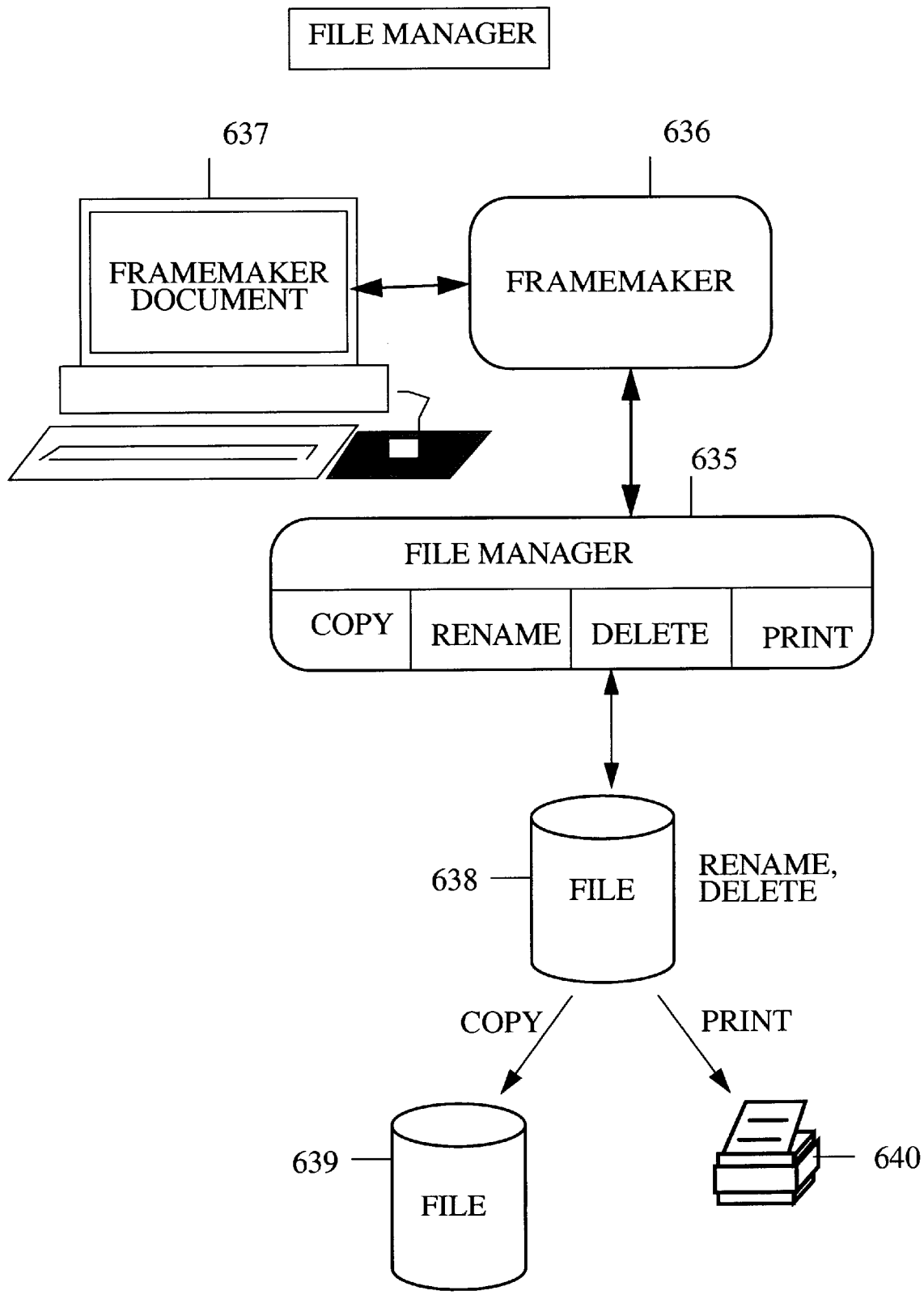
FIG. 31 is a block diagram of FileManager.

FIG. 31 is a block diagram of FileManager 635 and how it enhances FrameMaker® 636 by allowing a user to access the commands of FileManager 635 via a computer 637. The commands of FileManager 635 include copy, rename, delete, and print. Files to be renamed or deleted are renamed to or deleted from where the file is contained 638. A file to be copied is copied to another file 639. A file to be printed is sent to a printer 640 for printing.

Figure 32:
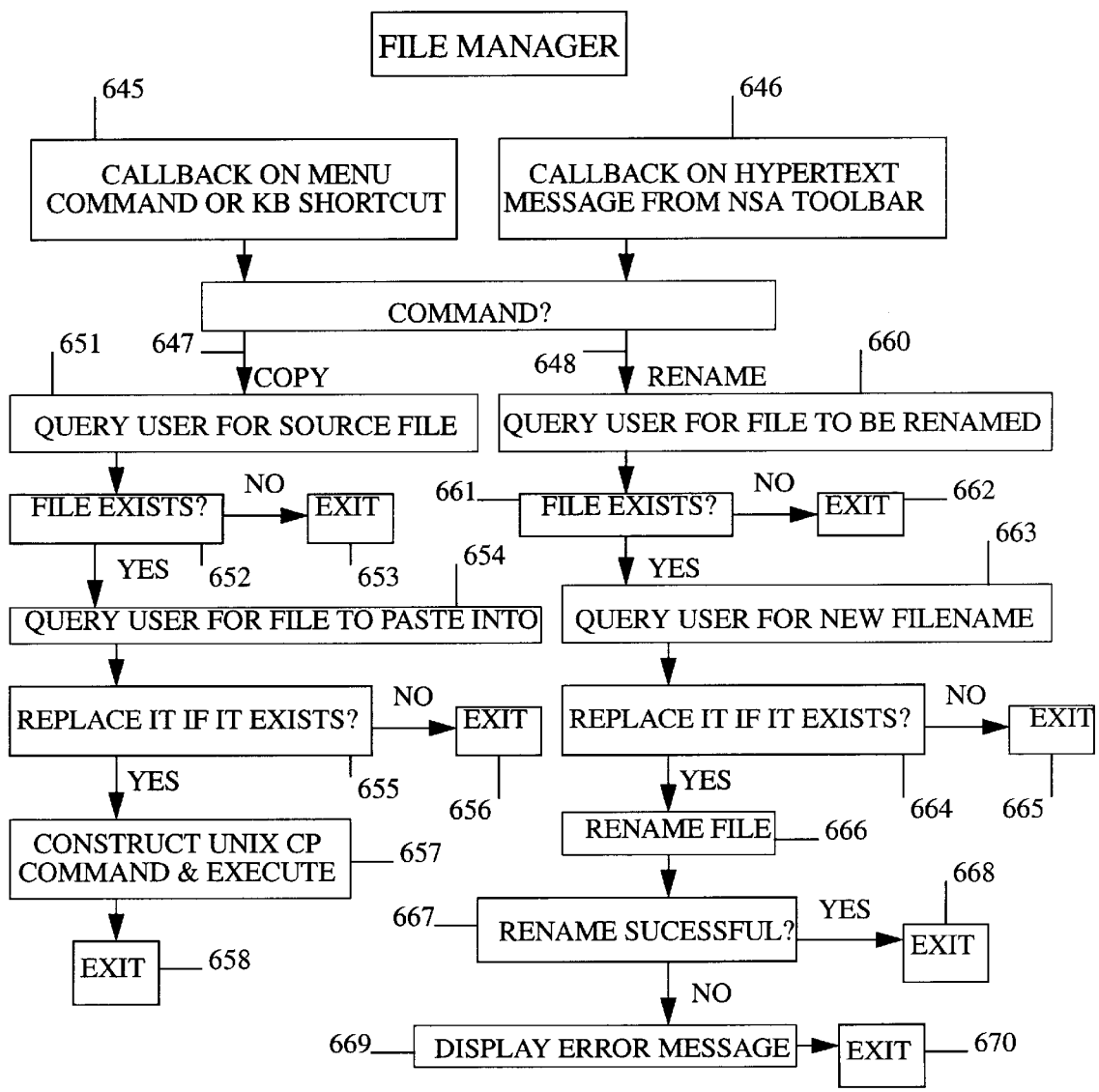
FIG. 32 is a flow-chart of FileManager.
Figure 33:
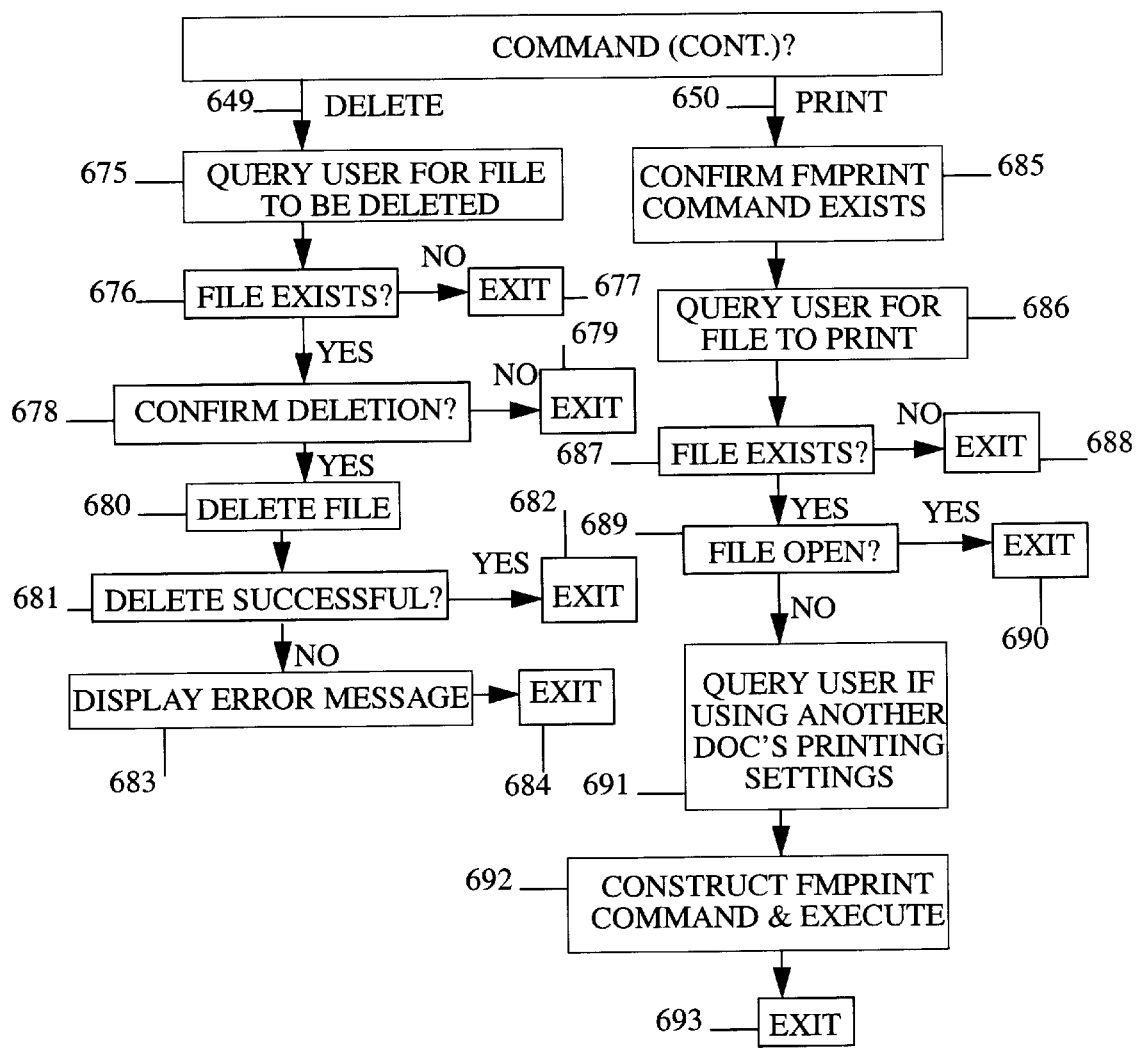
FIG. 33 is a continuation of FIG. 32.

FIGS. 32–33 contain the flow-chart of FileManager. A FileManager command may be activated either by a menu or keyboard command 645 or by a hypertext message from NSAToolbar 646. The FileManager commands include copy 647, rename 648, delete 649, and print 650.

The first step in the copy command 647 in FIG. 32 is to query the user for a source file 651. The next step is to determine whether or not the file exists 652. If the file does not exist then exit 653. If the file exists then query the user for the file name to which the copied file will be pasted 654. The next step is to determine if a file exists already for the name of the destination file 655. If the user does not wish to replace the file then exit 656. If the file did not already exist or the user wishes to replace an already existing file, then construct a UNIX copy command and execute this command 657. The next step is to exit 658.

The first step in the rename command 648 in FIG. 32 is to query the user for the file name to be renamed 660. The next step is to determine whether or not the file exists 661. If the file does not exist then exit 662. If the file exists then query the user for a new filename 663. The next step is to ask the user if the user wishes to rename the file 664. If the user does not wish to rename the file then exit 665. If the user wishes to rename the file then rename the file 666. The next step is to determine whether or not the renaming was successful 667. If it was successful then exit 668. If the renaming was not successful then display an error message 669. The next step is to exit 670.

The first step in the delete command 649 in FIG. 33 is to query the user for a file to be deleted 675. The next step is to determine whether or not the file exists 676. If the file does not exist the exit 677. If the file exists then ask the user if the user wishes to delete the file 678. If the user does not wish to delete the file then exit 679. If the user wishes to delete the file then delete the file 680. The next step is to determine whether or not the deletion was successful 681. If the deletion was successful then exit 682. If the deletion was not successful then display an error message 683. The next step is to exit 684.

The first step in the print command 650 in FIG. 33 is to confirm that a FrameMaker® print command exists 685. The next step is to query the user for the name of the file to be printed 686. The next step is to determine whether or not the file exists 687. If the file does not exist then exit 688. If the file exists then determine whether or not the file is open 689. If the file is open then exit 690. If the file is not open then ask the user if the user wishes to use the print setting of another document 691. The next step is to construct and execute the FrameMaker® fmprint command 692. The next step is to exit 693.

Figure 34:
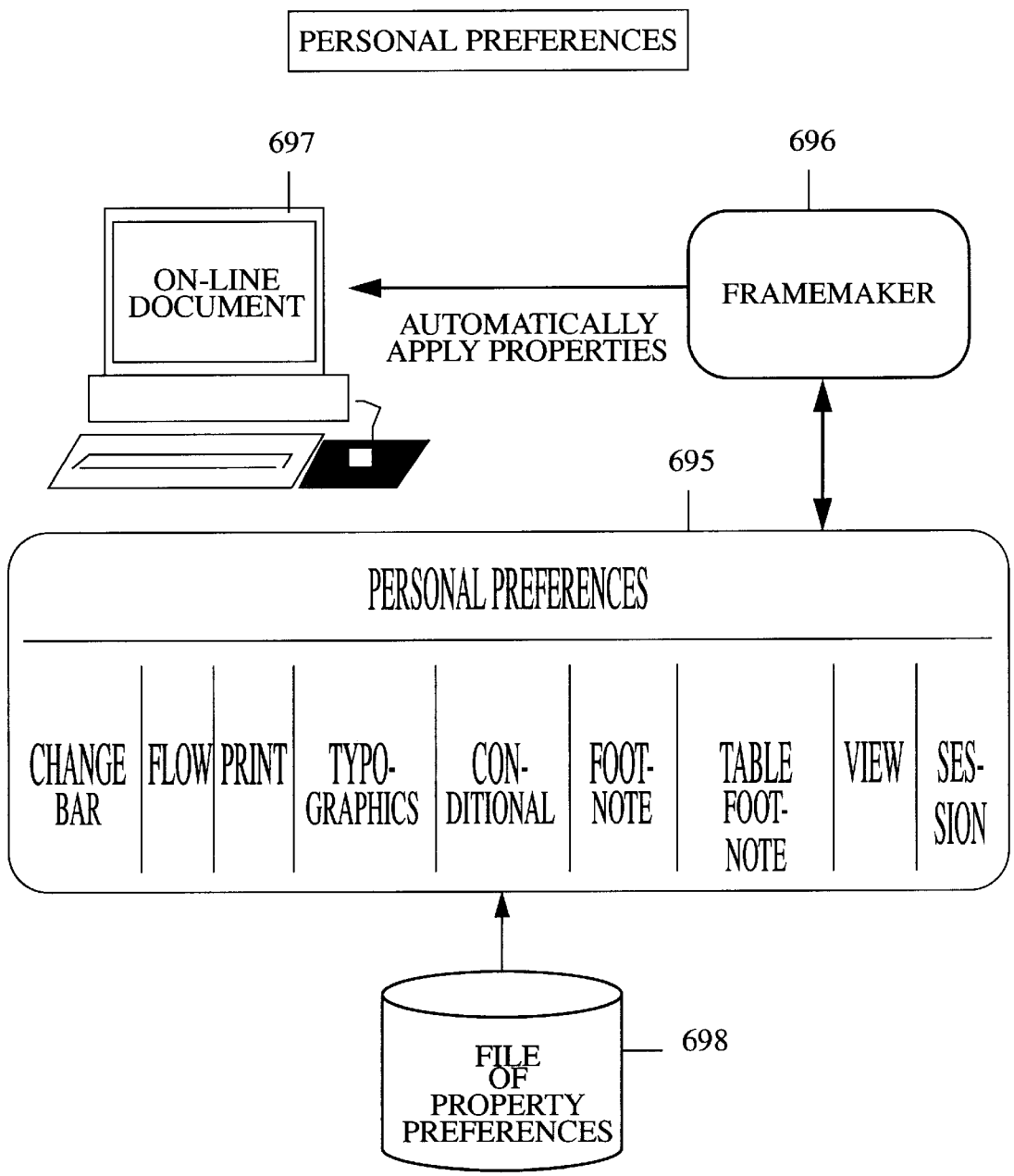
FIG. 34 is a block diagram of PersonalPreferences.

FIG. 34 is a block diagram of PersonalPreferences 695 and how it enhances FrameMaker® 696 by allowing a user to access the PersonalPreference 695 commands via a computer 697. The Personal Preferences 695 command include change bar, flow, print, typographic, conditional, footnote, table footnote, view, and session. A personal preferences selected by the user will be retained in a file 698.

Figure 35:
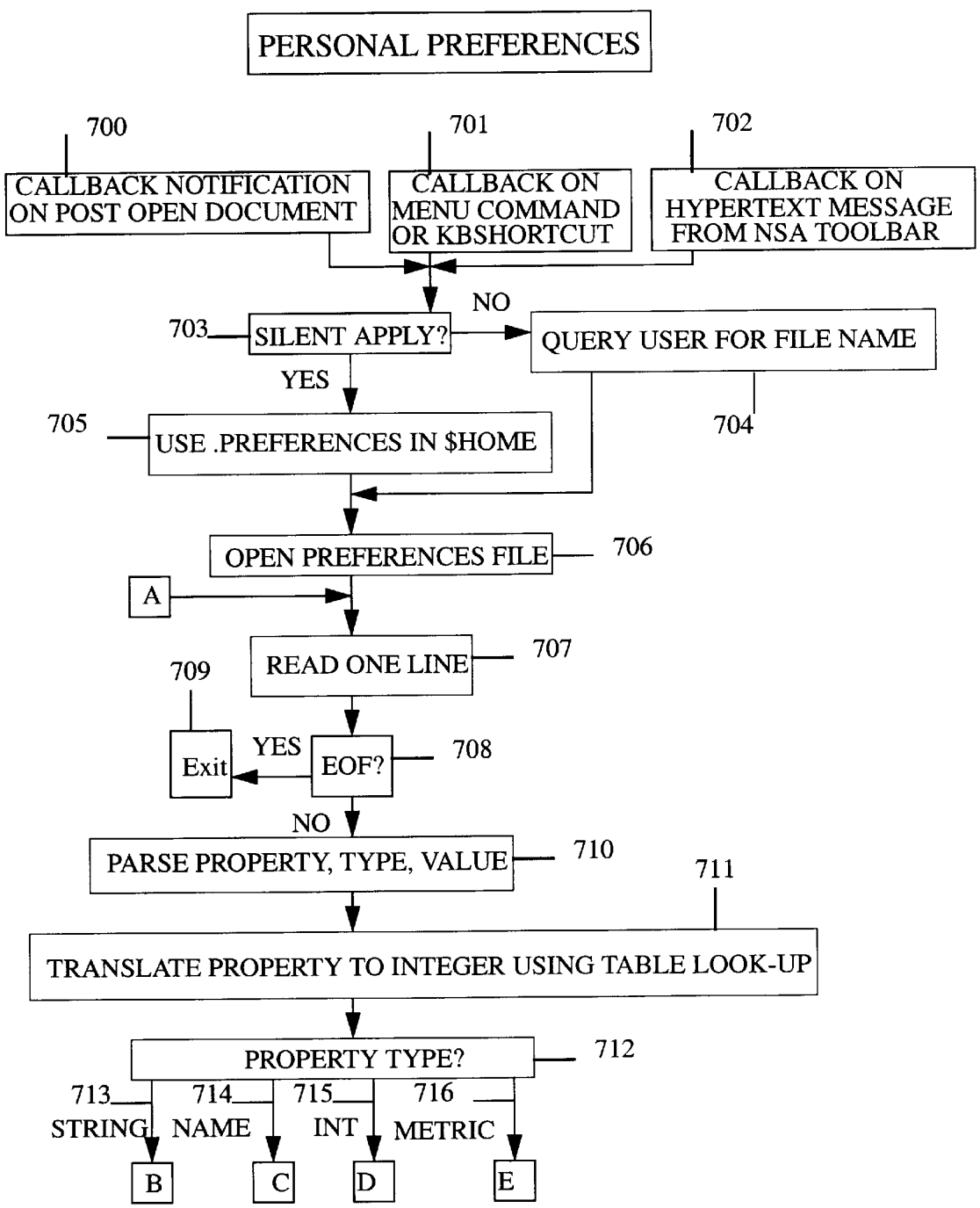
FIG. 35 is a flow-chart of PersonalPreferences.
Figure 36:
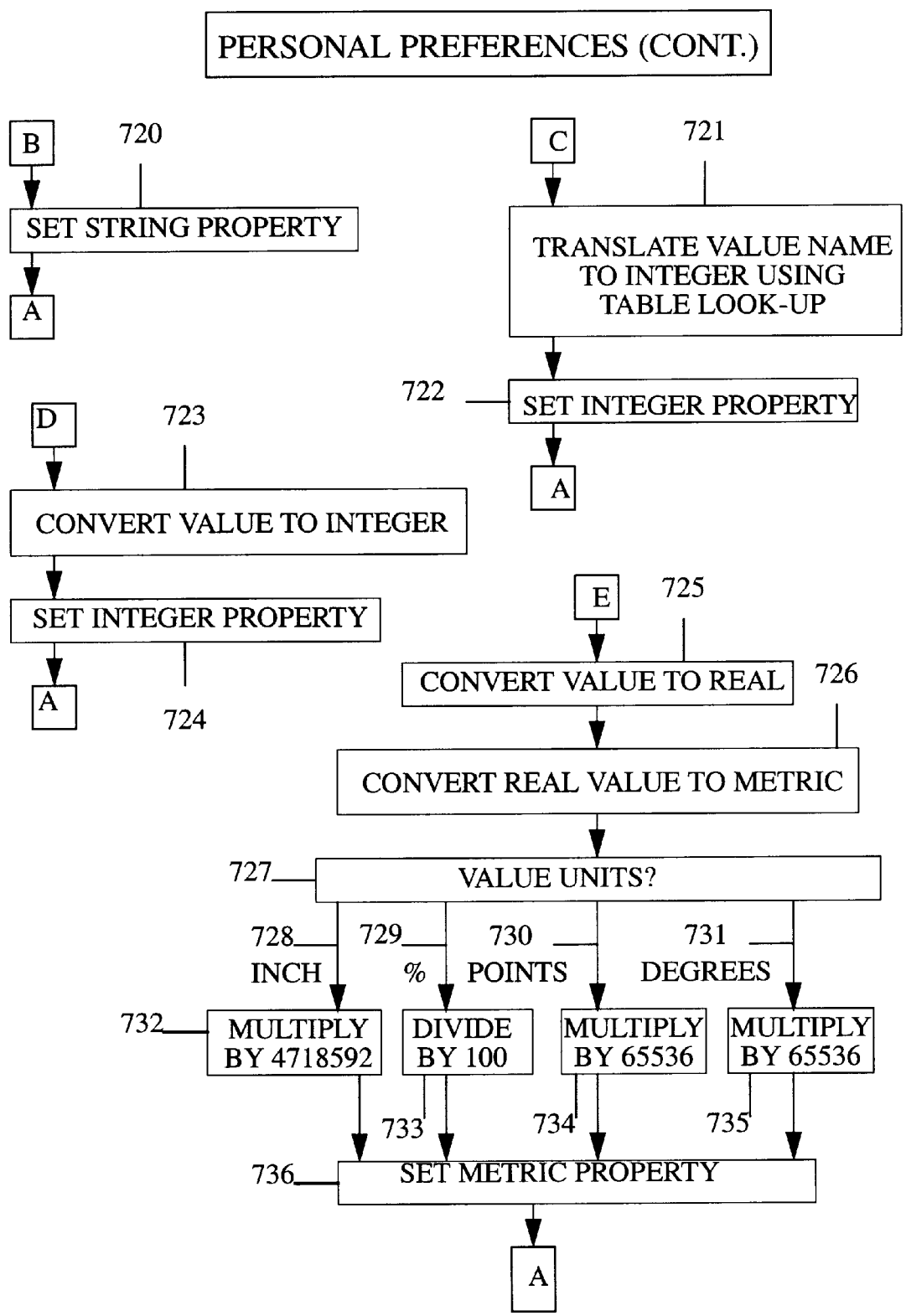
FIG. 36 is a continuation of FIG. 35.

FIGS. 35–36 illustrate the flow-chart of PersonalPreferences. PersonalPreferences may be called by notification upon the opening of a document 700, a menu or keyboard command 701, or a hypertext message from NSAToolbar 702. The first step is to determine whether or not the "silent apply" option is set 703. If silent apply is not chosen then query the user for the filename 704. If silent apply is set then use the preferences in the user's home directory file named preferences 705. The next step after step 704 or step 705 is to open the preferences file 706. The next step is to read one line of the file 707. The next step is to determine if the line read is the end of the file 708. If the line read is the end of the file then exit 709. If the line read is not the end of the file then parse the property, the type, and the value 710. The next step is to translate the property to an integer using a look-up table 711. The next step is to determine the property type 712. The property type may be a string 713, a name 714, an integer 715, or a metric 716. If the property type is anyone of these then the flow-chart branches to additional step in FIG. 36. If the property type is a string 713 then the additional step in FIG. 36 is to set the string property to the specified value 720. The next step after step 720 is to return to step 707 in FIG. 35 and continue from there. If the string property is name 714 the the additional steps in FIG. 36 start with translating the value of the name to an integer using a look-up table 721. The next step after step 721 is to set the integer property to an integer value 722 and return to step 707 in FIG. 35 and proceed from there. If the property type is integer 715 then the additional steps in FIG. 36 start with converting the value to an integer 723. The next step after step 723 is to set the property to the integer value 724 and return to step 707 in FIG. 35 and continue from there. If the property type is metric 716 the the additional steps in FIG. 36 start with converting the value to a real number 725. The next step after step 725 is to convert the real value to a metric 726. The next step after step 726 is to determine the unit of the value (e.g., inch 728, percentage 729, points 730, or degrees 731). If the unit is inch then multiply the value by 4718592 732. If the unit is percentage then divide the value by 100 733. If the unit is points then multiply the value by 65536 734. If the unit is degree then multiply the value by 65536. The next step after step 732, 733, 734, or 735 is to set the property to a metric value 736 and return to step 707 in FIG. 35 and continue from there.

VII. Computer-to-Computer-Utility

The present invention improves upon the computer-to-computer utility of FrameMaker® by adding the capability to transfer a document to a server. This improvement to FrameMaker® is in the form of a C language program called TransferDoctoServer. This program may be found in the microfiche appendix to the present invention.

TransferDocToServer allows a user of FrameMaker® to automatically save a document silently in a specified format (e.g., normal, view only, text only, or PostScript), conduct a file transfer protocol (FTP) session silently in order to transfer a file to a server, remove text only or PostScript file at the users option, and display an alert when a command is finished. When saving a PostScript file, TransferDocToServer saves the settings of the Print Dialog Box, sets properties to values appropriate for a PostScript file (e.g., print scope-all, even page-true, odd page-true, last sheet 1st-false, number of copies-1, low res images-false, reg marks-false, separations-false, thumbnails-false, and print to file-true), silently creates a PostScript file, and restores the Print Dialog Box to its original settings.

Figure 37:
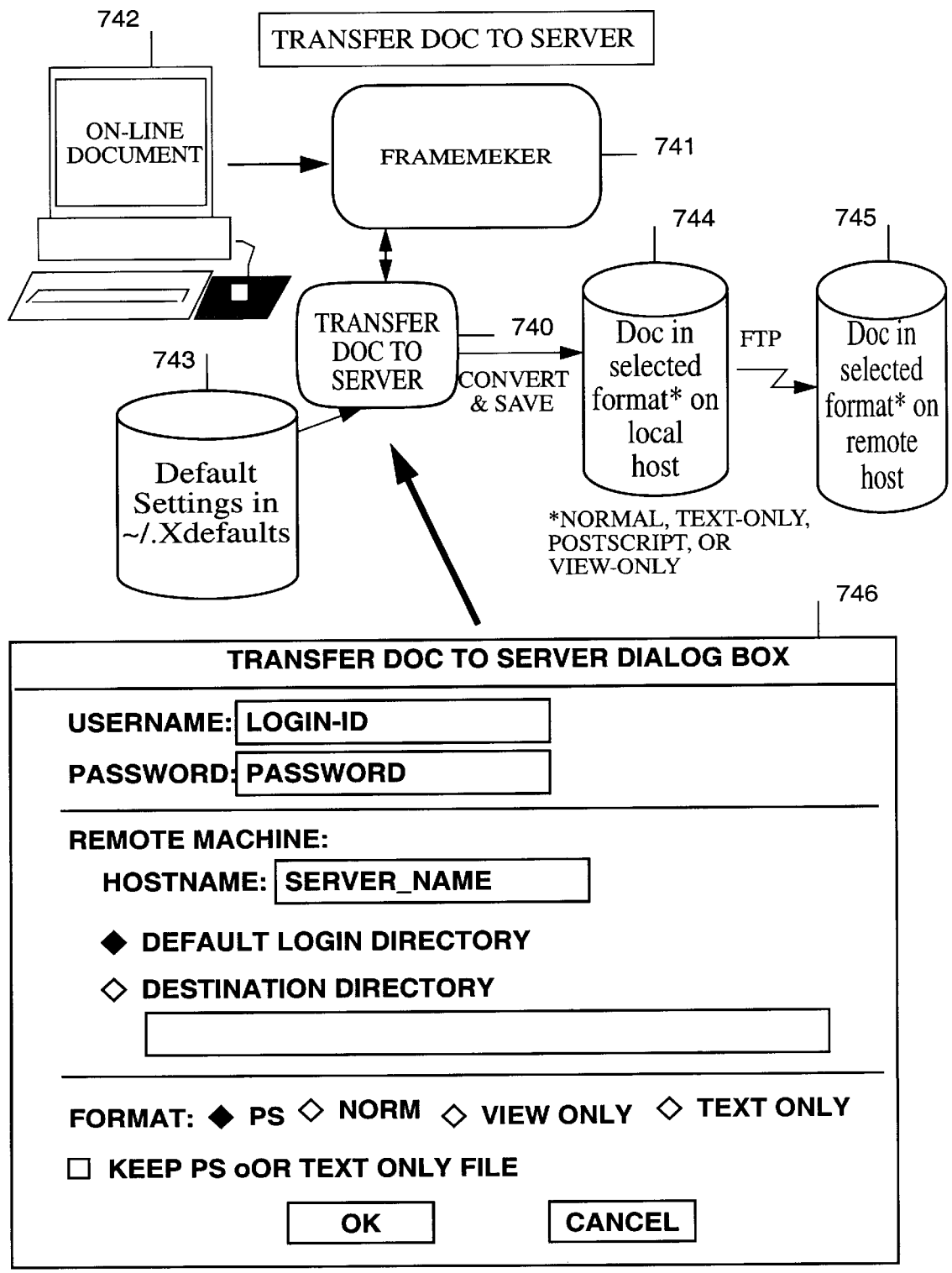
FIG. 37 is a block diagram of TransferDocToServer.

FIG. 37 is a block diagram of TransferDocToServer 740 and how it enhances FrameMaker® 741 by allowing a user to access the command of TransferDocToServer 740 via a computer 742. TransferDocToServer 740 also allows default settings 743, and a local host 744 for saving the converted document and a remote host 745 for transferring the document to. A dialog box 746 for TransferDocToServer 740 is also shown.

Figure 38:
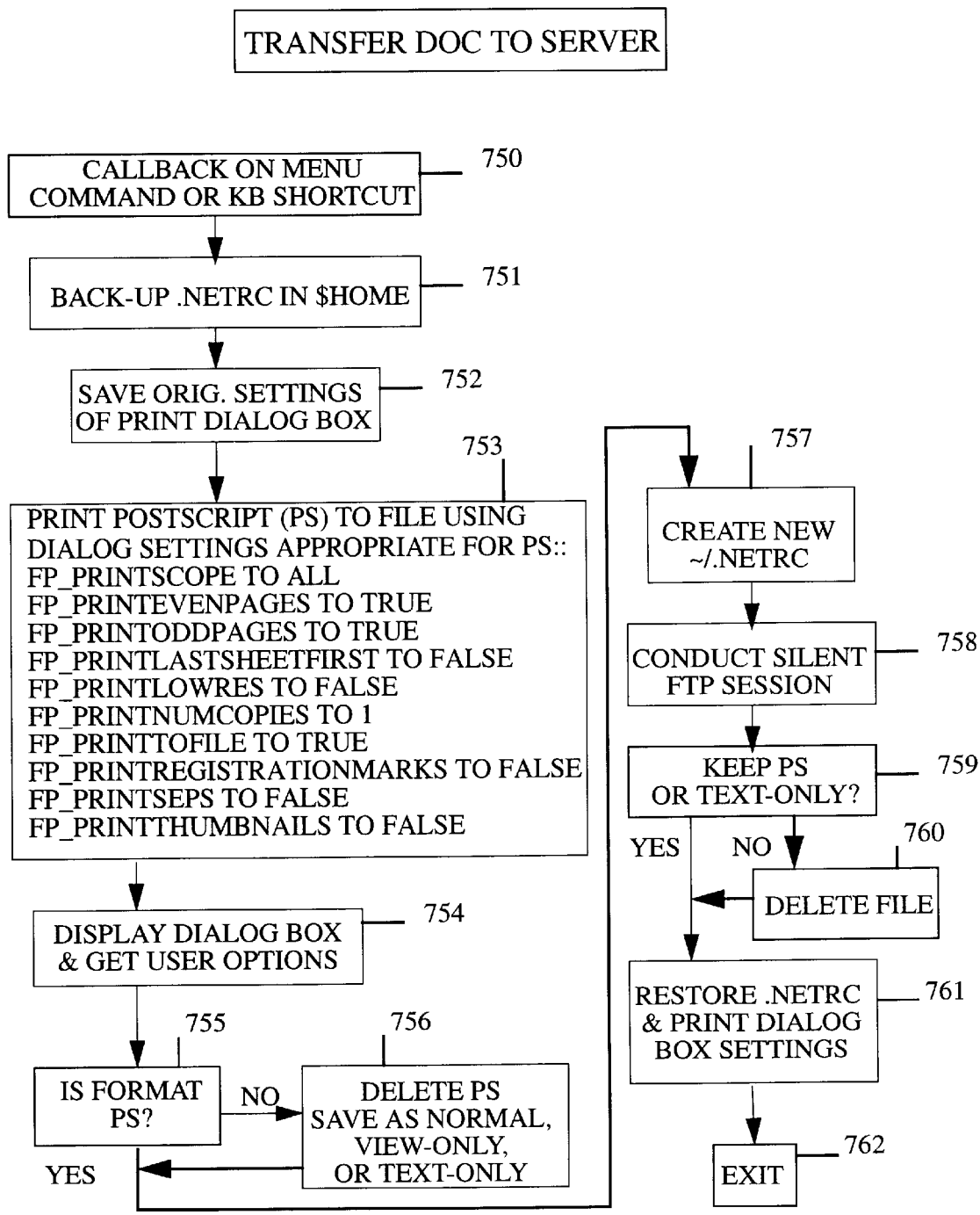
FIG. 38 is a flow-chart of TransferDocToServer.

FIG. 38 illustrates the flow-chart of TransferDocToServer which may be accessed either by a menu command or a keyboard command 750. The next step is to back-up the file .netrc in the home directory 751. The next step is to save the original settings of the print dialog box 752. The next step is to print a PostScript file to a file using dialog settings appropriate for PostScript 753. The next step is to display the dialog box and get the user options 754. The next step is to determine whether of not the format is PostScript 755. If the format is not PostScript then delete the PostScript file and save as normal, view-only, or text-only 756. If the file format is PostScript of if step 756 is completed then create a new file ~/.netrc 757. The next step is to conduct a silent File Transfer Protocol (FTP) session 758. The next step is to determine whether or not to keep the PostScript file or text-only file 759. If the user does not wish to keep the file, then delete the file 760. If the file is to be kept or if step 760 is completed then restore the file .netrc and the settings of the print dialog box 761. The next step is to exit 762.

VIII. Graphics Tools

The present invention further improves upon the graphics capabilities of FrameMaker® by adding the capability to include a drop shadow, rotating by one degree, and doing a single level move. These improvements to FrameMaker® are in the form of a number of C language programs called DropShadow, MicroRotate, and SingleLevelMove. These programs may be found in the microfiche appendix to the present invention.

DropShadow allows a user of FrameMaker® to create a drop shadow for a selected graphic object using a fill pattern from a palette. The flow-charts of MicroRotate and SingleLevelMove are listed above.

Figure 39:
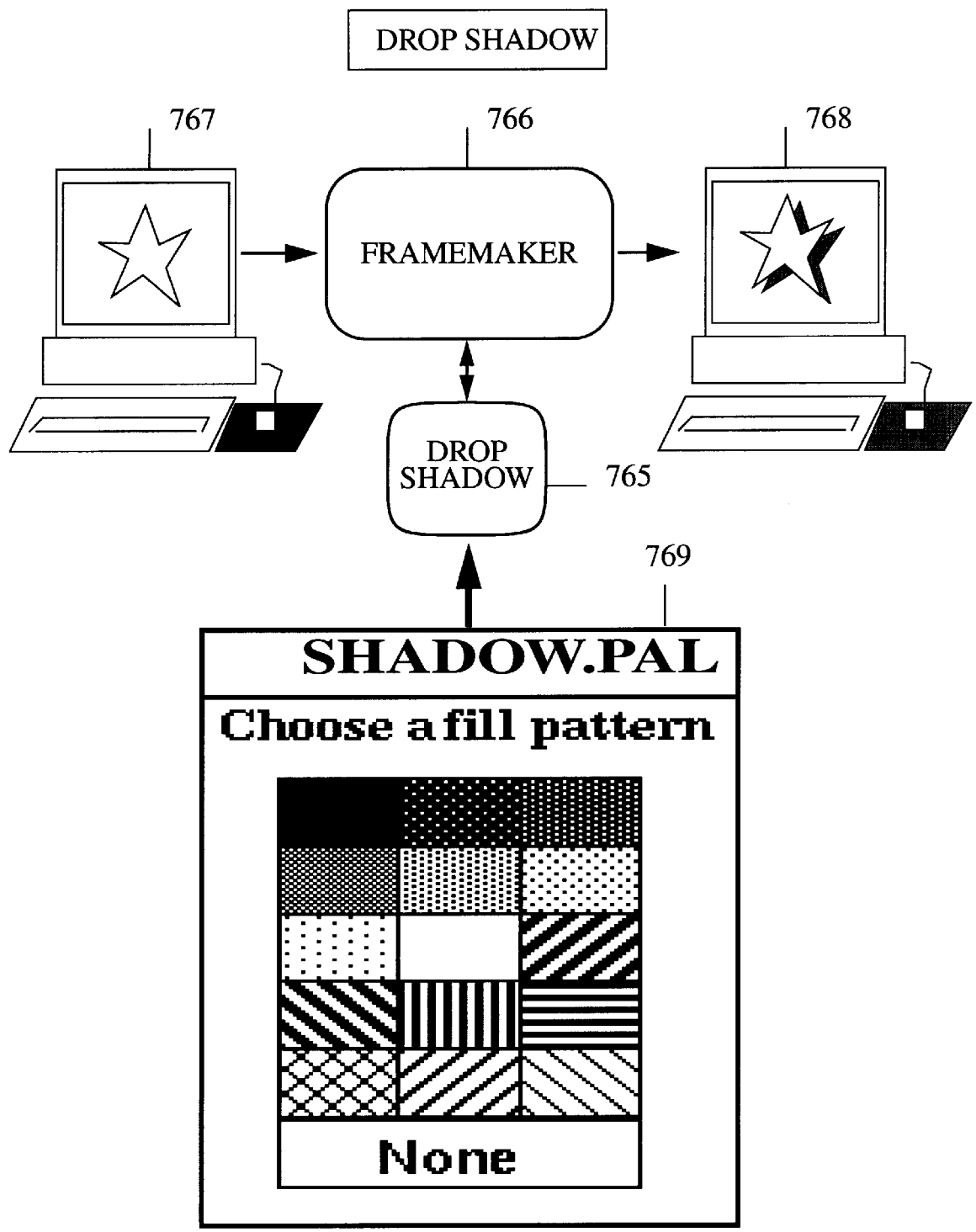
FIG. 39 is a block diagram of DropShadow.

FIG. 39 is a block diagram of DropShadow 765 and how it enhances FrameMaker® 766 by allowing a user to access DropShadow 765 via a computer. A first computer 767 illustrates a graphic without a drop shadow and a second computer 768 illustrates the same graphic with a drop shadow. A palette 769 illustrates the options available for the fill pattern of the drop shadow.

Figure 40:
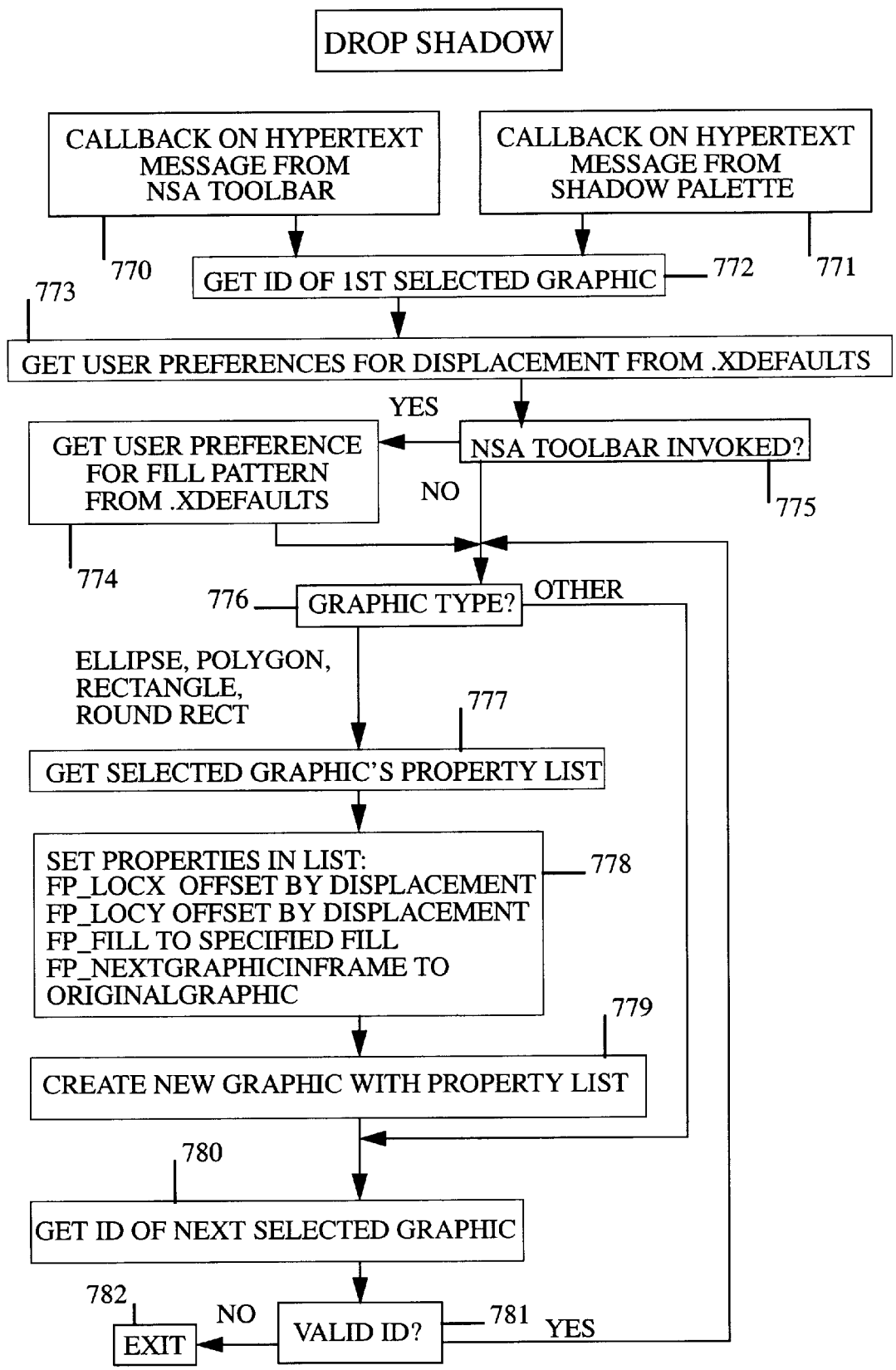
FIG. 40 is a flow-chart of DropShadow.

FIG. 40 lists the flow-chart for DropShadow which may be initiated either by a hypertext message from NSAToolbar 770 or by a hypertext message from Shadow Palette 771. The next step is to get the identification of the first selected graphic 772. The next step is to get the user preferences for displacement 773. The next step is to determine whether or not DropShadow was invoked from the NSAToolbar 775. If NSAToolbar invoked it then get the user preferences for the fill pattern from the same file that the preferences for displacement were obtained 774. If NSAToolbar did not invoke it or step 774 is completed then determine the type of the graphic 776. If the graphic is an ellipse, a polygon, a rectangle, or a round rectangle then get the property list for the selected graphic 777. After step 777 is completed, set the properties as follows: FP_LocX offset by displacement; FP_LocY offset by displacement; FP_Fill to specified fill; and FP_NextGraphicInFrame to original graphic. After step 778 is completed, create a new graphic with the property list. After step 779 is completed or if the graphic is not of the type listed above, get the identification of the next selected graphic 780. The next step is to determine whether or not the identification is valid 781. If the identification is valid then return to step 776 and continue from there. If the identification is not valid then exit 782.

IX. Table Tools

The present invention improves upon the capability of FrameMaker® to manipulate a table by adding the capability to sort a table, sum columns of a table, export a table, and transpose a table. These improvements to FrameMaker® are in the form of a number of C language programs called TableSort, Sum Columns, TableExport, and TableTranspose. These programs may be found in the microfiche appendix to the present invention.

TableSort allows a user of FrameMaker® to sort and collate rows contained in a FrameMaker® table. Presently, the sort modes available in TableSort include an alphanumeric sort (i.e., dictionary sort), numeric sort (including double precision floating numbers), and sort by month. TableSort may easily be extended by a person skilled in the art to include a sort by any time segment (e.g, day, year, etc.). TableSort has the capability to consider or ignore certain data. The sort field may include the entire table cell or a substring (e.g., start word, end word, delimiters). The direction of the sort may be either ascending or descending).

SumColumns allows a user of FrameMaker® to sum selected cells or entire table, print results in body or footing row, replace an existing row, and add a new row.

TableExport allows a user of FrameMaker® to export a table to an ASCII file in a format that retains tabular structure.

TableTranspose allows a user of FrameMaker® to transpose a table (i.e., rows become columns and columns become rows). TableTranspose converts heading/footing rows into first/last columns, handles straddled cells, and retains paragraph and character formats.

Figure 41:
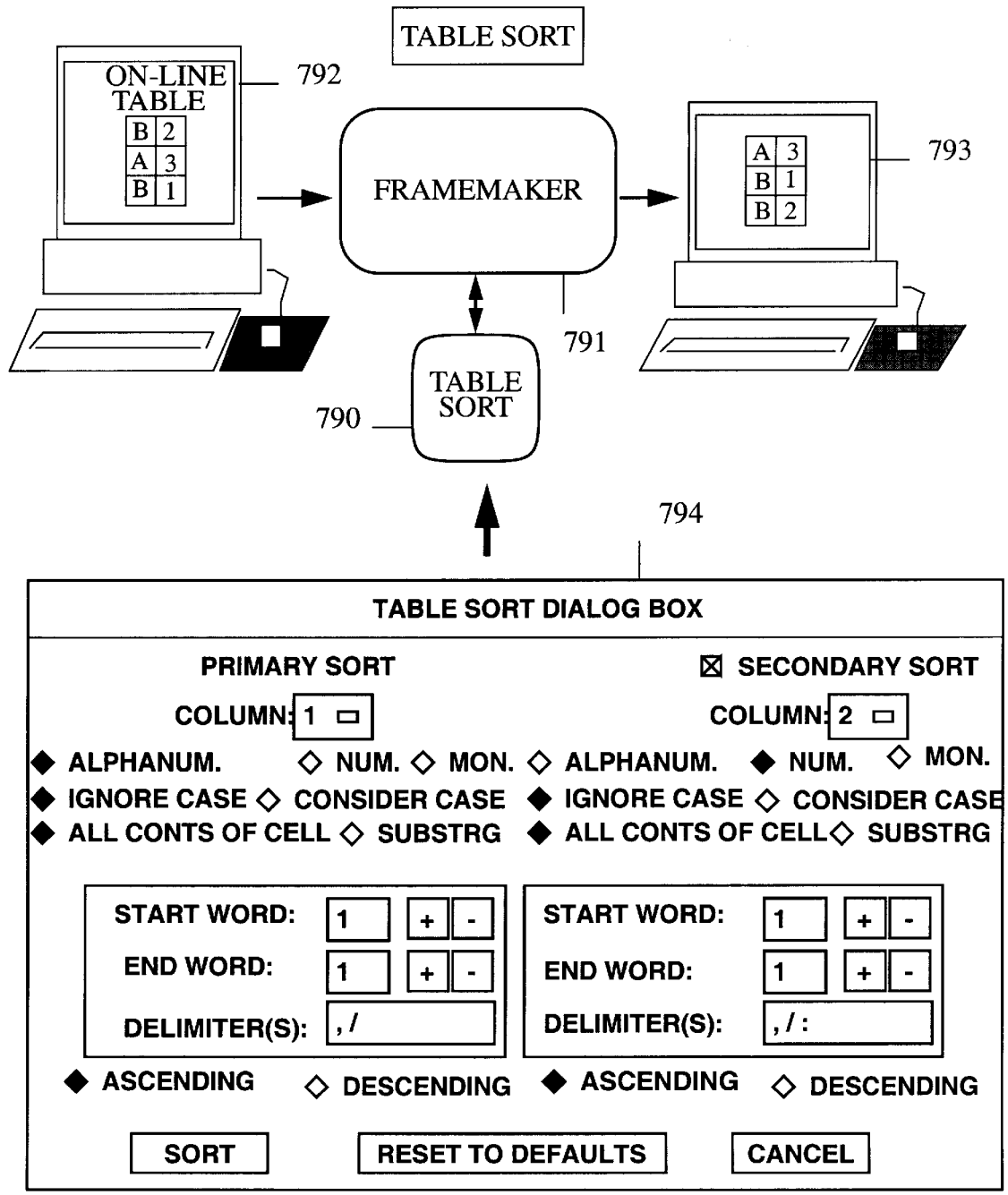
FIG. 41 is a block diagram of TableSort.

FIG. 41 is a block diagram showing how TableSort 790 enhances FrameMaker® 791 by allowing a user to access the commands of TableSort 790 via a computer. A first computer 792 shows a table while a second computer 793 shows the table sorted. A TableSort dialog box 794 is also shown.

Figure 42:
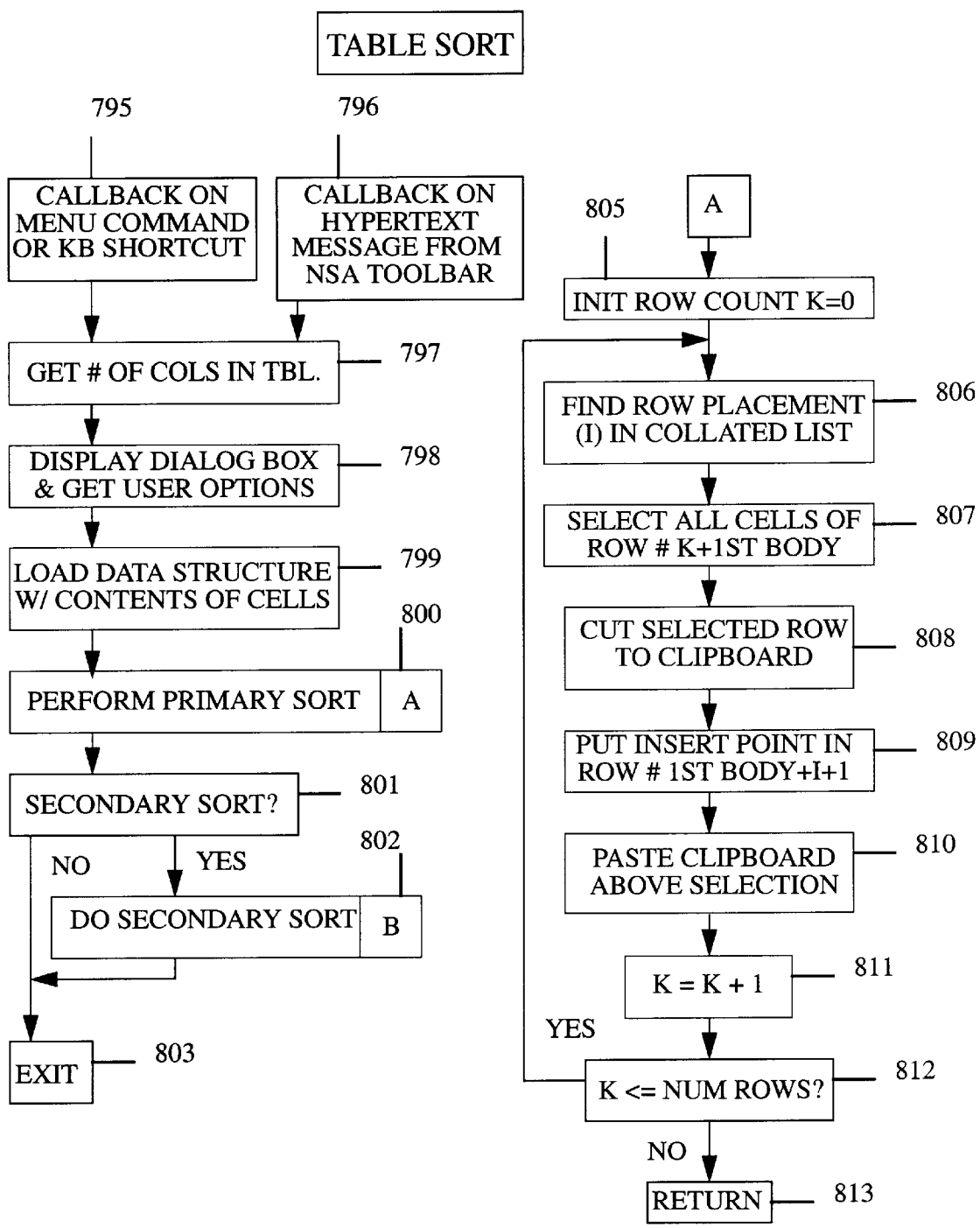
FIG. 42 is flow-chart of TableSort.
Figure 43:
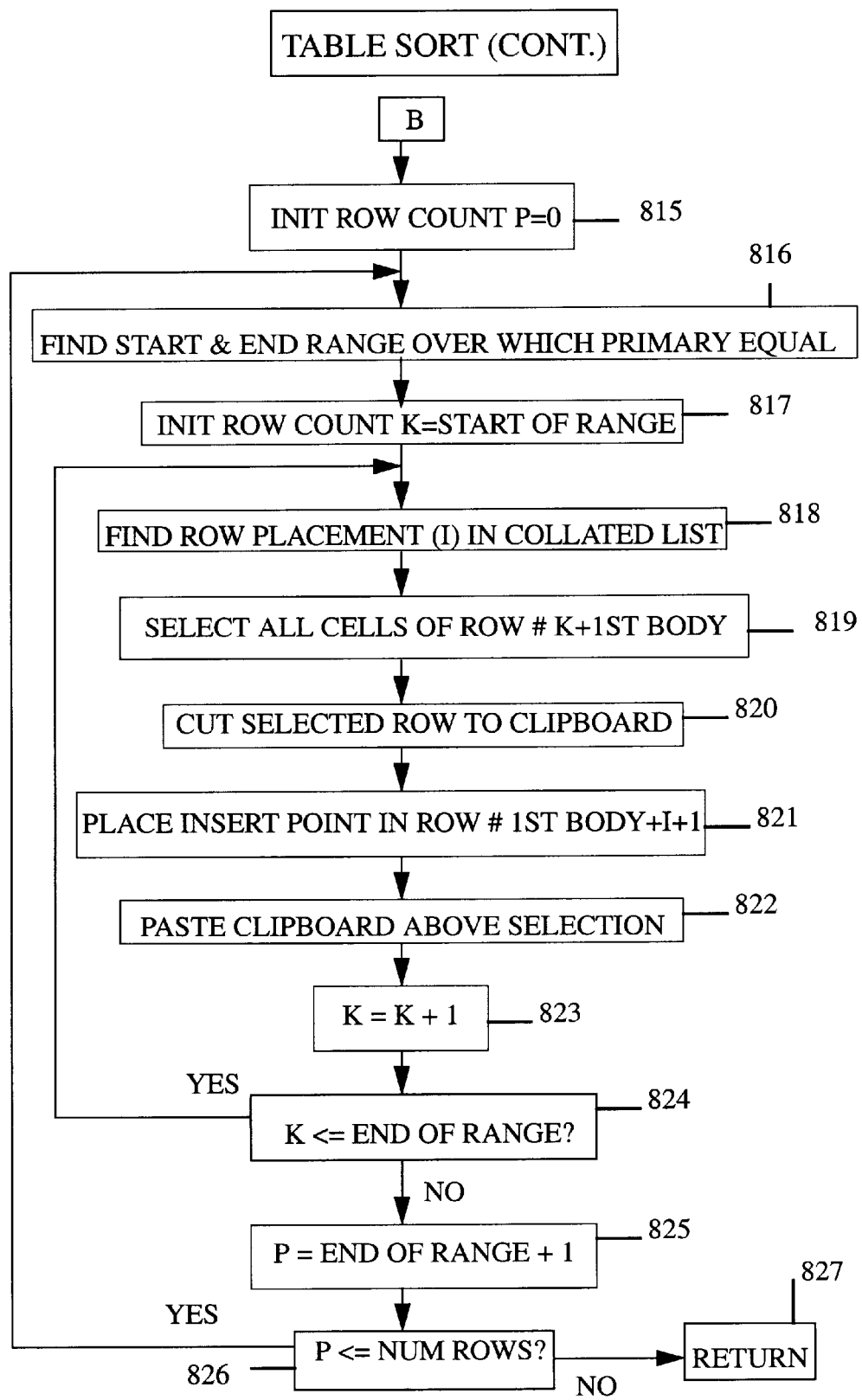
FIG. 43 is a continuation of FIG. 42.

FIGS. 42–43 illustrate the flow-chart of TableSort. TableSort may be initiated as shown in FIG. 42 by a menu command or keyboard command 795 or by a hypertext message from NSAToolbar 796. The next step is to get the number of columns in the table 797. The next step is to display the dialog box and get the user options 798. The next step is to load the data structure with the contents of the cells 799. The next step is to perform a primary sort 800. The primary sort 800 branches to additional steps in FIG. 42 which will be described below. Upon return from these additional steps, the next step is to determine is a secondary sort was chosen by the user 801. If a secondary sort is necessary then a secondary sort is performed 802. The secondary sort 802 requires additional steps that are listed in FIG. 43 and will be described below. After return from these additional steps or if no secondary sort is required, the next step is to exit 803.

The additional steps required by the step of performing a primary sort 800 continue in FIG. 42 starting with the step of initializing the row count to zero 805. The next step is to find the first row placement in a collated list 806. The next step is to select all cells of the row having row number equal to the row count plus the first body row number 807. The next step is to cut the selected row to the clipboard 808. The next step is to place an insertion point within the row having a row number equal to the first body plus the first row placement plus one 809. The next step is to paste the clipboard above the selection 810. The next step is to increment the row count by one 811. The next step is to determine if the row count is less than or equal to the total number of rows present 812. If the row count is less than or equal to the number of rows then return to step 806 and proceed from there If the row count is greater than the number or rows then return 813 to step 800 in FIG. 42 and proceed from there.

The additional steps required by the step of performing a secondary sort 802 continue from FIG. 42 to FIG. 43 starting with setting row count to zero 815. The next step is to find the start and the end of the range of the primary sort 816. The next step is to set the row count to the start of this range 817. The next step is to find the first row placement in a collated list 818. The next step is to select all cells of row number equal to the row count plus the first body 819. The next step is to cut the selected rows to the clipboard 820. The next step is to place an insertion point within row number equal to the first body plus the first row placement plus one 821. The next step is to paste the information on the clipboard above the selection 822. The next step is to increment the row count 823. The next step is to determine if the row count is less than or equal to the end of the range 824. If the row count is less than or equal to the end of the range then return to step 818 and continue from there. If the row count is greater than the end of the range then set a value p equal to the end of the range plus one 825. The next step after step 825 is to determine if the value p is less than or equal to the total number of rows. If the value p is less than or equal to the total number of rows then return to step 816 and continue from there. If the value p is greater than the total number of rows then return 827 to step 802 in FIG. 42 and proceed to step 803.

Figure 44:
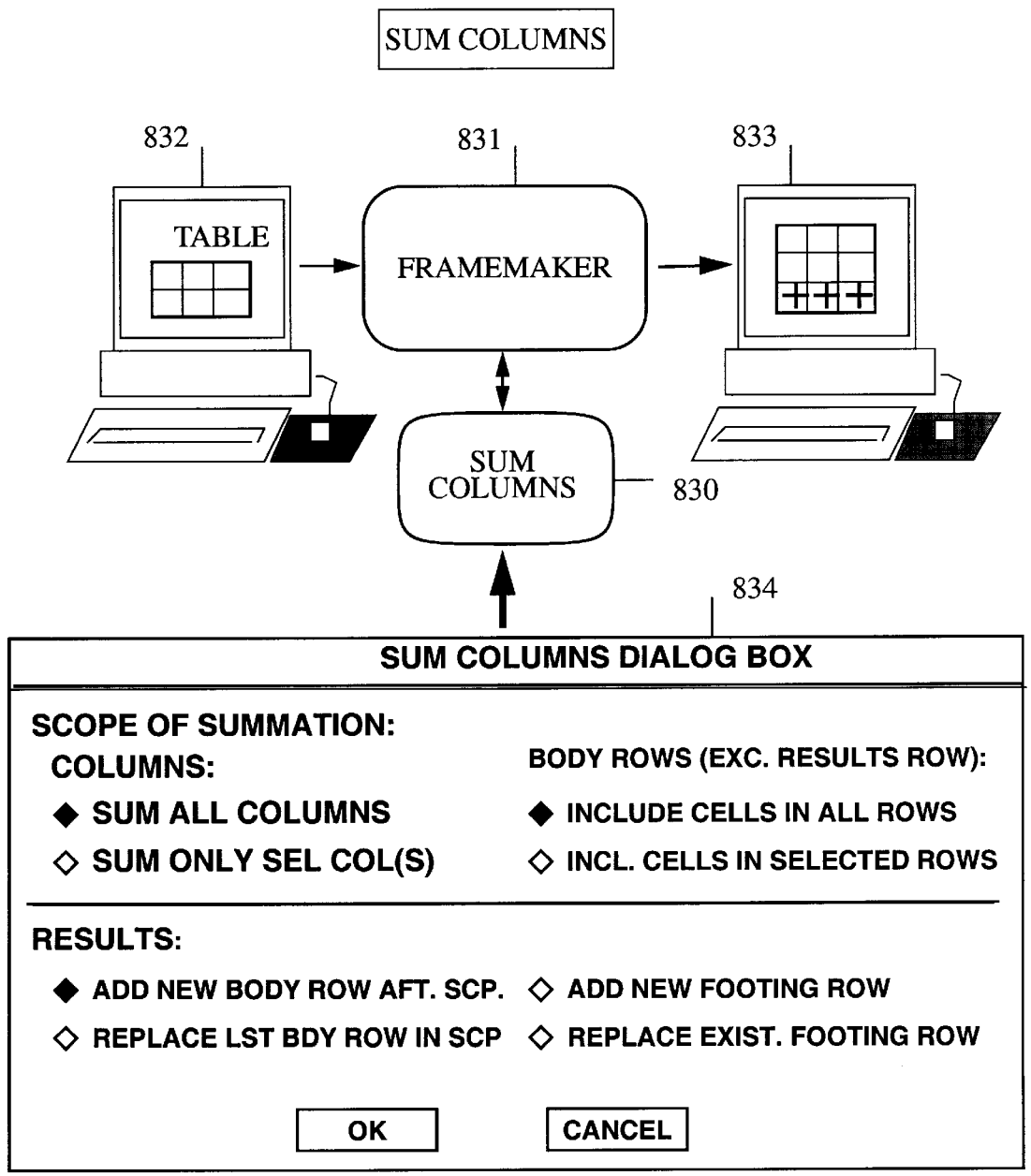
FIG. 44 is a block diagram of SumColumns.

FIG. 44 is a block diagram of how SumColumns 830 enhances FrameMaker® 831 by allowing a user to access the commands of SumColumns 830 via a computer. A first computer illustrates a table 832 while a second computer 833 illustrates the table with an additional row that includes the sum of the columns of the table. A SumColumns dialog box 834 is also shown.

Figure 45:
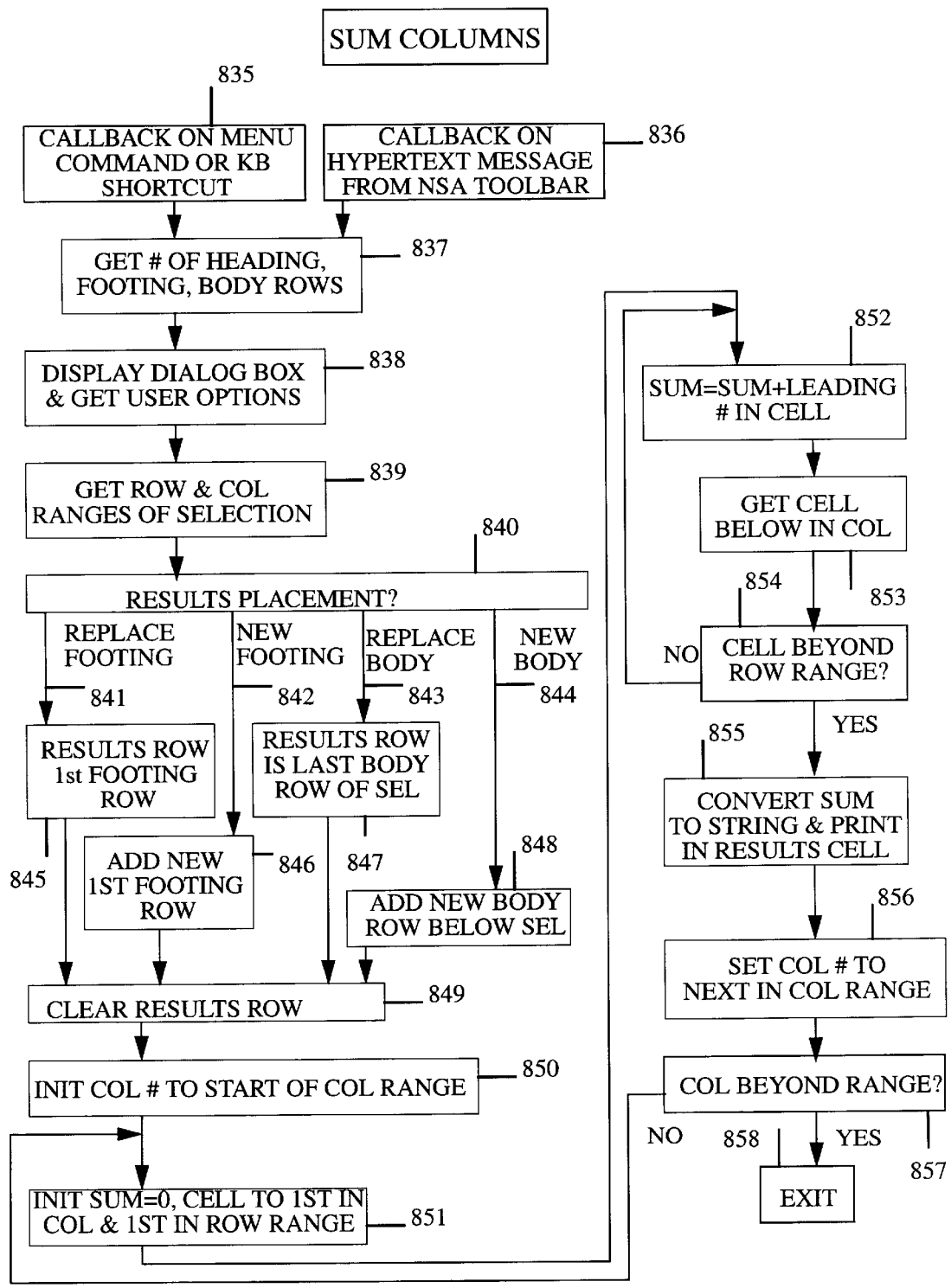
FIG. 45 is a flow-chart of SumColumns.

FIG. 45 illustrates the flow-chart of SumColumns which may be activated using a menu command or a keyboard command 835 or by a hypertext message from the NSA-Toolbar 836. The next step is to get the number of the heading, footing, and body rows 837. The next step is to display the dialog box and get the user options 838. The next step is to get the row and column ranges of the selection 839. The next step is to determine where to place the results (e.g., replace footing 841, create a new footing 842, replace the body 843, or create a new body 844). If the footing is to be replaced then the next step after step 840 is to make the results row the first footing row 845. If a new footing is to be created then the next step after step 840 is to add a new first footing row 846. If the body is to be replaced then the next step after step 840 is to make the results row the last body row of the selection 847. If a new body is to be created then the next step after step 840 is to add the new body row below the selection 848. The next step after step 845, 846, 847, or 848 is to clear the results row 849. The next step is to initialize the column number to the start of the range of the column range 850. The next step is to initialize a sum to zero, initialize a cell to first in column and first in row range 851. The next step is to increment the sum by the number in the cell 852. The next step is to get the cell below in column 853. The next step is to determine if the cell is beyond the row range 854. If the cell is not below the row range then return to step 852 and proceed from there. If the cell is beyond the row range then convert the sum to a string and print the sum in the results cell 855. The next step is to set the column number to next in the column range 856. The next step is to determine if the column is beyond the range 857. If the column is not beyond the range then return to step 851 and proceed from there. If the column is beyond the range then exit 858.

Figure 46:
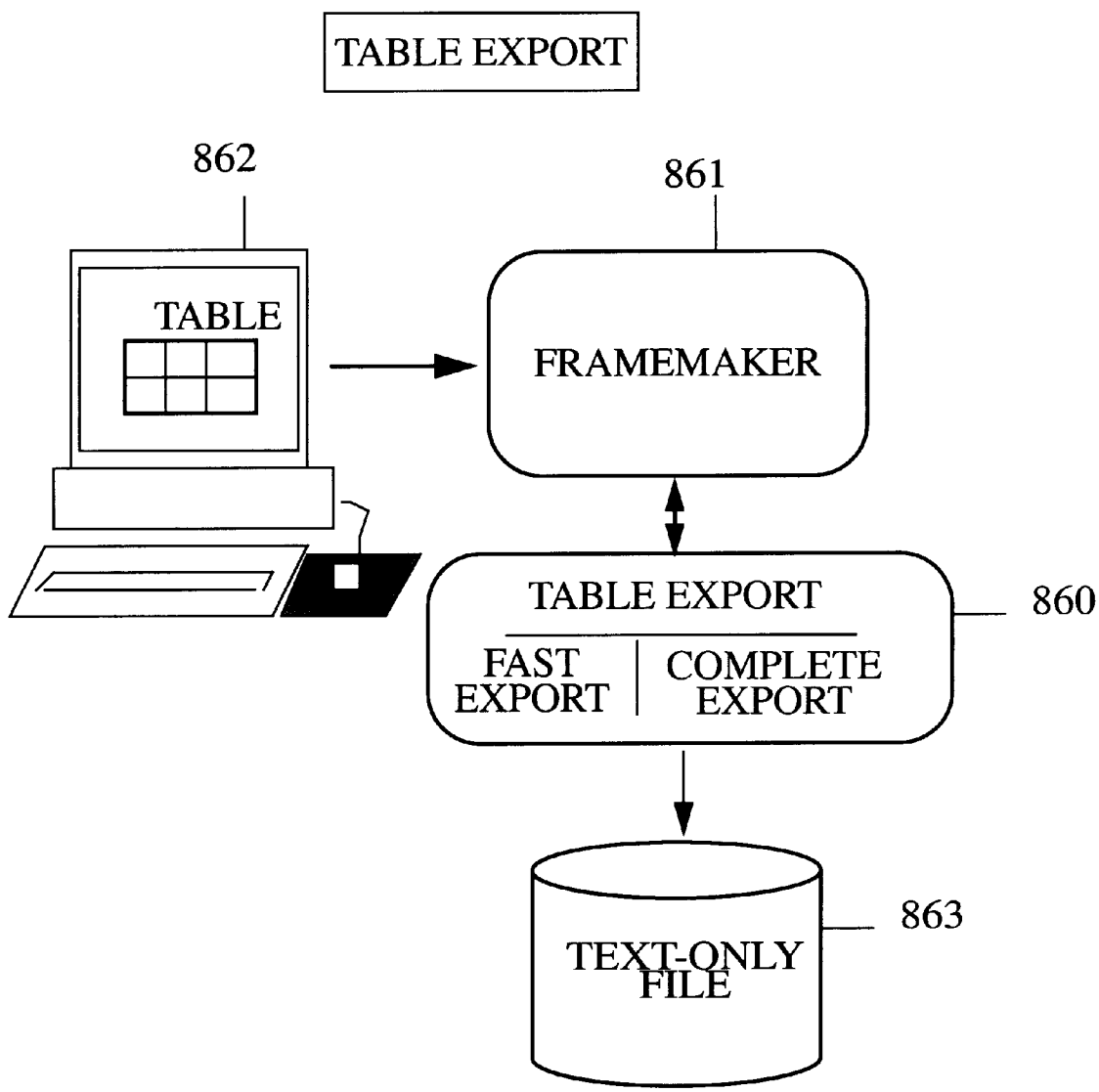
FIG. 46 is a block diagram of TableExport.

FIG. 46 illustrates how TableExport 860 enhances FrameMaker® 861 by allowing a user to access the tableExport commands (i.e., fast export and complete export) via a computer 862. TableExport 860 is connected to a text-only file 863. No flow-chart is illustrated for TableExport because commercial products are available that provide this function.

Figure 47:
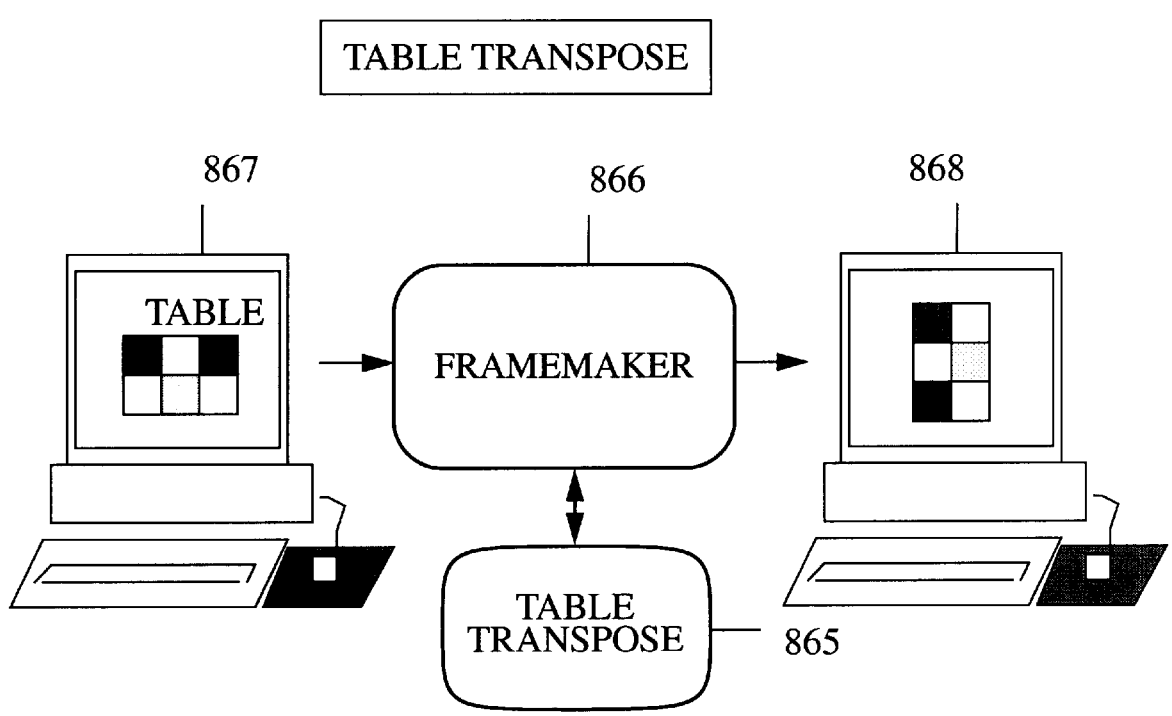
FIG. 47 is a block diagram of TableTranspose.

FIG. 47 illustrates how TableTranspose 865 enhances FrameMaker® 866 by allowing a user to access TableTranspose via a computer in order to transpose a table. A first computer 867 illustrates a table while a second computer 868 illustrates the table transposed.

Figure 48:
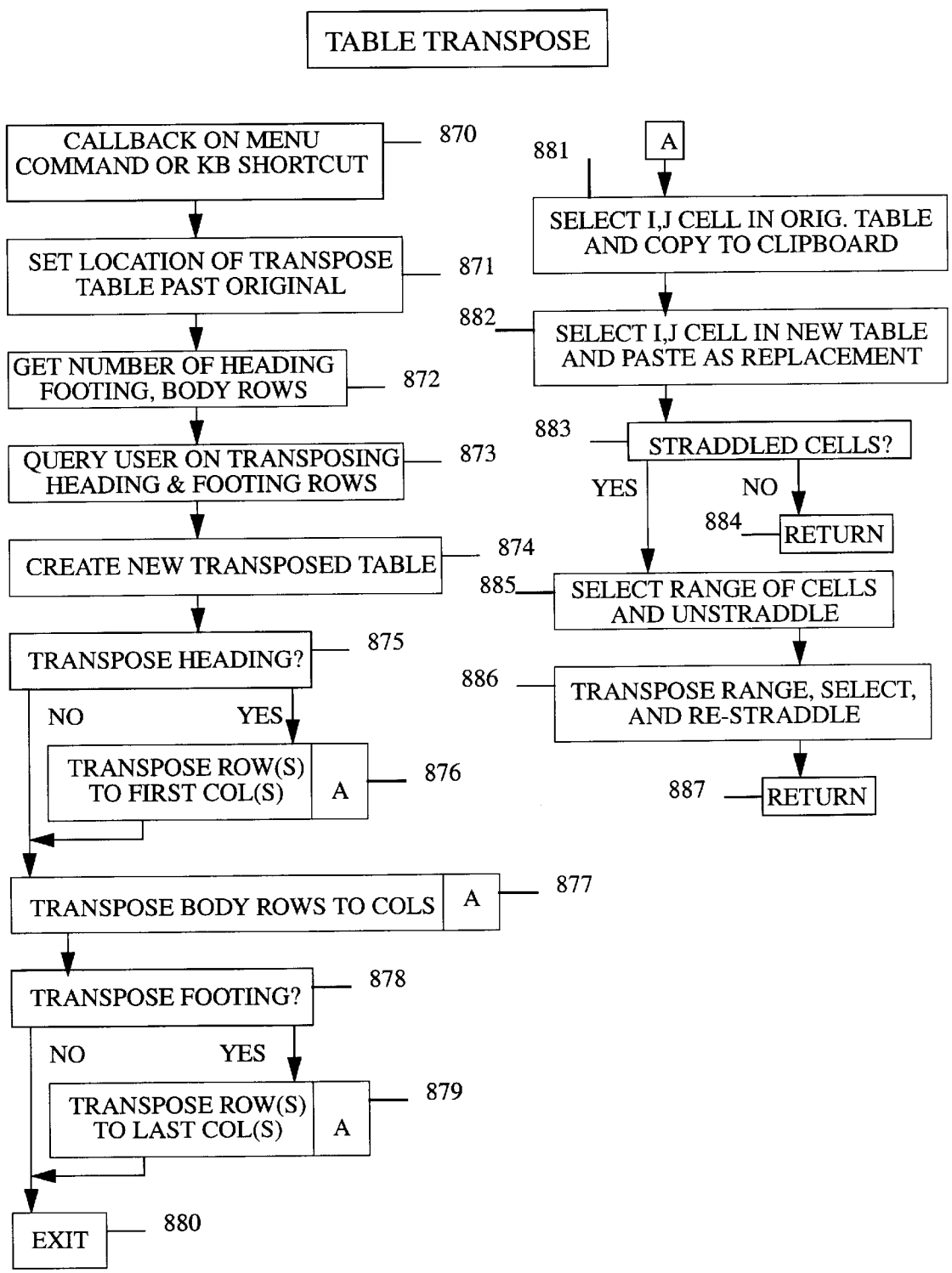
FIG. 48 is a flow-chart of TableTranspose.

FIG. 48 illustrates the flow-chart for TableTranspose which may be accessed via a menu command or a keyboard command 870. The next step is to set the location of the transposed table past the original table 871. The next step is to get the number of the heading row, the footing row, and the body rows 872. The next step is to query the user concerning the heading row and the footing row 873. The next step is to create a new transposed table 874. The next step is to determine whether or not to transpose the heading row 875. If the heading row is to be transposed then transpose the heading row to the first column 876. Additional steps are required to complete step 876 and are described below. The next step after transposing the header row or determining that the header row does not need to be transposed is to transpose the body rows to columns 877. The same additional steps required to complete step 876 are required to complete step 877 and are described below. The next step after step 877 is completed is to determine if the footing row must be transposed 878. If the footing row must be transposed then the footing rows are transposed to the last column 879. The same additional steps required to complete step 876 are required to complete step 879 and are described below. After step 879 is completed or if the footing rows do not have to be transposed then the next step is to exit 880.

The additional steps needed to complete steps 876, 877, and 879 above each require additional steps starting with selecting cell (i,j) in the original table and copying it to the clipboard 881. The next step is to select cell (O,i) in the new table and paste the cell from the clipboard at this cell 882. The next step is to determine if there are any straddle cells 883. If there are no straddle cell then return 884 to the step from which these additional steps where called (e.g., step 876, 877, or 879) and proceed with the next step (e.g., step 877, 878, or 880). If a straddle cell exists then select the range of cells and unstraddle them 885. The next step is to transpose the range, select, and re-straddle 886. The next step is to return 887 to the step from which these additional steps where called and proceed with the next step.

X. Book/Document Reports

The present invention improves upon the capability of FrameMaker® to create reports by adding the capability to count the number of lines in a document, report on the format of a a paragraph, and count the number of pages in a document. These improvements to FrameMaker® are in the form of a number of C language programs called LineCount, ParagraphFormat, and PageCount. These programs may be found in the microfiche appendix to the present invention.

LineCount allows a user of FrameMaker® to receive a report on the number of lines, excluding tables, contained in a document.

ParagraphFormat allows a user of FrameMaker® to create a single table listing fifty-six paragraph format property names and values for the currently selected paragraph or specified format tag.

PageCount allows a user of FrameMaker® to receive a report on the number of pages of a document by invisibly opening its components.

Figure 49:
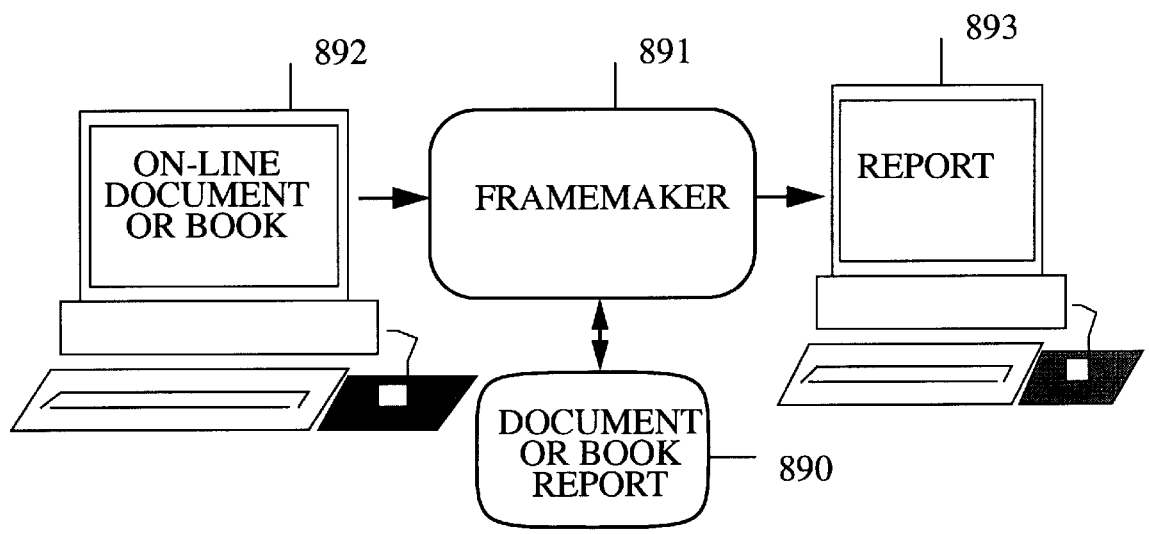
FIG. 49 is a block diagram of LineCount, ParagraphFormat, and PageCount.

FIG. 49 is a block diagram of how LineCount, ParagraphFormat, and PageCount 890 enhance FrameMaker® 891 by allowing a user to access the commands of LineCount, ParagraphFormat, and PageCount 890 via a computer. A first computer illustrates an on-line document or book while a second computer 893 illustrates a report generated using LineCount, ParagraphFormat, or PageCount 890.

Figure 50:
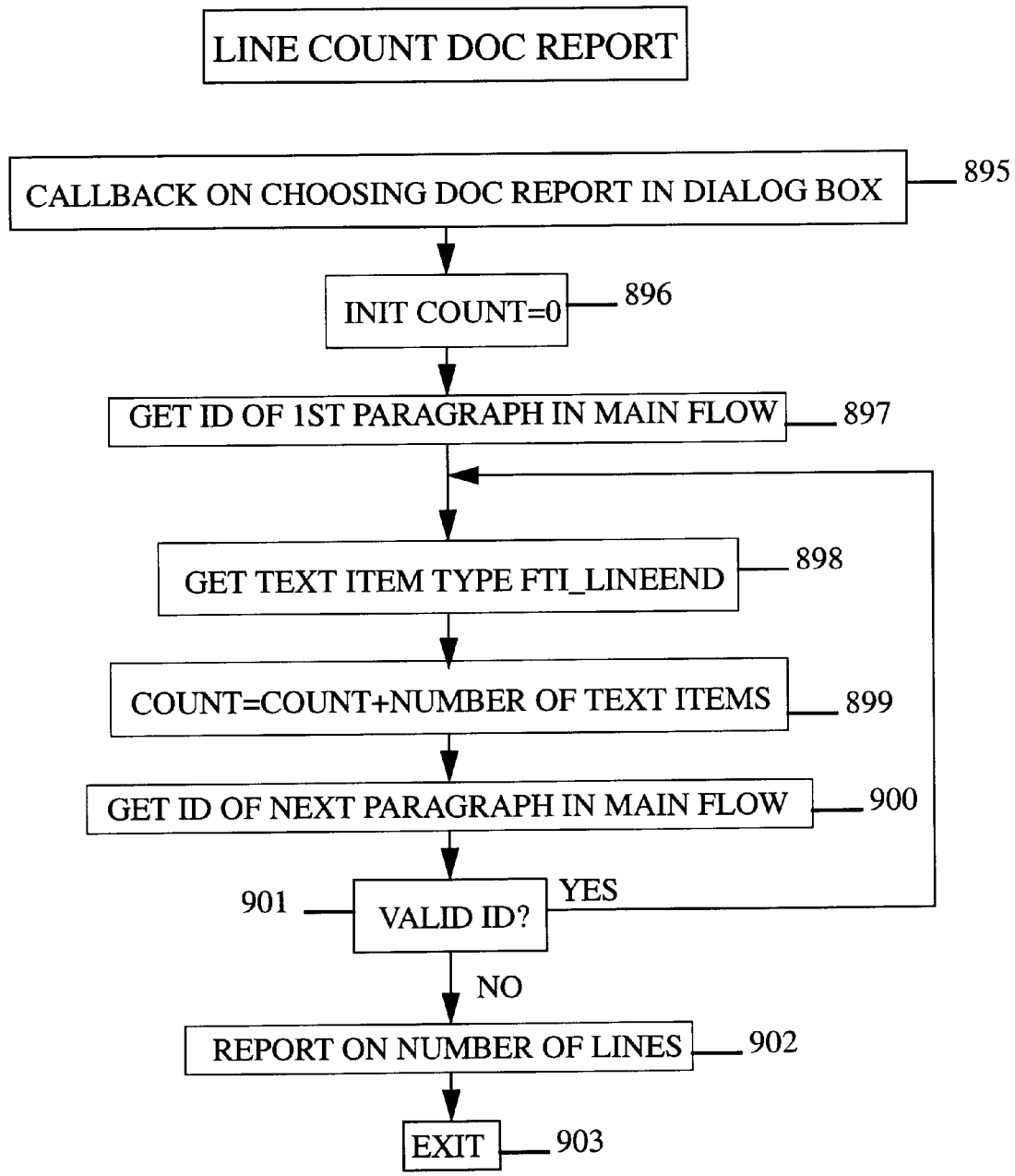
FIG. 50 is a flow-chart of LineCount.

FIG. 50 is a flow-chart of LineCount which may be accessed by choosing document report in a dialog box 895. The next step is to set a count to zero 896. The next step is to get the identification of the first paragraph in the main flow 897. The next step is to get the text item type FTI_LineEnd 898. The next step is to set the count to the count plus the number of text items 899. The next step is to get the identification of the next paragraph in the main flow 900. The next step is to determine if the identification is valid 901. If the identification is valid then return to step 898 and continue from there. If the identification is not valid then report the number of lines 902. The next step is to exit 903.

Figure 51:
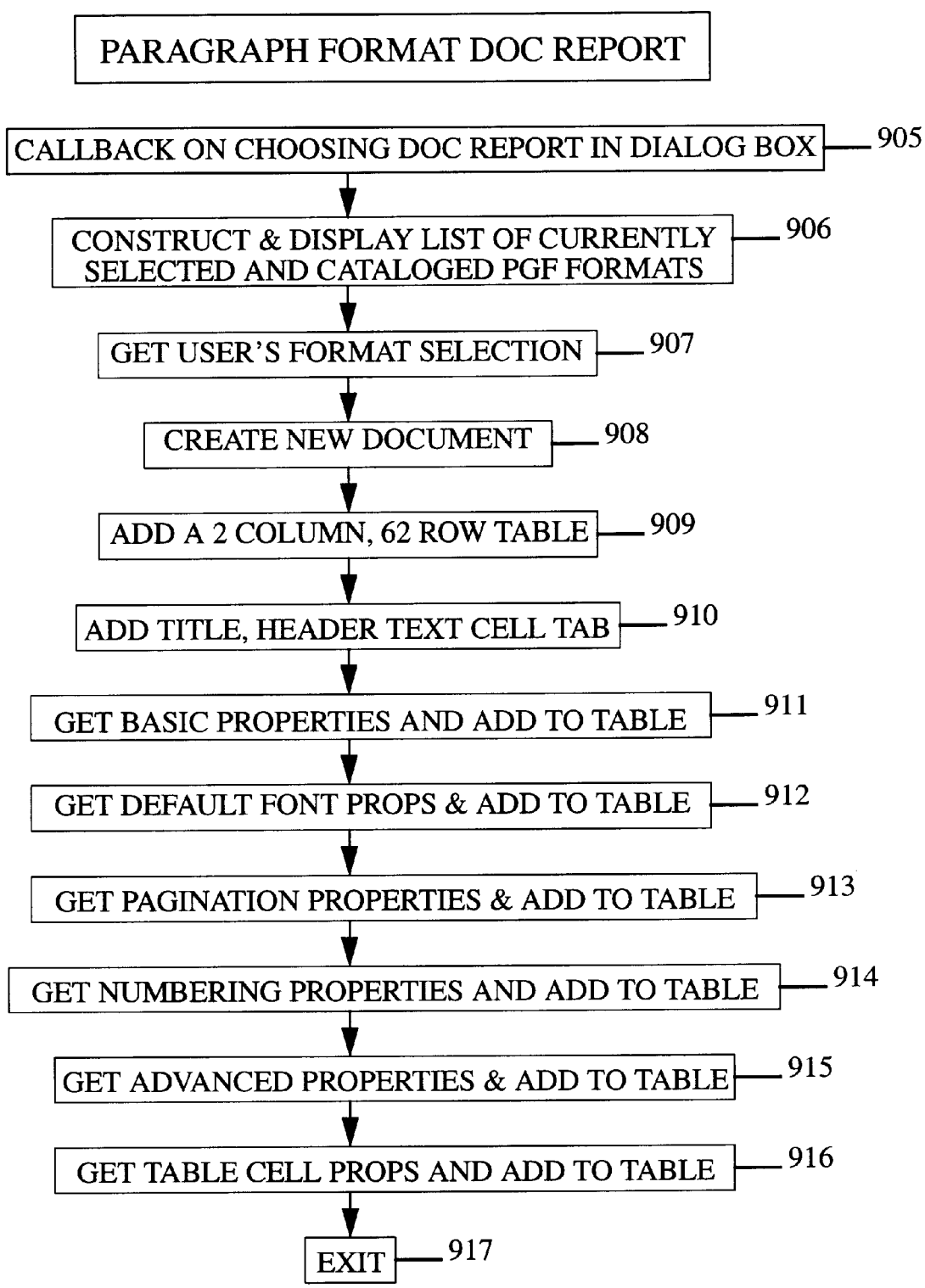
FIG. 51 is a flow-chart of ParagraphFormat.

FIG. 51 is a flow-chart of ParagraphFormat which may be activated by choosing document report from a dialog box 905. The next step is to construct and display a list of current selected and cataloged paragraph formats 906. The next step is to get the user's format selection 907. The next step is to create a new document 908. The next step is to add a two-column, sixty-two-row table 909. The next step is to add a title and a header text cell tab 910. The next step is to get the basic properties and add them to the table 911. the next step is to get the default font properties and add them to the table 912. The next step is to get the pagination properties and add them to the table 913. The next step is to get the numbering properties and add them to the table 914. The next step is to get the advanced properties and add them to the table 915. the next step is to get the table cell properties and add them to the table 916. The next step is to exit 917.

Figure 52:
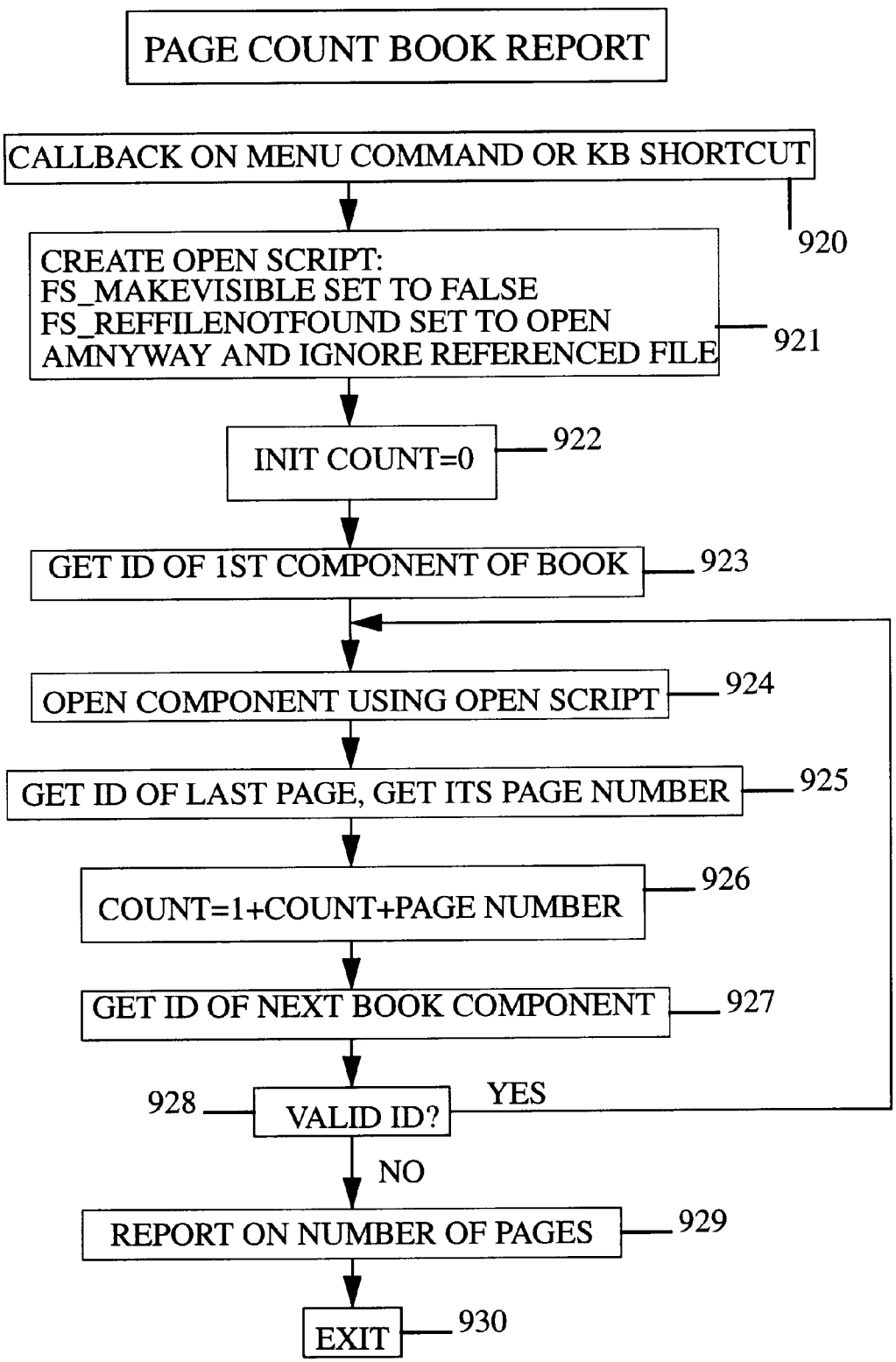
FIG. 52 is a flow-chart of PageCount.

FIG. 52 is a flow-chart of PageCount which may be activated by a menu command or keyboard shortcut command 920. The next step is to create a script to open a document 921. The next step is to initialize a count to zero 922. The next step is to get the identification of the first component of the book 923. The next step is to open the component using the open script 924. The next step is to get the identification of the last page and get its page number 925. The next step is to increment the count by one plus the page number of the last page 926. The next step is to get the identification of the next book component 927. The next step is to determine if the identification is valid or not 928. If the identification is valid then return to step 924 and proceed from there. If the identification is not valid then report on the number of pages 929. The next step is to exit 930.

XI. Filters

The present invention improves upon the capability of FrameMaker® to allow exchange of files with other application by adding the capability to compress or uncompress a document into UNIX format, compress or uncompress a document into GZIP format, encrypt or decrypt a document using DES, and converting a CGM graphic into a graphic that may be edited by FrameMaker® (i.e., a line-drawn graphic). These improvements to FrameMaker® are in the form of a number of C language programs called Compress (UNIX), Uncompress (UNIX), Gzip (GZIP), Gunzip (GZIP), Crypt (DES), Decrypt (DES), and ImportCGM. These programs may be found in the microfiche appendix to the present invention.

ImportCGM allows a user of FrameMaker® to convert and import a CGM file in a format that can be edited in a FrameMaker® document (i.e., a line-drawn graphic).

Uncompress automatically uncompresses a UNIX compressed document, as indicated by the suffix ".Z" in its name, upon the opening of the document.

Compress allows a user of FrameMaker® to save a document in UNIX compressed format.

Gunzip automatically uncompresses a GZIP compressed document, as indicated by the suffix ".gz" in its name, upon the opening of the document.

Gzip allows a user of FrameMaker® to save a document in GZIP compressed format.

Crypt allows a user of FrameMaker® to save a document in DES encrypted format.

DES stands for the Data Encryption Standard. The details of DES are contained in FIPS PUB 46 and FIPS PUB 81 which are both hereby incorporated by reference into the specification of the present invention.

Decrypt automatically decrypts a DES encrypted document, as indicated by the suffix ".enc" in its name, upon the opening of the document.

Figure 53:
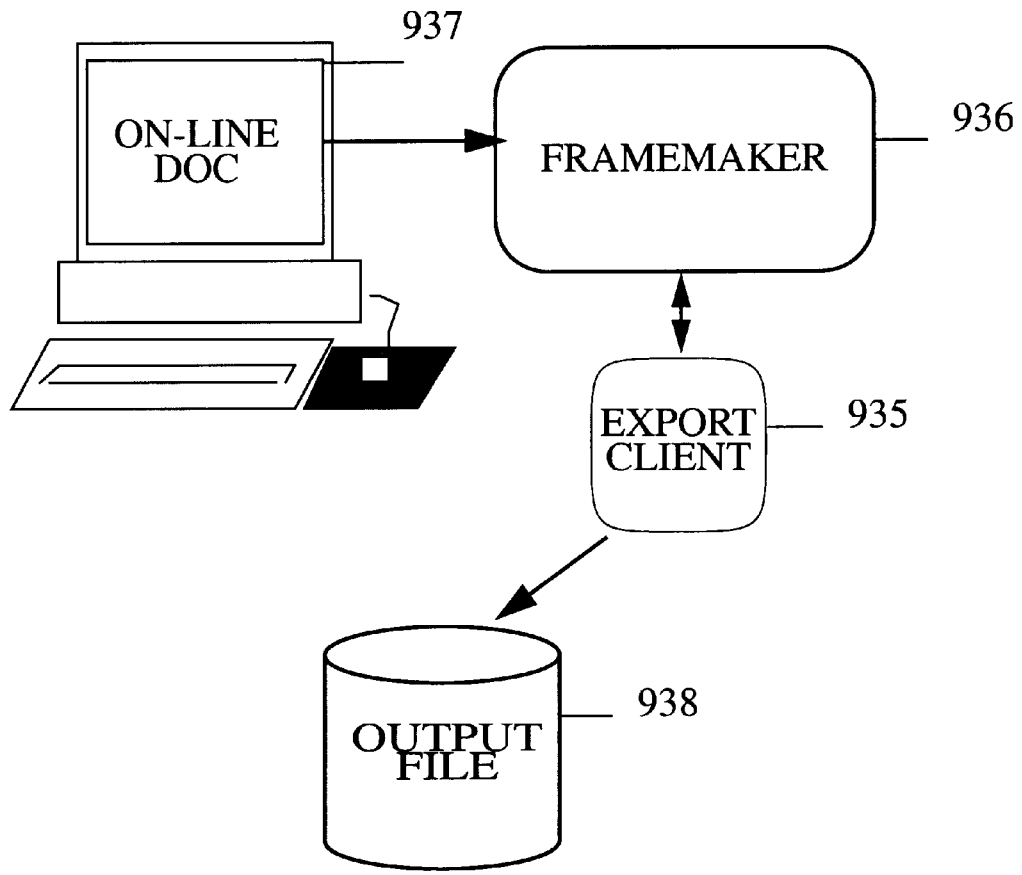
FIG. 53 is a block diagram of Compress, Gzip, and Crypt.

FIG. 53 illustrates how Compress, Gzip, and Crypt 935 enhances FrameMaker® 936 by allowing a user to access the commands of Compress, Gzip, and Crypt via a computer 937. Compress, Gzip, and Crypt 935 create an output file 938 for exporting the file after the user-selected operation is completed.

Figure 54:
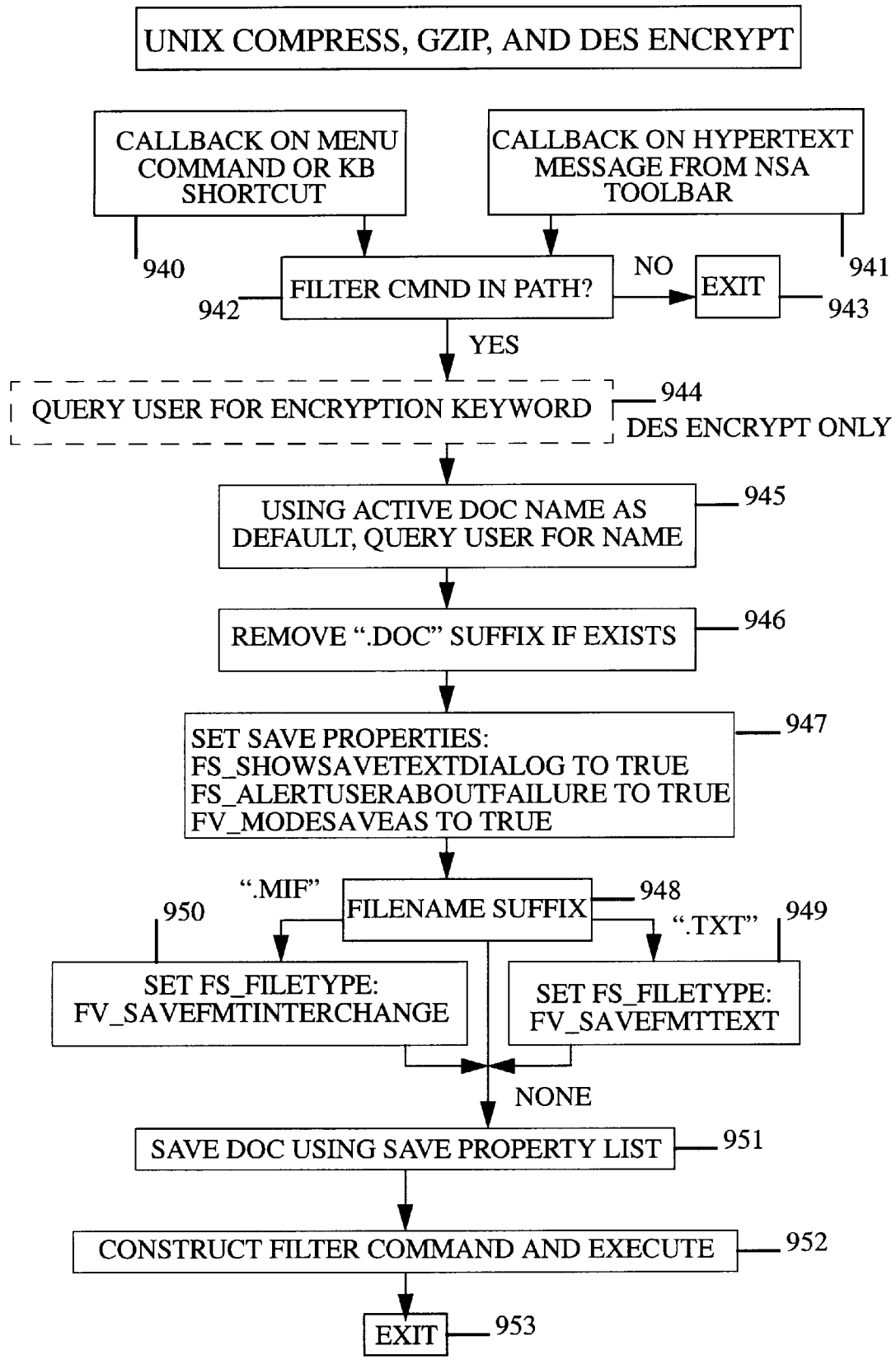
FIG. 54 is a flow-chart of Compress, Gzip, and Crypt.

FIG. 54 is a flow-chart of Compress, Gzip, and Crypt which may be activated from a menu command or a keyboard command 940 or by a hypertext message from NSA-Toolbar 941. The next step is to determine if there is a filter command in the path 942. If there is no filter command in the path then exit 943. If there is a filter command in the path and the user wishes to encrypt then query the user for the encryption password 944. The next step after step 944 if the user wishes to encrypt or after step 942 if there is a filter command in the path and the user does not wish to encrypt is to query the user for a name using the active document name as a default 945. The next step is to remove the suffix ".doc" from the document if such a suffix exists 946. The next step is to set the save properties 947. The next step is to determine the filename suffix 948. If the suffix name is to be ".txt" then set the file type to text 949. If the suffix is to be "mif" then set the file type to FrameMaker® Interchange Format (MIF) 950. If the suffix is to be none or after either step 949 or 950 is complete then save the document using the save property list 951. The next step is to construct a filter command and execute this command 952. The next step is to exit 953.

Figure 55:
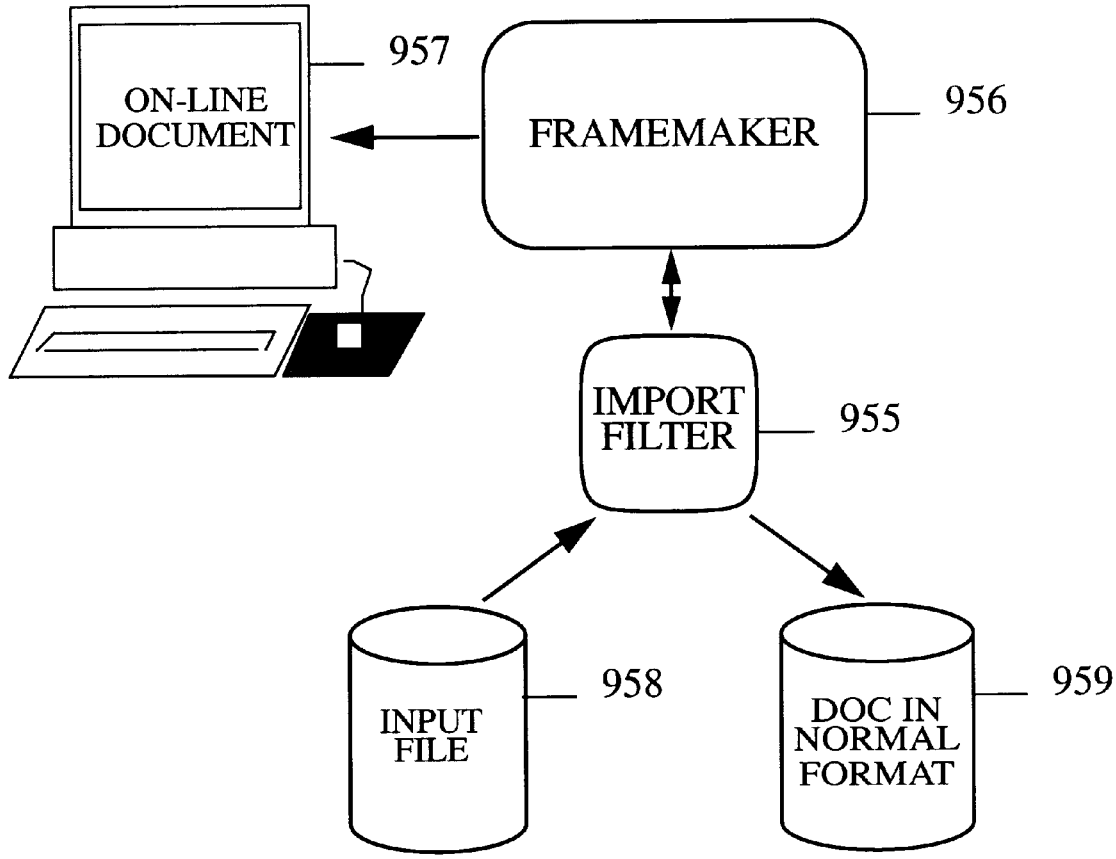
FIG. 55 is a block diagram of Uncompress, Gunzip, Decrypt, and ImportCGM.

FIG. 55 is a block diagram of how Uncompress, Gunzip, Decrypt, and ImportCGM 955 enhances FrameMaker° 956 by allowing a user to access the commands of Uncompress, Gunzip, Decrypt, and ImportCGM 955 via a computer 957. Uncompress, Gunzip, Decrypt, and ImportCGM 955 are connected to an input file 958 for receiving the file to be modified and an output file 959 to which the modified file is transmitted.

Figure 56:
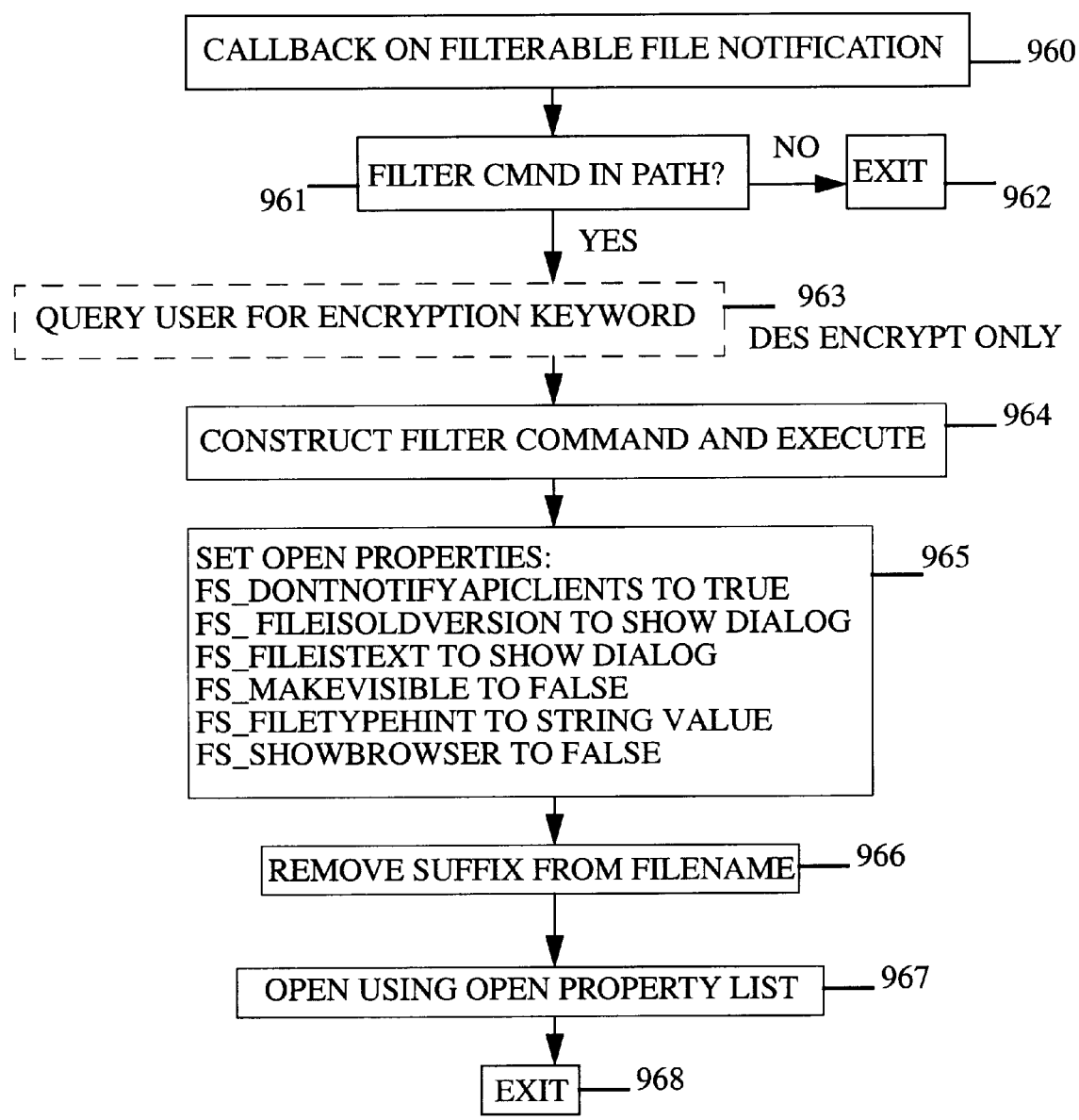
FIG. 56 is a flow-chart of Uncompress, Gunzip, and Decrypt.

FIG. 56 is a flow-chart of Uncompress, Gunzip, and Decrypt which may be activated using a filterable file notification 960. The next step is to determine if there is a filter command in the path 961. If there is no filter command in the path then exit 962. If there is a filter command in the path and the user wishes to decrypt then the next step is to query the user for the encryption password 963. After step 963 or after step 961 if there is a filter command in the path and the user does not wish to decrypt then construct a filter command and execute the same 964. The next step is to set the open properties 965. The next step is to remove the suffix from the filename 966. The next step is to open the file using the open properties list 967. The next step is to exit 968.

Figure 57:
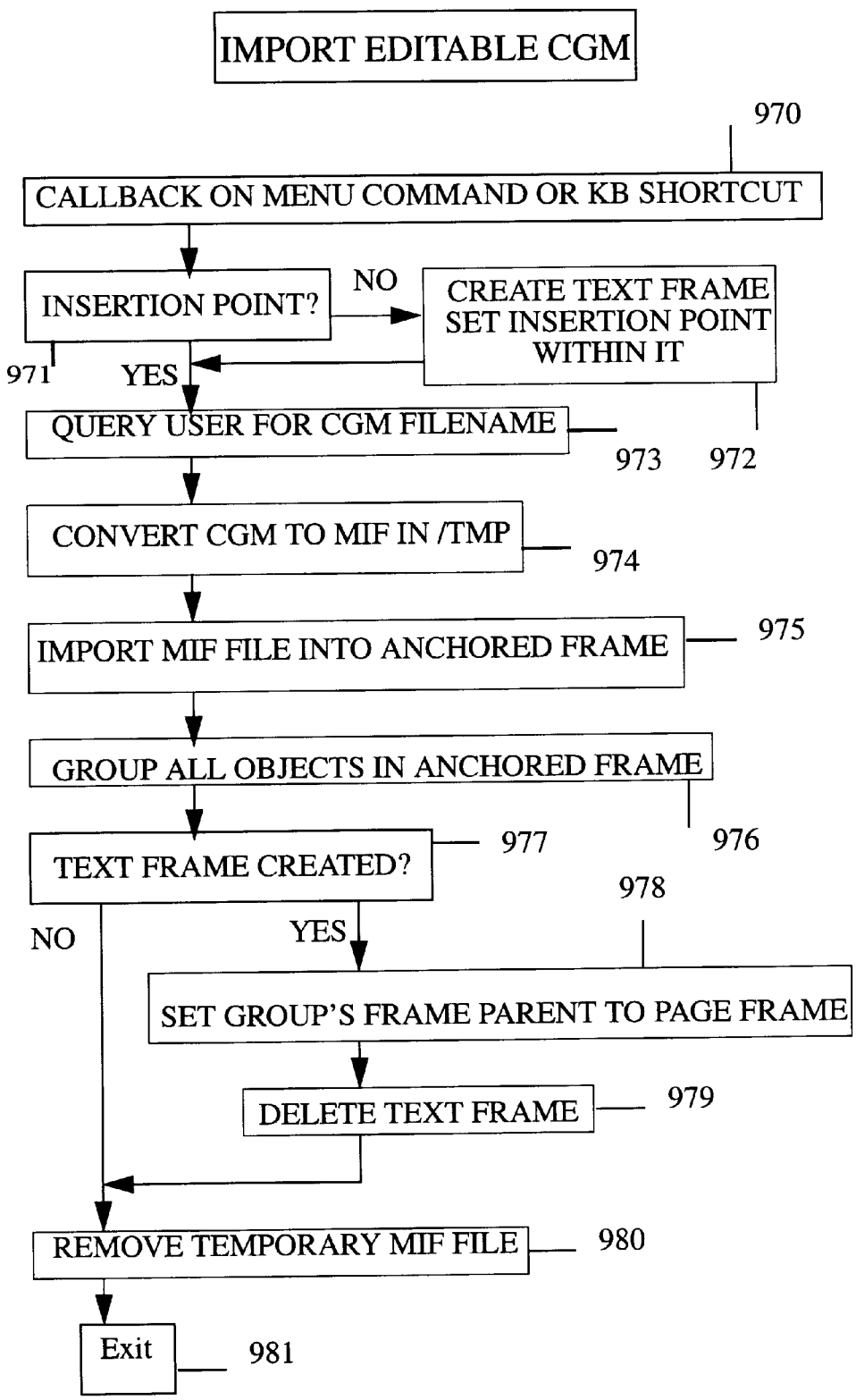
FIG. 57 is a flow-chart of ImportCGM.

FIG. 57 is a flow-chart of ImportCGM which may be activated using a menu command or a keyboard command 970. The next step is to determine if there is an insertion point 971. If there is no insertion point then create a text frame and set an insertion point therein 972. After step 972 or if there is an insertion point then query the user for a CGM filename 973. The next step is to convert the CGM file to MIF format in a temporary MIF file 974. The next step is to import the MIF file into an anchored frame 975. The next step is to group all objects in an anchored frame 976. The next step is to determine if a text frame was created 977. If a text frame was created in step 972 then set the frame parent of the group to page format 978. The next step after step 978 is to delete the text frame 979. The next step after step 979 or the next step after step 977 if no text frame was created in step 972 is to remove the temporary MW file 980. The next step is to exit 981.

What is claimed is:

1. A method of processing a document in electronic form, comprising the steps of:
   a) activating a commercial document processing method;
   b) opening the document to be processed using the commercial document processing method;
   c) selecting a processing function from the group consisting of two-way database publishing, charting, collaborative editing, increasing productivity, utilizing computer-to-computer communication, processing graphics, processing tables, reporting, and filtering;
   d) modifying the document according to the function selected in step (c);
   e) returning to step (c) if a user wishes to select another processing function, otherwise proceeding to step (f);
   f) selecting a function from the group consisting of saving the document, transmitting the document, and printing the document;
   g) returning to step (f) if the user wishes to select another function, otherwise proceeding to step (h); and
   h) closing the document.

2. The method of claim 1, wherein said step of selecting the function of two-way database publishing from the group consisting of processing functions, further comprises the steps of:
   a) selecting a processing function from the group consisting of opening a file; selecting all database rows, selecting a subset of database rows, retrieving a previous database row, retrieving a first database row, adding a classification banner, clearing a form, printing, selecting all database rows, selecting a subset of database rows, retrieving a next database row, retrieving the last database row, copying a page to a document, and closing a connection; and
   b) returning to step (a) if the user wishes to select another processing function.

3. The method of claim 1, wherein said step of selecting the function of charting from the group consisting of processing functions, further comprises the steps of:
   a) selecting a charting function from the group consisting of creating a column chart, creating a bar chart, creating a stacked chart, creating a pie chart, creating a line chart, creating a scatter chart, creating an area chart, and creating a high-low chart; and b) returning to step (a) if the user wishes to select another charting function.

4. The method of claim 1, wherein said step of selecting the function of collaborative editing from the group consisting of processing functions, further comprises the steps of:

a) selecting a collaborative editing function from the group consisting of marking a document with additions, deletions, and sticky notes; reviewing proposed changes and accepting and rejecting any change individually; and accepting and rejecting proposed changes collectively; and b) returning to step (a) if the user wishes to select another collaborative editing function.

5. The method of claim 1, wherein said step of selecting the function of increasing productivity from the group consisting of processing functions, further comprises the steps of:

a) selecting a productivity function from the group consisting of common FrameMaker® commands, text editing commands, paragraph and pagination commands, graphics commands, graphics editing commands, table editing commands, copy commands, renaming commands, delete commands, print commands, save commands, change bar commands, flow commands, typographical commands, conditional commands, footnote commands, table footnote commands, view commands, and session commands; and b) returning to step (a) if the user wishes to select another productivity function.

6. The method of claim 1, wherein said step of selecting the function of utilizing computer-to-computer communication from the group consisting of processing functions, further comprises the steps of:

a) selecting a computer-to-computer communication function from the group consisting of silently saving a document in normal format, view-only format, text-only format, and PostScript format; silently conducting a file transfer protocol session; removing a text-only file; removing a PostScript file; displaying an alert when a command has been completed; and b) returning to step (a) if the user wishes to select another computer-to-computer communication function.

7. The method of claim 1, wherein said step of selecting the function of processing graphics from the group consisting of processing functions, further comprises the steps of:

a) selecting a graphics function from the group consisting of drop-shadow, micro-rotate, and single-level-move; and b) returning to step (a) if the user wishes to select another graphics function.

8. The method of claim 1, wherein said step of selecting the function of processing tables from the group consisting of processing functions, further comprises the steps of:

a) selecting a table processing function from the group consisting of sorting a table, summing columns, exporting a table, and transposing a table; and b) returning to step (a) if the user wishes to select another table processing function.

9. The method of claim 1, wherein said step of selecting the function of collaborative editing from the group consisting of processing functions, further comprises the steps of:

a) selecting a reporting function from the group consisting of counting the number of lines in a document, reporting on a paragraph's format, and counting the number of pages in a document; and b) returning to step (a) if the user wishes to select another reporting function.

10. The method of claim 1, wherein said step of selecting the function of filtering from the group consisting of processing functions, further comprises the steps of:

a) selecting a filtering function from the group consisting of compressing a file in UNIX format, uncompressing a compressed file in UNIX format, compressing a file in GZIP format, uncompressing a file compressed in GZIP format, encrypting a file using DES, decrypting a file encrypted using DES, and importing a line-drawn graphic file; and b) returning to step (a) if the user wishes to select another filtering function.

11. The method of claim 1, wherein said step of activating a commercial document processing method is comprised of the step of activating a commercial document processing method called FrameMaker®.

12. The method of claim 11, wherein said step of selecting the function of two-way database publishing from the group consisting of processing functions, further comprises the steps of:

a) selecting a processing function from the group consisting of opening a file; selecting all database rows, selecting a subset of database rows, retrieving a previous database row, retrieving a first database row, adding a classification banner, clearing a form, printing, selecting all database rows, selecting a subset of database rows, retrieving a next database row, retrieving the last database row, copying a page to a document, and closing a connection; and b) returning to step (a) if the user wishes to select another processing function.

13. The method of claim 12, wherein said step of selecting the function of charting from the group consisting of processing functions, further comprises the steps of:

a) selecting a charting function from the group consisting of creating a column chart, creating a bar chart, creating a stacked chart, creating a pie chart, creating a line chart, creating a scatter chart, creating an area chart, and creating a high-low chart; and b) returning to step (a) if the user wishes to select another charting function.

14. The method of claim 13, wherein said step of selecting the function of collaborative editing from the group consisting of processing functions, further comprises the steps of:

a) selecting a collaborative editing function from the group consisting of marking a document with additions, deletions, and sticky notes; reviewing proposed changes and accepting and rejecting any change individually; and accepting and rejecting proposed changes collectively; and b) returning to step (a) if the user wishes to select another collaborative editing function.

15. The method of claim 14, wherein said step of selecting the function of increasing productivity from the group consisting of processing functions, further comprises the steps of:

a) selecting a productivity function from the group consisting of common FrameMaker® commands, text editing commands, paragraph and pagination commands, graphics commands, graphics editing commands, table editing commands, copy commands, renaming commands, delete commands, print commands, save commands, change bar commands, flow commands, typographical commands, conditional commands, footnote commands, table footnote commands, view commands, and session commands; and b) returning to step (a) if the user wishes to select another productivity function.

16. The method of claim 15, wherein said step of selecting the function of utilizing computer-to-computer communication from the group consisting of processing functions, further comprises the steps of:
   a) selecting a computer-to-computer communication function from the group consisting of silently saving a document in normal format, view-only format, text-only format, and PostScript format; silently conducting a file transfer protocol session; removing a text-only file; removing a PostScript file; displaying an alert when a command has been completed; and
   b) returning to step (a) if the user wishes to select another computer-to-computer communication function.

17. The method of claim 16, wherein said step of selecting the function of processing graphics from the group consisting of processing functions, further comprises the steps of:
   a) selecting a graphics function from the group consisting of drop-shadow, micro-rotate, and single-level-move; and
   b) returning to step (a) if the user wishes to select another graphics function.

18. The method of claim 17, wherein said step of selecting the function of processing tables from the group consisting of processing functions, further comprises the steps of:
   a) selecting a table processing function from the group consisting of sorting a table, summing columns, exporting a table, and transposing a table; and
   b) returning to step (a) if the user wishes to select another table processing function.

19. The method of claim 18, wherein said step of selecting the function of collaborative editing from the group consisting of processing functions, further comprises the steps of:
   a) selecting a reporting function from the group consisting of counting the number of lines in a document, reporting on a paragraph's format, and counting the number of pages in a document; and
   b) returning to step (a) if the user wishes to select another reporting function.

20. The method of claim 19, wherein said step of selecting the function of filtering from the group consisting of processing functions, further comprises the steps of:
   a) selecting a filtering function from the group consisting of compressing a file in UNIX format, uncompressing a compressed file in UNIX format, compressing a file in GZIP format, uncompressing a file compressed in GZIP format, encrypting a file using DES, decrypting a file encrypted using DES, and importing a line-drawn graphic file; and
   b) returning to step (a) if the user wishes to select another filtering function.

* * * * *